United States Patent
Ikeda et al.

(10) Patent No.: US 8,308,563 B2
(45) Date of Patent: Nov. 13, 2012

(54) GAME SYSTEM AND STORAGE MEDIUM HAVING GAME PROGRAM STORED THEREON

(75) Inventors: Akio Ikeda, Kyoto (JP); Keizo Ohta, Kyoto (JP); Hideya Akasaka, Kyoto (JP); Yuki Takahashi, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 145 days.

(21) Appl. No.: 11/404,844

(22) Filed: Apr. 17, 2006

(65) Prior Publication Data
US 2007/0049374 A1    Mar. 1, 2007

Related U.S. Application Data

(60) Provisional application No. 60/714,861, filed on Sep. 8, 2005.

(30) Foreign Application Priority Data

Aug. 30, 2005  (JP) .................... 2005-249265

(51) Int. Cl.
*G06F 17/00* (2006.01)
(52) U.S. Cl. .............. 463/37; 463/36; 463/38
(58) Field of Classification Search ........... 463/36–38
See application file for complete search history.

(56) References Cited

U.S. PATENT DOCUMENTS

| | | | |
|---|---|---|---|
| 3,454,920 A | 7/1969 | Mehr | |
| 3,474,241 A | 10/1969 | Kuipers | |
| D220,268 S | 3/1971 | Kliewer | |
| 3,660,648 A | 5/1972 | Kuipers | |
| 3,973,257 A | 8/1976 | Rowe | |
| 4,009,619 A | 3/1977 | Snyman | |
| 4,038,876 A | 8/1977 | Morris | |
| 4,166,406 A | 9/1979 | Maughmer | |
| 4,240,638 A | 12/1980 | Morrison et al. | |
| 4,287,765 A | 9/1981 | Kreft | |
| 4,303,978 A | 12/1981 | Shaw et al. | |
| 4,318,245 A | 3/1982 | Stowell et al. | |

(Continued)

FOREIGN PATENT DOCUMENTS

CN    1338961    3/2002

(Continued)

OTHER PUBLICATIONS

"Game Controller" Wikipedia, Aug. 19, 2005, 7 pages, http://en.wikipedia.org/w/index.php?title=Game_controller&oldid=21390758.

(Continued)

*Primary Examiner* — Michael Cuff
(74) *Attorney, Agent, or Firm* — Nixon & Vanderhye P.C.

(57) ABSTRACT

A first controller includes a first operation data generation section for generating first operation data in accordance with a motion of a first controller body included in the first controller. A second controller includes a second operation data generation section for generating second operation data in accordance with a direction input operation performed by a player. A game apparatus includes a game process means for obtaining the first operation data and the second operation data and subjecting a virtual game world to a predetermined game process in accordance with the obtained operation data, and a display process means for causing the display device to display, on a display area, an image of the virtual game world having been subjected to the game process.

40 Claims, 24 Drawing Sheets

U.S. PATENT DOCUMENTS

| | | | |
|---|---|---|---|
| 4,321,678 A | 3/1982 | Krogmann |
| 4,337,948 A | 7/1982 | Breslow |
| 4,342,985 A | 8/1982 | Desjardins |
| 4,402,250 A | 9/1983 | Baasch |
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,862,165 A | 8/1989 | Gart |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,988,981 A | 1/1991 | Zimmerman et al. |
| 4,994,795 A | 2/1991 | MacKenzie |
| 5,045,843 A | 9/1991 | Hansen |
| D320,624 S | 10/1991 | Taylor |
| 5,059,958 A | 10/1991 | Jacobs et al. |
| 5,062,696 A | 11/1991 | Oshima et al. |
| 5,068,645 A | 11/1991 | Drumm |
| D322,242 S | 12/1991 | Cordell |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,192,082 A | 3/1993 | Inoue et al. |
| 5,202,844 A | 4/1993 | Kamio et al. |
| 5,207,426 A | 5/1993 | Inoue et al. |
| D338,242 S | 8/1993 | Cordell |
| D340,042 S | 10/1993 | Copper et al. |
| 5,259,626 A | 11/1993 | Ho |
| 5,262,777 A | 11/1993 | Low et al. |
| D342,256 S | 12/1993 | Payne |
| 5,280,744 A | 1/1994 | DeCarlo et al. |
| D345,164 S | 3/1994 | Grae |
| 5,296,871 A * | 3/1994 | Paley ............... 345/163 |
| 5,307,325 A | 4/1994 | Scheiber |
| 5,317,394 A | 5/1994 | Hale et al. |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| 5,369,889 A | 12/1994 | Callaghan |
| 5,373,857 A | 12/1994 | Travers et al. |
| 5,396,265 A | 3/1995 | Ulrich et al. |
| 5,421,590 A * | 6/1995 | Robbins ............... 463/37 |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,512,892 A | 4/1996 | Corballis et al. |
| 5,517,183 A | 5/1996 | Bozeman, Jr. |
| 5,523,800 A | 6/1996 | Dudek |
| 5,526,022 A | 6/1996 | Donahue et al. |
| 5,528,265 A | 6/1996 | Harrison |
| 5,531,443 A | 7/1996 | Cruz |
| 5,541,860 A | 7/1996 | Takei et al. |
| 5,551,701 A * | 9/1996 | Bouton et al. ............... 463/36 |
| 5,554,033 A | 9/1996 | Bizzi |
| 5,554,980 A | 9/1996 | Hashimoto et al. |
| 5,561,543 A | 10/1996 | Ogawa |
| 5,563,628 A | 10/1996 | Stroop |
| 5,569,085 A | 10/1996 | Igarashi et al. |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| D379,832 S | 6/1997 | Ashida |
| 5,640,152 A | 6/1997 | Copper |
| 5,641,288 A | 6/1997 | Zaenglein, Jr. |
| 5,643,087 A | 7/1997 | Marcus et al. |
| 5,645,077 A | 7/1997 | Foxlin et al. |
| 5,645,277 A * | 7/1997 | Cheng ............... 273/148 B |
| 5,666,138 A | 9/1997 | Culver |
| 5,667,220 A | 9/1997 | Cheng |
| 5,670,845 A | 9/1997 | Grant et al. |
| 5,670,988 A | 9/1997 | Tickle |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,703,623 A | 12/1997 | Hall et al. |
| 5,724,106 A | 3/1998 | Autry et al. |
| 5,726,675 A | 3/1998 | Inoue |
| 5,734,371 A | 3/1998 | Kaplan |
| 5,734,373 A | 3/1998 | Rosenberg et al. |
| 5,734,807 A | 3/1998 | Sumi |
| D393,884 S | 4/1998 | Hayami |
| 5,736,970 A | 4/1998 | Bozeman, Jr. |
| 5,739,811 A | 4/1998 | Rosenberg et al. |
| 5,741,182 A | 4/1998 | Lipps et al. |
| 5,742,331 A | 4/1998 | Uomori et al. |
| 5,745,226 A | 4/1998 | Gigioli, Jr. |
| D394,264 S | 5/1998 | Sakamoto et al. |
| 5,746,602 A | 5/1998 | Kikinis |
| 5,751,273 A | 5/1998 | Cohen |
| 5,752,880 A | 5/1998 | Gabai et al. |
| 5,757,354 A | 5/1998 | Kawamura |
| 5,757,360 A | 5/1998 | Nitta et al. |
| D395,464 S | 6/1998 | Shiibashi et al. |
| 5,764,224 A | 6/1998 | Lilja et al. |
| 5,769,719 A | 6/1998 | Hsu |
| 5,771,038 A | 6/1998 | Wang |

| | | |
|---|---|---|
| D396,468 S | 7/1998 | Schindler et al. |
| 5,785,317 A | 7/1998 | Sasaki |
| D397,162 S | 8/1998 | Yokoi et al. |
| 5,794,081 A | 8/1998 | Itoh et al. |
| 5,796,354 A | 8/1998 | Cartabiano et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| D400,885 S | 11/1998 | Goto |
| 5,831,553 A | 11/1998 | Lenssen et al. |
| 5,835,077 A | 11/1998 | Dao |
| 5,835,156 A | 11/1998 | Blonstein et al. |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard et al. |
| 5,854,622 A | 12/1998 | Brannon |
| D405,071 S | 2/1999 | Gambaro |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| D407,761 S | 4/1999 | Barr |
| 5,897,437 A | 4/1999 | Nishiumi et al. |
| 5,898,421 A | 4/1999 | Quinn |
| 5,900,867 A | 5/1999 | Schindler et al. |
| 5,902,968 A | 5/1999 | Sato et al. |
| D410,909 S | 6/1999 | Tickle |
| 5,912,612 A | 6/1999 | DeVolpi |
| 5,919,149 A | 7/1999 | Allum |
| 5,923,317 A | 7/1999 | Sayler et al. |
| 5,926,780 A | 7/1999 | Fox et al. |
| 5,929,782 A | 7/1999 | Stark et al. |
| D412,940 S | 8/1999 | Kato |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Scianmanella et al. |
| 5,967,898 A | 10/1999 | Takasaka et al. |
| 5,973,757 A | 10/1999 | Aubuchon et al. |
| 5,982,352 A | 11/1999 | Pryor |
| 5,982,356 A | 11/1999 | Akiyama |
| 5,984,785 A | 11/1999 | Takeda |
| 5,986,644 A * | 11/1999 | Herder et al. ............... 345/158 |
| 5,991,085 A | 11/1999 | Rallison et al. |
| 5,999,168 A | 12/1999 | Rosenberg et al. |
| 6,002,394 A | 12/1999 | Schein et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,013,007 A | 1/2000 | Root et al. |
| 6,016,144 A | 1/2000 | Blonstein et al. |
| 6,019,680 A | 2/2000 | Cheng |
| 6,020,876 A | 2/2000 | Rosenberg et al. |
| 6,037,882 A | 3/2000 | Levy |
| 6,044,297 A | 3/2000 | Sheldon et al. |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach et al. |
| 6,059,576 A | 5/2000 | Brann |
| 6,069,594 A | 5/2000 | Barnes et al. |
| 6,072,467 A | 6/2000 | Walker |
| 6,072,470 A | 6/2000 | Ishigaki |
| 6,075,575 A | 6/2000 | Schein et al. |
| 6,081,819 A | 6/2000 | Ogino |
| 6,084,315 A | 7/2000 | Schmitt |
| 6,084,577 A | 7/2000 | Sato et al. |
| 6,087,950 A | 7/2000 | Capan |
| D429,718 S | 8/2000 | Rudolph |
| 6,110,039 A | 8/2000 | Oh |
| 6,115,028 A | 9/2000 | Balakrishnan |
| 6,137,457 A | 10/2000 | Tokuhashi et al. |
| D433,381 S | 11/2000 | Talesfore |
| 6,146,278 A | 11/2000 | Kobayashi |
| 6,148,100 A | 11/2000 | Anderson et al. |
| 6,155,926 A | 12/2000 | Miyamoto et al. |
| 6,160,405 A | 12/2000 | Needle et al. |
| 6,160,540 A | 12/2000 | Fishkin et al. |
| 6,162,191 A | 12/2000 | Foxlin |
| 6,164,808 A | 12/2000 | Shibata et al. |
| 6,171,190 B1 | 1/2001 | Thanasack et al. |
| 6,176,837 B1 | 1/2001 | Foxlin |
| 6,181,329 B1 | 1/2001 | Stork et al. |
| 6,183,365 B1 | 2/2001 | Tonomura et al. |
| 6,184,862 B1 | 2/2001 | Leiper |
| 6,184,863 B1 | 2/2001 | Sibert et al. |
| 6,186,896 B1 | 2/2001 | Takeda et al. |
| 6,191,774 B1 | 2/2001 | Schena et al. |
| 6,198,295 B1 | 3/2001 | Hill |
| 6,198,470 B1 | 3/2001 | Agam et al. |
| 6,198,471 B1 | 3/2001 | Cook |
| 6,200,219 B1 | 3/2001 | Rudell et al. |
| 6,200,253 B1 | 3/2001 | Nishiumi et al. |
| 6,201,554 B1 | 3/2001 | Lands |
| 6,211,861 B1 | 4/2001 | Rosenberg et al. |
| 6,217,450 B1 | 4/2001 | Meredith |
| 6,217,478 B1 | 4/2001 | Vohmann et al. |
| D442,998 S | 5/2001 | Ashida |
| 6,225,987 B1 | 5/2001 | Matsuda |
| 6,226,534 B1 | 5/2001 | Aizawa |
| 6,238,291 B1 | 5/2001 | Fujimoto et al. |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Ohsuga et al. |
| 6,245,014 B1 | 6/2001 | Brainard, III |
| 6,264,558 B1 | 7/2001 | Nishiumi et al. |
| 6,273,819 B1 | 8/2001 | Strauss et al. |
| 6,280,327 B1 * | 8/2001 | Leifer et al. ............... 463/39 |
| 6,287,198 B1 | 9/2001 | McCauley |
| 6,297,751 B1 | 10/2001 | Fadavi-Ardekani |
| 6,301,534 B1 | 10/2001 | McDermott, Jr. et al. |
| 6,304,250 B1 | 10/2001 | Yang et al. |
| 6,315,673 B1 | 11/2001 | Kopera et al. |
| 6,323,614 B1 | 11/2001 | Palazzolo et al. |
| 6,323,654 B1 | 11/2001 | Needle et al. |
| 6,325,718 B1 | 12/2001 | Nishiumi et al. |
| 6,331,841 B1 | 12/2001 | Tokuhashi et al. |
| 6,331,856 B1 | 12/2001 | Van Hook et al. |
| 6,337,954 B1 | 1/2002 | Soshi et al. |
| 6,346,046 B2 | 2/2002 | Miyamoto et al. |
| 6,347,998 B1 | 2/2002 | Yoshitomi et al. |
| 6,361,507 B1 | 3/2002 | Foxlin |
| D456,410 S | 4/2002 | Ashida |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| D456,854 S | 5/2002 | Ashida |
| 6,383,079 B1 | 5/2002 | Takeda et al. |
| 6,392,613 B1 | 5/2002 | Goto |
| 6,394,904 B1 | 5/2002 | Stalker |
| D458,972 S | 6/2002 | Ashida |
| 6,400,480 B1 | 6/2002 | Thomas |
| 6,400,996 B1 | 6/2002 | Hoffberg et al. |
| 6,409,687 B1 | 6/2002 | Foxlin |
| D459,727 S | 7/2002 | Ashida |
| D460,787 S | 7/2002 | Nishikawa |
| 6,415,223 B1 | 7/2002 | Lin et al. |
| 6,421,056 B1 | 7/2002 | Nishiumi et al. |
| 6,424,333 B1 | 7/2002 | Tremblay |
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |
| 6,456,276 B1 | 9/2002 | Park |
| D464,052 S | 10/2002 | Fletcher |
| D464,950 S | 10/2002 | Fraquelli |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |

| | | |
|---|---|---|
| 6,484,080 B2 | 11/2002 | Breed |
| 6,492,981 B1 | 12/2002 | Stork et al. |
| 6,496,122 B2 | 12/2002 | Sampsell |
| 6,518,952 B1 | 2/2003 | Leiper |
| 6,530,838 B2 | 3/2003 | Ha |
| 6,538,675 B2 | 3/2003 | Aratani et al. |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland et al. |
| 6,544,126 B2 | 4/2003 | Sawano et al. |
| 6,545,661 B1 | 4/2003 | Goschy et al. |
| 6,554,781 B1 | 4/2003 | Carter et al. |
| D474,763 S | 5/2003 | Tozaki et al. |
| 6,565,444 B2 | 5/2003 | Nagata et al. |
| 6,567,536 B2 | 5/2003 | McNitt et al. |
| 6,572,108 B1 | 6/2003 | Bristow |
| 6,577,350 B1 | 6/2003 | Proehl et al. |
| 6,582,299 B1 | 6/2003 | Matsuyama et al. |
| 6,582,380 B2 | 6/2003 | Kazlausky et al. |
| 6,585,596 B1 | 7/2003 | Liefer |
| 6,590,536 B1 | 7/2003 | Walton |
| 6,591,677 B2 | 7/2003 | Rothuff |
| 6,597,342 B1 | 7/2003 | Haruta |
| 6,597,443 B2 | 7/2003 | Boman |
| 6,599,194 B1 | 7/2003 | Smith et al. |
| 6,605,038 B1 | 8/2003 | Teller et al. |
| 6,608,563 B2 | 8/2003 | Weston et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,634,949 B1 | 10/2003 | Briggs et al. |
| 6,636,826 B1 | 10/2003 | Abe et al. |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi et al. |
| 6,677,990 B1 | 1/2004 | Kawahara |
| 6,681,629 B2 | 1/2004 | Foxlin et al. |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,725,173 B2 | 4/2004 | An et al. |
| D489,361 S | 5/2004 | Mori et al. |
| 6,736,009 B1 | 5/2004 | Schwabe |
| D491,924 S | 6/2004 | Kaminski et al. |
| D492,285 S | 6/2004 | Ombao et al. |
| 6,743,104 B1 | 6/2004 | Ota et al. |
| 6,747,632 B2 | 6/2004 | Howard |
| 6,747,690 B2 | 6/2004 | Mølgaard |
| 6,749,432 B2 | 6/2004 | French et al. |
| 6,752,719 B2 | 6/2004 | Himoto et al. |
| 6,753,849 B1 | 6/2004 | Curran et al. |
| 6,753,888 B2 | 6/2004 | Kamiwada et al. |
| 6,757,068 B2 | 6/2004 | Foxlin |
| 6,757,446 B1 | 6/2004 | Li et al. |
| 6,761,637 B2 | 7/2004 | Weston et al. |
| 6,765,553 B1 | 7/2004 | Odamura |
| D495,336 S | 8/2004 | Andre et al. |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1 | 11/2004 | Levenberg et al. |
| 6,812,881 B1 | 11/2004 | Mullaly et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 | 2/2005 | Tickle |
| 6,850,844 B1 | 2/2005 | Walters et al. |
| 6,852,032 B2 | 2/2005 | Ishino |
| 6,856,327 B2 | 2/2005 | Choi |
| D502,468 S | 3/2005 | Knight et al. |
| 6,868,738 B2 | 3/2005 | Moscrip et al. |
| 6,872,139 B2 | 3/2005 | Sato et al. |
| 6,873,406 B1 | 3/2005 | Hines et al. |
| D503,750 S | 4/2005 | Kit et al. |
| D504,298 S | 4/2005 | Bian |
| D504,677 S | 5/2005 | Kaminski et al. |
| D505,424 S | 5/2005 | Ashida et al. |
| 6,897,845 B2 | 5/2005 | Ozawa |
| 6,897,854 B2 | 5/2005 | Cho et al. |
| 6,906,700 B1 | 6/2005 | Armstrong |
| 6,908,388 B2 | 6/2005 | Shimizu et al. |
| 6,922,632 B2 | 7/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,861 B2 | 8/2005 | Wang |
| 6,933,923 B2 | 8/2005 | Feinstein |
| 6,954,980 B2 | 10/2005 | Song |
| 6,955,606 B2 | 10/2005 | Taho et al. |
| 6,956,564 B1 | 10/2005 | Williams |
| 6,967,566 B2 | 11/2005 | Weston et al. |
| 6,982,697 B2 | 1/2006 | Wilson et al. |
| 6,984,208 B2 | 1/2006 | Zheng |
| 6,990,639 B2 | 1/2006 | Wilson |
| 6,993,206 B2 | 1/2006 | Ishino |
| 6,993,451 B2 | 1/2006 | Chang et al. |
| 6,995,748 B2 | 2/2006 | Gordon et al. |
| 6,998,966 B2 | 2/2006 | Pedersen et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| 7,066,781 B2 | 6/2006 | Weston |
| 7,081,051 B2 | 7/2006 | Himoto et al. |
| 7,090,582 B2 | 8/2006 | Danieli et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| D531,228 S | 10/2006 | Ashida et al. |
| 7,115,032 B2 | 10/2006 | Cantu et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| 7,133,026 B2 | 11/2006 | Horie et al. |
| 7,136,674 B2 | 11/2006 | Yoshie et al. |
| 7,139,983 B2 | 11/2006 | Kelts |
| 7,140,962 B2 | 11/2006 | Okuda et al. |
| 7,142,191 B2 | 11/2006 | Idesawa et al. |
| 7,149,627 B2 | 12/2006 | Ockerse et al. |
| 7,154,475 B2 | 12/2006 | Crew |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| D543,246 S | 5/2007 | Ashida et al. |
| 7,220,220 B2 | 5/2007 | Stubbs et al. |
| 7,225,101 B2 | 5/2007 | Usuda et al. |
| 7,231,063 B2 | 6/2007 | Naimark et al. |
| 7,233,316 B2 | 6/2007 | Smith et al. |
| 7,236,156 B2 | 6/2007 | Liberty et al. |
| 7,239,301 B2 | 7/2007 | Liberty et al. |
| 7,261,690 B2 | 8/2007 | Teller et al. |
| 7,262,760 B2 | 8/2007 | Liberty |
| D556,201 S | 11/2007 | Ashida et al. |
| 7,292,151 B2 | 11/2007 | Ferguson et al. |
| 7,301,527 B2 | 11/2007 | Marvit |
| 7,301,648 B2 | 11/2007 | Foxlin |
| D556,760 S | 12/2007 | Ashida et al. |
| D559,847 S | 1/2008 | Ashida et al. |
| D561,178 S | 2/2008 | Azuma |

| | | |
|---|---|---|
| 7,335,134 B1 | 2/2008 | LaVelle |
| D563,948 S | 3/2008 | d'Hore |
| D567,243 S | 4/2008 | Ashida et al. |
| RE40,324 E | 5/2008 | Crawford |
| 7,379,566 B2 | 5/2008 | Hildreth |
| 7,395,181 B2 | 7/2008 | Foxlin |
| 7,414,611 B2 | 8/2008 | Liberty |
| 7,445,550 B2 | 11/2008 | Barney et al. |
| 7,488,231 B2 | 2/2009 | Weston |
| 7,500,917 B2 | 3/2009 | Barney et al. |
| 7,568,289 B2 | 8/2009 | Burlingham et al. |
| 7,582,016 B2 | 9/2009 | Suzuki |
| 7,614,958 B2 | 11/2009 | Weston et al. |
| 7,663,509 B2 | 2/2010 | Shen |
| 7,774,155 B2 | 8/2010 | Sato et al. |
| 7,775,882 B2 | 8/2010 | Kawamura et al. |
| 7,796,116 B2 | 9/2010 | Salsman |
| 7,877,224 B2 | 1/2011 | Ohta |
| 7,905,782 B2 | 3/2011 | Sawano et al. |
| 7,927,216 B2 | 4/2011 | Ikeda et al. |
| 7,931,535 B2 | 4/2011 | Ikeda et al. |
| 7,942,745 B2 | 5/2011 | Ikeda et al. |
| 2001/0008847 A1 | 7/2001 | Miyamoto et al. |
| 2001/0010514 A1* | 8/2001 | Ishino ............................ 345/158 |
| 2001/0015123 A1 | 8/2001 | Nishitani et al. |
| 2001/0024973 A1 | 9/2001 | Meredith |
| 2001/0031662 A1 | 10/2001 | Larian |
| 2001/0049302 A1 | 12/2001 | Hagiwara |
| 2002/0024500 A1 | 2/2002 | Howard |
| 2002/0024675 A1 | 2/2002 | Foxlin |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0126026 A1 | 9/2002 | Lee |
| 2002/0137567 A1 | 9/2002 | Cheng |
| 2002/0140745 A1 | 10/2002 | Ellenby et al. |
| 2002/0158843 A1 | 10/2002 | Levine et al. |
| 2002/0183961 A1 | 12/2002 | French et al. |
| 2003/0038778 A1 | 2/2003 | Noguera et al. |
| 2003/0052860 A1 | 3/2003 | Park et al. |
| 2003/0057808 A1 | 3/2003 | Lee et al. |
| 2003/0063068 A1 | 4/2003 | Anton et al. |
| 2003/0069077 A1 | 4/2003 | Korienek |
| 2003/0107551 A1 | 6/2003 | Dunker |
| 2003/0144056 A1 | 7/2003 | Leifer et al. |
| 2003/0193572 A1 | 10/2003 | Wilson et al. |
| 2003/0195041 A1 | 10/2003 | McCauley |
| 2003/0204361 A1 | 10/2003 | Townsend et al. |
| 2003/0216176 A1 | 11/2003 | Shimizu et al. |
| 2003/0222851 A1 | 12/2003 | Lai et al. |
| 2004/0028258 A1 | 2/2004 | Naimark et al. |
| 2004/0034289 A1 | 2/2004 | Teller et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0147317 A1 | 7/2004 | Ito et al. |
| 2004/0152515 A1 | 8/2004 | Wegmuller et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259651 A1 | 12/2004 | Storek |
| 2004/0268393 A1 | 12/2004 | Hunleth et al. |
| 2005/0017454 A1 | 1/2005 | Endo et al. |
| 2005/0020369 A1 | 1/2005 | Davis et al. |
| 2005/0032582 A1 | 2/2005 | Mahajan |
| 2005/0047621 A1 | 3/2005 | Cranfill |
| 2005/0054457 A1 | 3/2005 | Eyestone et al. |
| 2005/0070359 A1 | 3/2005 | Rodriquez et al. |
| 2005/0076161 A1 | 4/2005 | Albanna et al. |
| 2005/0085298 A1 | 4/2005 | Woolston |
| 2005/0125826 A1 | 6/2005 | Hunleth et al. |
| 2005/0130739 A1 | 6/2005 | Argentar |
| 2005/0134555 A1 | 6/2005 | Liao |
| 2005/0143173 A1* | 6/2005 | Barney et al. .................. 463/37 |
| 2005/0170889 A1 | 8/2005 | Lum et al. |
| 2005/0172734 A1 | 8/2005 | Alsio |
| 2005/0174324 A1 | 8/2005 | Liberty et al. |
| 2005/0176485 A1 | 8/2005 | Ueshima |
| 2005/0179644 A1 | 8/2005 | Alsio |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0215322 A1 | 9/2005 | Himoto et al. |
| 2005/0217525 A1 | 10/2005 | McClure |
| 2005/0233808 A1 | 10/2005 | Himoto et al. |
| 2005/0239548 A1 | 10/2005 | Ueshima et al. |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2006/0028446 A1 | 2/2006 | Liberty et al. |
| 2006/0030385 A1 | 2/2006 | Barnet et al. |
| 2006/0046849 A1 | 3/2006 | Kovacs |
| 2006/0092133 A1 | 5/2006 | Touma et al. |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0154726 A1 | 7/2006 | Weston et al. |
| 2006/0178212 A1 | 8/2006 | Penzias |
| 2006/0205507 A1 | 9/2006 | Ho |
| 2006/0231794 A1 | 10/2006 | Sakaguchi et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0264258 A1 | 11/2006 | Zalewski et al. |
| 2006/0264260 A1 | 11/2006 | Zalewski et al. |
| 2006/0282873 A1 | 12/2006 | Zalewski et al. |
| 2006/0287086 A1 | 12/2006 | Zalewski et al. |
| 2006/0287087 A1 | 12/2006 | Zalewski et al. |
| 2007/0015588 A1 | 1/2007 | Matsumoto et al. |
| 2007/0021208 A1 | 1/2007 | Mao et al. |
| 2007/0049374 A1 | 3/2007 | Ikeda et al. |
| 2007/0050597 A1 | 3/2007 | Ikeda |
| 2007/0052177 A1 | 3/2007 | Ikeda et al. |
| 2007/0060391 A1 | 3/2007 | Ikeda et al. |
| 2007/0066394 A1 | 3/2007 | Ikeda et al. |
| 2007/0066396 A1 | 3/2007 | Weston et al. |
| 2007/0072680 A1 | 3/2007 | Ikeda |
| 2007/0091084 A1 | 4/2007 | Ueshima et al. |
| 2007/0093291 A1 | 4/2007 | Hulvey |
| 2007/0159362 A1 | 7/2007 | Shen |
| 2007/0173705 A1 | 7/2007 | Teller et al. |
| 2007/0252815 A1 | 11/2007 | Kuo et al. |
| 2007/0265075 A1 | 11/2007 | Zalewski |
| 2007/0265076 A1 | 11/2007 | Lin et al. |

| | | | |
|---|---|---|---|
| 2007/0265088 A1 | 11/2007 | Nakada et al. | |
| 2008/0014835 A1 | 1/2008 | Weston et al. | |
| 2008/0015017 A1 | 1/2008 | Ashida et al. | |
| 2008/0039202 A1 | 2/2008 | Sawano et al. | |
| 2008/0121782 A1 | 5/2008 | Hotelling et al. | |
| 2008/0273011 A1 | 11/2008 | Lin | |
| 2008/0278445 A1 | 11/2008 | Sweetser et al. | |
| 2008/0280660 A1 | 11/2008 | Ueshima et al. | |
| 2009/0005166 A1 | 1/2009 | Sato | |
| 2009/0051653 A1 | 2/2009 | Barney et al. | |
| 2009/0124165 A1 | 5/2009 | Weston | |
| 2009/0156309 A1 | 6/2009 | Weston et al. | |

FOREIGN PATENT DOCUMENTS

| | | |
|---|---|---|
| CN | 1559644 | 1/2005 |
| DE | 03930581 | 3/1991 |
| DE | 19701344 | 7/1997 |
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 0 835 676 | 4/1998 |
| EP | 0 848 226 | 6/1998 |
| EP | 0 852 961 | 7/1998 |
| EP | 1 062 994 | 12/2000 |
| EP | 1 279 425 | 1/2003 |
| EP | 1 293 237 | 3/2003 |
| EP | 0 993 845 | 12/2005 |
| GB | 1 524 334 | 3/1977 |
| GB | 1 524 334 | 9/1978 |
| GB | 1524334 | 9/1978 |
| GB | 2 244 546 | 5/1990 |
| GB | 2 244 546 A | 5/1990 |
| GB | 2284478 | 6/1995 |
| GB | 2307133 | 5/1997 |
| GB | 2316482 | 2/1998 |
| GB | 2319374 | 5/1998 |
| JP | 60-077231 | 5/1985 |
| JP | 62-14527 | 1/1987 |
| JP | 3-74434 | 7/1991 |
| JP | 03-08103 | 8/1991 |
| JP | 3-059619 | 11/1991 |
| JP | 04-287888 | 10/1992 |
| JP | 5-056191 | 7/1993 |
| JP | 05-56191 | 7/1993 |
| JP | 2901476 | 12/1993 |
| JP | 6-50758 | 2/1994 |
| JP | 3262677 | 5/1994 |
| JP | 6-154422 | 6/1994 |
| JP | 3-00028 | 7/1994 |
| JP | 6-190144 | 7/1994 |
| JP | 06-198075 | 7/1994 |
| JP | 06-077387 | 10/1994 |
| JP | 3194841 | 10/1994 |
| JP | 6-308879 | 11/1994 |
| JP | 3273531 | 11/1994 |
| JP | 7-028591 | 1/1995 |
| JP | 3228845 | 1/1995 |
| JP | 7-44315 | 2/1995 |
| JP | 7-107573 | 4/1995 |
| JP | 7-22312 | 5/1995 |
| JP | 7-115690 | 5/1995 |
| JP | 7-146123 | 6/1995 |
| JP | 3517482 | 6/1995 |
| JP | 7-200142 | 8/1995 |
| JP | 07-262797 | 10/1995 |
| JP | 7-302148 | 11/1995 |
| JP | 7-318332 | 12/1995 |
| JP | 08-071252 | 3/1996 |
| JP | 08-71252 | 3/1996 |
| JP | 8-095704 | 4/1996 |
| JP | 8-106352 | 4/1996 |
| JP | 8-114415 | 5/1996 |
| JP | 8-122070 | 5/1996 |
| JP | 8-152959 | 6/1996 |
| JP | 8-211993 | 8/1996 |
| JP | 08-221187 | 8/1996 |
| JP | 8-305355 | 11/1996 |
| JP | 8-335136 | 12/1996 |
| JP | 83-35136 | 12/1996 |
| JP | 9-230997 | 9/1997 |
| JP | 9-274534 | 10/1997 |
| JP | 9-319510 | 12/1997 |
| JP | 10-021000 | 1/1998 |
| JP | 10-33831 | 2/1998 |
| JP | 10-99542 | 4/1998 |
| JP | 10-154038 | 6/1998 |
| JP | 10-254614 | 9/1998 |
| JP | 11-099284 | 4/1999 |
| JP | 11-114223 | 4/1999 |
| JP | 11-506857 | 6/1999 |
| JP | 2000-270237 | 9/2000 |
| JP | 2000-308756 | 11/2000 |
| JP | 2001-038052 | 2/2001 |
| JP | 2001-104643 | 4/2001 |
| JP | 2001-175412 | 6/2001 |
| JP | 3080103 | 6/2001 |
| JP | 2001-251324 | 9/2001 |
| JP | 2001-306245 | 11/2001 |
| JP | 2002-062981 | 2/2002 |
| JP | 2002-233665 | 2/2002 |
| JP | 2002-082751 | 3/2002 |
| JP | 2002-091692 | 3/2002 |
| JP | 2002-153673 | 5/2002 |
| JP | 2002-202843 | 7/2002 |
| JP | 2002-224444 | 8/2002 |
| JP | 2002-232549 | 8/2002 |
| JP | 2002-298145 | 10/2002 |
| JP | 2003-53038 | 2/2003 |
| JP | 3422383 | 6/2003 |
| JP | 2003-208263 | 7/2003 |
| JP | 2003-236246 | 8/2003 |
| JP | 2003-325974 | 11/2003 |
| JP | 2004-062774 | 2/2004 |
| JP | 2004-313429 | 11/2004 |
| JP | 2004-313492 | 11/2004 |
| JP | 2005-040493 | 2/2005 |
| JP | 2005-063230 | 3/2005 |
| JP | 2000-063230 | 10/2005 |
| JP | 2003-140823 | 4/2006 |
| JP | 2006-113019 | 4/2006 |
| JP | 2006-136694 | 6/2006 |
| JP | 2006-216569 | 4/2007 |
| JP | 2007-083024 | 4/2007 |
| JP | 2007-283134 | 11/2007 |
| NL | 9300171 | 8/1994 |
| RU | 2125853 C1 | 2/1999 |
| RU | 2126161 C1 | 2/1999 |
| RU | 2141738 C1 | 11/1999 |
| WO | 94/02931 | 2/1994 |
| WO | 96/05766 | 2/1996 |
| WO | 97/09101 | 3/1997 |
| WO | WO 9712337 | 4/1997 |
| WO | 97/17598 | 5/1997 |
| WO | 97/28864 | 8/1997 |
| WO | 97/32641 | 9/1997 |
| WO | WO 9811528 | 3/1998 |
| WO | 99/58214 | 11/1999 |
| WO | 00/33168 | 6/2000 |
| WO | 00/35345 | 6/2000 |
| WO | 00/47108 | 8/2000 |
| WO | WO 00/63874 | 10/2000 |
| WO | WO 0187426 | 11/2001 |
| WO | WO 0191042 A2 | 11/2001 |
| WO | 02/17054 | 2/2002 |
| WO | 02/34345 | 5/2002 |
| WO | 03/015005 | 2/2003 |
| WO | WO 03107260 A2 | 6/2003 |
| WO | WO 03088147 A1 | 10/2003 |
| WO | WO 2004039055 | 5/2004 |
| WO | 2004-051391 | 6/2004 |

OTHER PUBLICATIONS

Office Action issued in corresponding Japanese patent application 2007-203785 (Oct. 27, 2008).

"ASCII Grip One Handed Controller," *One Switch-ASCII Grip One Handed Playstation Controller*, http://www.oneswitch.org.uk/1/ascii/grip.htm, Jul. 11, 2008, pp. 1-2.

"Superfamicom Grip controller by ASCII," http://superfami.com/sfc_grip.html, Jul. 10, 2008, pp. 1-2.

"ASCII/Sammy Grip V2," *One Switch-Accessible Gaming Shop-ASCII Grip V2*, http://www.oneswitch.org.uk/1/AGS/AGS-onehand/ascii-grip-v2.html, Jul. 10, 2008, pp. 1-2.

Photographs of prior art ASCII Grip V2 Controller, (cited in previous IDS as: ASCII/Sammy Grip V2 One Switch-Accessible Gaming Shop-ASCII Grip V2, http://www.oneswitch.org.uk/1/AGS/AGS-onehand/ascii-grip-v2.html, Jul. 10, 2008, pp. 1-2.).

"Controllers-Atari Space Age Joystick," *AtariAge: Have You Played Atari Today?* www.atariage.com/controller_page.html?SystemID=2600&ControllerID=12.

"Controllers-Booster Grip," *AtariAge: Have You Played Atari Today?* www.atariage.com/controller_page.html?SystemID=2600&ControllerID=18.

"Coleco Vision: Super Action™ Controller Set," www.vintagecomputing.com/wp-content/images/retroscan/coleco_sac_1_large.jpg.

Electro-Plankton Weblog, http://www.tranism.com/weblog/2005/09/, "This is the Revolution, Nintendo Style," Sep. 15, 2005, 2 pgs.

Kennedy, P.J., "Hand-Held Data Input Device," *IBM Technical Disclosure Bulletin*, vol. 26, No. 11, Apr. 1984, pp. 5826-5827.

"ASCII GRIP" One-Handed Controller The Ultimate One-Handed Controller Designed for the Playstation Game Console (ASCII Entertainment 1997).

"Game Controller" Wikipedia, Aug. 19, 2005, 7 pages, http://en.wikipedia.org/w/index.php?title=Game_controller&oldid=21390758.

Dichtburn, "Camera in Direct3D" Toymaker, Mar. 5, 2005, 5 pages, http://web.archive.org/web/20050206032104/http://toymaker.info/games/html/camera.html.

Japanese Office Action dated Jan. 29, 2010.

Cyberglove/Cyberforce, Immersion, Cyberforce CyberGlove Systems "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business WIRE, Dec. 7, 2005.

Ewalt, David M., "Nintendo's Wii Is a Revolution," Review, Forbes.com (Nov. 13, 2006).

Foxlin IS-900 Motion Tracking System, Technical Overview, 10 pages, intersense.com, 1999.

Frankie, "E3 2002: Roll O Rama", IGN: Roll-o-Rama Preview, . 3 pages. E3 Demo of Kirby game ("Roll O Rama"), http://cube.ign.com/objects/482/482164.html, (May 23, 2002).

Goschy, "Midway Velocity Controller" (youtube video http://www.youtube.com/watch?v=wjLhSrSxFNw) (Sep. 8, 2007).

Hartley, Matt, "Why is the Nintendo Wii So Successful?", SMARTHOUSE—The Lifestyle Technology Guide Website (Sep. 12, 2007).

Hinckley, Ken, "Haptic Issues for Virtual Manipulation," Thesis (Dec. 1996).

Interview with Pat Goschy (youtube video http://www.youtube.com/watch?v=oKtZysYGDLE) (Jan. 14, 2008).

Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland (Sep. 10-13, 2000).

Louderback, Jim, "Nintendo Wii," Reviews by PC Magazine, (Nov. 13, 2006).

Marrin, Teresa, "Possibilities for the Digital Baton as a General-Purpose Gestural Interface," Late-Breaking/Short Talks, CHI 97 (122-27 Mar. 1997).

Marti, Gaetan et al., "Biopsy navigator: a smart haptic interface for interventional radiological gestures," Swiss Federal Institute of Technology (EPFL), Lausanne, Switzerland (2003).

Mattel Power Glove Instructions, Licensed by Nintendo for play on Nintendo Entertainment System (1989).

Office Action issued in related Japanese patent application 2006-216569 (Oct. 20, 2009).

Ogawa et al., "Wii are the Elite," GameSpot web site (Feb. 5, 2008).

Paley, W. Bradford, "Interaction in 3D Graphics," SIGGRAPH Computer Graphics Newsletter, Cricket input device (Nov. 1998).

Pc World, "The 20 Most Innovative Products of the Year" (Dec. 27, 2006).

Press Release, "Logitech's Wingman Cordless RumblePad Sets PC Gamers Free," http://www.logitech.com/index.cfm/172/1373&cl=nz,en (Sep. 2, 2001).

Riviere, Cameron, Testimony, Trial Day 5, In the Matter of Certain Video Game Machines and Related Three-Dimensional Pointing Devices, ITC Investigation No. 337-TA-658 (May 15, 2009).

Sulic, Ivan, "Logitech Wingman Cordless Rumblepad Review", Review at IGN, 4 pages, Jan. 14, 2002.

Traq 3D (Trazer) Product, http://www.exergamefitness.com/traq_3d.htm, http://www.trazer.com/, http://www.traq3d.com/ (1997).

Ulanoff, Lance, "Nintendo's Wii is the Best Product Ever," PC Magazine (Jun. 21, 2007).

Williams, Robert L. et al., "Implementation and Evaluation of a Haptic Playback System," vol. 3 No. 3, Haptics-e (2004).

Williams, Robert L. et al., "The Virtual Haptic Back Project," Presented at the IMAGE 2003 Conference, Scottsdale, Arizong (Jul. 14-18, 2003).

"Self-Contained, Free Standing "Fishing Rod" Fishing Games," Miacomet and Interact Announce Agreement to Launch Line of Reel Feel™ Sport Controllers, Press Release, May 13, 1999, 4 pages.

"Get Bass", Videogame by Sega (1998), The International Arcade Museum and the KLOV, 1998, 4 pages.

"Electronic Plastic: BANDAI—Power Fishing", "Power Fishing Company: BANDAI", 1984, 1 page, http:/www.handhelden.com/Bandai/PowerFishing.html.

"At-home fishing" 1 page, Dec. 1996-1999.

Bass Fishing "Legends of the Lake", Radica 2 pages, 2002.

ACT LABS: Miacomet Background, 1 page, May 1999, http://www.act-labs.com/realfeel_background/htm.

Fishing Games: The Evolution of Virtual Fishing Games and related Video Games/Computer Games, 15 pages, 2003.

Zhai, "User Performance in Relation to 3D Input Device Design", Computer Graphics 32(4), Nov. 1998, 15 pages.

Traq 3D, "Healthcare" 1 pages, //www.traq3d.com/Healthcare/Healthcare.aspx, 1997.

Foxlin, "IS-900 Motion Tracking System, Technical Overview", 10 pages, intersense.com, 1999.

Marti et al., "Biopsy navigator: a smart haptic interface for interventional radiological gestures", International Congress Series, vol. 1256, Jun. 2003, 6 pages.

Kunz et al., "Design and Construction of a new Haptic Interface" Proceedings of DETC '00, 6 pages, Sep. 10-13, 2000.

Hinckley, "Haptic Issues for Virtual Manipulation: A Dissertation", Presented to the Faculty of the School of Engineering and Applied Science at the University of Virginia, Dec. 1996, 216 pages.

Williams et al., "Implementation and Evaluation of a Haptic Playback System," vol. 3, No. 3, Haptics-e, 2004, 6 pages.

Williams et al., "The Virtual Haptic Back Project", presented at the IMAGE 2003 Conference, Jul. 14-18, 2003, 8 pages.

Frankie, "E3 2002: Roll O Rama", May 2002, IGN: Roll-o-Rama Preview, . http://cube.ign.com/articles/360/360662p1.html, 2 pages.

"Glove-based input interfaces", Cyberglove/Cyberforce, Jun. 1991, 12 pages, http://www.angelfire.com/ca7/mellott124/glove1.htm.

"LPC2104/2105/2106, Single-chip 32-bit microcontrollers; 128 kB ISP/IAP Flash with 64 kB/32 kB/16 kB RAM", Phillips, Dec. 22, 2004; 32 pages.

"MEMS enable smart golf clubs" Small Times—MEMS enable smart golf clubs, Jan. 6, 2005, 2 pages.

Swisher "How Science Can Improve Your Golf Game, Your Club is Watching" The Wall Street Journal, Apr. 18, 2005, 1 page.

Smartswing internal drawing, 1 page.

Regan, "Smart Golf Clubs", The Baltimore Sun, Jun. 17, 2005, 1 page.

FrontSide Field Test, "Get This!", Golf Magazine, Jun. 2005, p. 36.

Achenbach, "Golf's New Measuring Stick," Golfweek, Jun. 11, 2005, 1 page.

Training Aid, SmartSwing, PGA Magazine, Apr. 2005, p. 46.

Sulic, "Logitech Wingman Cordless Rumblepad Review", Review at IGN, 4 pages, Jan. 14, 2002.

Marrin, "Possibilities for the Digital Baton as a General-Purpose Gestural Interface", Late-Breaking/Short Talks, CHI 97, Mar. 22-27, 1997 (pp. 311-312).

Office Action (Non-Final) issued in U.S. Appl. No. 11/446,188 (Apr. 30, 2008).

Office Action (Non-Final) issued in U.S. Appl. No. 11/532,328 (Nov. 25, 2008).

Office Action (Final) issued in U.S. Appl. No. 11/446,188 (Feb. 27, 2009).

Office Action (Non-Final) issued in U.S. Appl. No. 11/446,188 (Oct. 21, 2009).

Office Action (Final) issued in U.S. Appl. No. 11/532,328 (Oct. 6, 2009).

Office Action (Examiner-Initiated Interview Summary) issued in U.S. Appl. No. 11/446,187 (Oct. 26, 2009).

Office Action (Non-Final) issued in U.S. Appl. No. 11/404,871 (Sep. 30, 2009).

Office Action (Final) issued in U.S. Appl. No. 11/404,871 (Mar. 18, 2009).

Office Action (Non-Final) issued in U.S. Appl. No. 11/404,871 (Sep. 4, 2008).

Office Action (Non-Final) issued in U.S. Appl. No. 11/790,780 (Mar. 12, 2010).

Office Action (Non-Final) issued in U.S. Appl. No. 12/222,787 (Feb. 5, 2010).

Briefs (New & Improved) (Brief Article), PC Magazine, Oct. 26, 1993.

Foremski, T. "Remote Control Mouse Aims At Interactive TV," Electronics Weekly, Mar. 9, 1994.

Gelmis, J.; "Ready to Play, The Future Way," Jul. 23, 1996, Buffalo News.

Ji, H. "Study on the Infrared Remote-Control Lamp-Gesture Device," Yingyong Jiguang/Applied Laser Technology, v 17, n 5, p. 225-227, Oct. 1997 Language: Chinese-Abstract only.

Maggioni, C., "A Novel Gestural Input Device for Virtual Reality," IEEE Virtual Reality Annual International Symposium (Cat. No. 93CH3336-5), 118-24, 1993.

Morgan, C. "Still chained to the overhead projector instead of the podium? (TV Interactive Corp's LaserMouse Remote Pro infrared mouse) (Clipboard) (Brief Article) (Product Announcement)", Government Computer News, Jun. 13, 1994).

Sega/Sports Sciences Inc., "Batter Up, It's a Hit," Instruction Manual, Optional Equipment Manual (1994).

Sega/Sports Sciences Inc., "Batter Up, It's a Hit," photos of baseball bat (1994).

Templeman, James N., "Virtual Locomotion: Walking in Place through Virtual Environments," Presence, vol. 8 No. 6, pp. 598-617, Dec. 1999.

U.S. Appl. No. 11/745,842, May 2007, Ashida et al.

AirPad Controller Manual (AirPad Corp. 2000).

Physical Product: Airpad Motion Reflex Controller for Sony Playstation, (AirPad Corp. 2000).

Office Action issued in Taiwanese Patent Appl No. 10021121610 on Dec. 14, 2011.

Office Action/Search Report issued in Taiwanese Patent Appl No. 10021121610 on Dec. 14, 2011.

European Search Report for Application No. EP 10178309.0, Apr. 2, 2011.

U.S. Appl. No. 11/745,842, filed May 8, 2007.

U.S. Appl. No. 11/404,871, filed Apr. 17, 2006.

U.S. Appl. No. 11/404,844, filed Apr. 17, 2006.

U.S. Appl. No. 11/790,780, filed Apr. 27, 2007.

U.S. Appl. No. 12/889,863, filed Sep. 24, 2010.

U.S. Appl. No. 13/028,648, filed Feb. 16, 2011.

U.S. Appl. No. 13/071,008, filed Mar. 24, 2011.

Japanese Office Action issued in JP 2005-249265 dated Apr. 21, 2011.

English Abstract for Japanese Patent No. JP10021000, published Jan. 23, 1998.

English Abstract for Japanese Patent No. JP11053994, published Feb. 26, 1999.

English Abstract for Japanese Patent No. JP11099284, published Apr. 13, 1999.

English Abstract for Japanese Patent No. JP2001038052, published Feb. 13, 2001.

English Abstract for Japanese Patent No. JP2002224444, published Aug. 13, 2002.

English Abstract for Japanese Patent No. JP2006136694, published Jun. 1, 2006.

English Abstract for Japanese Patent No. WO9732641, published Sep. 12, 1997.

Asciistick, picture of one-handed controller, 2 pages (Feb. 6, 2006).

Ashida et al., entitled, "Game Controller," U.S. Appl. No. 11/790,780, filed Apr. 27, 2007, pending.

CNET News.com, http://news.com.com/2300-1043_3-6070295-2.html?tag=ne.gall.pg, "Nintendo Wii Swings Into Action," May 25 2006, 1pg.

European Search Report for Application No. EP 07 11 2880 on Oct. 18, 2007 in Munich.

Foley et al., "Computer Graphics: Principles and Practice," Second Edition, 1990.

Fuchs, "Inertial Head-Tracking," Massachusetts Institute of Technology, Sep. 1993.

Geen et al., "Ready to lay, The Future Way," Jul. 23, 1996, Buffalo News.

Grewal et al., "Global Positioning Systems, Inertial Navigation and Integration," 2001.

HiBall-3100—"Wide-Area, High-Precision Tracker and 3D Digitizer," www.3rdtech.com/HiBall.htm 4 pages.

Hinckley, et al., "A Survey of Design Issues in Spatial Input," Proceedings of the ACM Symposium on User Interface Software and Technology (1994).

Ikeda et al., entitled, "Game Operating Device," U.S. Appl. No. 11/446,187, filed Jun. 5, 2006 allowed.

Ikeda et al., entitled, "Game Operating Device," U.S. Appl. No. 11/446,188, filed Jun. 5, 2006 allowed Intersense, InterSense IS 900 Technical Overview—Motion Tracking System, 1999.

Kalawsky, "The Science of Virtual Reality and Virtual Environments," 1993.

Markey et al., "The Mechanics of Inertial Position and Heading Indication," Massachusetts Institute of Technology, 1961.

Mosely, "Low Budget Inertial Navigation Platform (2000)," www.tmoser.ch/typo3/11.0.html, Oct. 2008.

Office Action issued Aug. 23, 2010 in U.S. Appl. No. 11/488,135.

OLPC, "One Laptop Per Child," wiki.laptop.org/go/One_Laptop_per_Child.

Robotics Research Group, "Robot Design: Robot Manual Controller Design," The University of Texas of Austin, May 2009.

Sawada et al., "A Wearable Attitude-Measurement System Using a Fiberoptic Gyroscope" Massachusetts Institute of Technology, vol. 11, No., Apr. 2002, pp. 109-118.

Schmorrow et al., "The PSI Handbook of Virtual Environments for Training and Education," vol. 1, 2009.

Screen Shot of Brave Spirits (1998 ).

Timmer, et al., Cross-Spectral Analysis of Physiological Tremor and Muscle Activity: I Theory and Application to unsynchronized electromyogram, vol. 78 (1998).

VR Solutions, "IS-1200", www.vrs.com.au/motion-tracking/intersense/is-1200.html 2 pages.

Japanese Office Action issued in JP 2005-256858 dated Apr. 22, 2011.

Office Action issued in U.S. Appl. No. 12/285,812 on Nov. 9, 2011.

Airpad Motion Reflext Controller for Sony Playstation—Physical Product (AirPad Corp.2000).

Bowman,. et al., "An Introduction to 3-D User Interface Design," MIT Presence, vol. 10, No. 1, pp. 96-108 (2001).

Brownell, Richard: Review of Peripheral-GameCube-G3 Wireless Controller, GAF, Jul. 17, 2003, 2 pages.

Buchanan, Levi: "Happy Birthday, Rumble Pak," IGN.com, Apr. 3, 2008, 2 pages.

Buxton et al., "A Study in Two-Handed Input," ACM CHI '86 Proceedings (1986).

"Coleco Vision: Super Action™ Controller Set," www.vintagecomputing.com/wp-content/images/restroscan/coleco_sac_1_large.jpg.

Computer Mouse (Wikipedia) Jul. 5, 2005).
Rossan, A. et al.: A General Purpose Control-Based Trajectory Playback for Force-Feedback Systems, University of Glasgow, Dept. Computing Science, 4 pages.
European Search Report for Application No. EP 07 11 2880 on Oct. 18, 2007, in Munich.
Fielder, Lauren: "E3 2001: Nintendo unleashes GameCube software, a new Miyamoto game, and more," GameSpot, May 16, 2001, 2 pages, http://www.gamespot.com/downloads/2761390.
Furniss, Maureen, "Motion Capture," MoCap MIT (Dec. 1999) 12 pages.
"Game Controller" Wikipedia, Jan. 5, 2005.
Gamecubicle, Jim-New Contributor, Nintendo WaveBird Control, http://www.gamecubicle.com/news-ninetendo_gamecube_wavebird_controller.htm, May 14, 2002.
Gyration, Inc., GyroRemote and Mobile RF Keyboard User Manual, Saratoga, CA 24 pages, www.gyration.com.
Gyration, Inc., GyroRemote GP240-01 Professional Series, copyrighted 2003, www.gyration.com.
Gyration Ultra Cordless Optical Mouse, Setting Up Ultra Mouse, Gyration Quick Start Card part No. DL00071-0001 Rev. A. Gyration, Inc. (Jun. 2003).
Gyration Ultra Cordless Optical Mouse, User Manual, 1-15, Gyration, Inc., Saratoga, CA (2003).
Hinckley Synchronous Gestures Device, Oct. 12-15, 2003, Microsoft Research, USA.
Hinkley et al. Stitching: pen guestures that spam multiple displays, 2004.
Hinkley et al.: Synchronomous gestures for multiple persons and computers, 2003.
Holden, Maureen K., et al.: Use of Virtual Environments in Motor Learning and Rehabilitation Department of Brain and Cognitive Sciences, Handbook of Virtual Environments: Design, Implementation, and Applications, Chap. 49, pp. 999-1026, Stanney (ed), Lawrence Erlbaum Associates 2002.
House, Matthew, Product Description: Hot Wheels Stunt Track Driver, Hot Wheels.
Immersion CyberGlove product, Immersion Corporation, 1990, http://www.cyberglovesystem.com.
Intersense, "Technical Overview IS-900 Motion Tracking System" www.isense.com, Apr. 2004.
Intersense, "IS-900 Precision Motion Trackers" www.isense.com May 16, 2003.
Intersense, "InterSence Inc., The New Standard in Motion Tracking" www.isense.com Mar. 27, 2004.
Intersense, "IS-900 Precision Motion Trackers" www.isense.com Sep. 10, 2002.
Intersense, "InterSense IS-1200 FlightTracker Prototype Demonstration" (Video) (Nov. 2004) http://www.youtube.com/watch?v=tt1Eun-7xwY&feature=bf_next &list=PLBCB5A48F496ED83F&index=3.
Kohler, "Triumph of the Wii: How Fun Won Out in the Console Wars," www.wired.com/print/gaming/hardware/news/2007/06/wii.
Leganchuk et al., "Manual and Cognitive Benefits of Two-Handed Input: An Experimental Study," ACM Transactions on Computer-Human Interaction, vol. 5, No. 4, pp. 326-359 (Dec. 1998).
Logitech WingMan Cordless Rumblepad, Logitech, Press Release Sep. 2, 2001, 2 pages.
MacLean, Karen, Publications and patents, bibliography.
Marrin, Teresa et al.: "The Digital Baton: a Versatile Performance Instrument" (1997).
Marrin, Teresa: "Toward an Understanding of Musical Gesture: Mapping Expressive Intention with the Digital Baton" (1996).
Arti, Gaetan et al., "Biopsy navigator: a smart haptic interface for interventional radiological gestures," Swiss Federal Institute of Technology (EPFL), Lausanne, Switzerland (2003).
Merians, Alma S. et al.: "Virtual Reality-Augmented Rehabilitation for Patients Following Stroke," Physical Therapy, vol. 82, No. 9 (Sep. 2002).
Nintendo Wavebird Controller, Nintendo, Jun. 2002 Wikipedia Article, http://enwikipedia.org/wiki/WaveBird.
Nintendo, Nintendo Entertainment System Consumer Information and Precautions Booklet, Ninendo of America, Inc. 1992.
Nintendo, Nintendo Entertainment System Instruction Nintendo of America, Inc. 1992.
Nintendo, Nintendo Entertainment System Booth 2002.
Nintendo, Nintendo Entertainment System Layout, May 9, 2002.
Nintendo, Nintendo Feature: History of Pokeman Part 2, Official Nintendo Magazine May 17, 2009, http:///www.officialnintendomagazine.co.uk/article.php?id=8576.
Nintendo Game Boy, Consumer Information and Precautions Booklet, Nintendo, Jul. 31, 1969.
PAD-Controller and Memory I/F in Playstation (Apr. 17, 1995; Jan. 12, 2002).
Paradiso, Joseph A., "The Brain Opera Technology: New Instruments and Gestural Sensors for Musical Interaction and Performance" (Nov. 1998) ("Brain Opera Article").
Perry Simon: "Nintendo to Launch Wireless Game Boy Adaptor," Digital Lifestyles, Sep. 26, 2003 http://digital-lifestyles.info/2003/09/26/nintendo-to-launch-wireless-game-boy-adaptor/.
Pokeman Pinball Game, 1999, Wikipedia Article, http://en.wikipedia.org/wiki/Pok?C3?A9mon_Pinball.
Polhemus: "FASTRAK, The Fast and Easy Digital Tracker" copyrighted 2001, Coldiester, Vermont 2 pages.
PowerGlove product Program Guide, Mattel, 1989.
PowerGlove product, Mattel, 1989 Wikipedia Article.
PowerGlove and Nintendo product photo, Mattel, 1989.
PowerGlove product, Instructions, Mattel, 1989.
Satterfield, Shane, E3 2002: Nintendo announces new GameCube games, GameSpot, May 21, 2002, http://wwwgamespot.com/gamecube/action/rollarama/new.html?sid=2866974&com_act-convert&om_clk=nesfeatures&tag=newsfeatures%Btitle%3B.
Serial Communication (Wikipedia) (Jul. 2, 2005).
Smartswing, Smartswing, Inc., Apr. 2005, Austin, Texas.
Smartswing: "Register to be notified when Smartswing products are available for purchase," 3 pages, May 2004, retrieved May 19, 2009, http://web.archive.org/web/20040426182437/www.smartswing-golf.com/.
Smartswing: "SmartSwing: Intellegent Golf Clubs that Build a Better Swing," 2 pages, 2004 retrieved May 19, 2009, http://web.archive.org/web/20040728221951/http://www.smartswinggolf . . .
Smartswing: "The SmartSwing Learning System Overview," 3 pages, 2004, retrieved May 19, 2009, http://web.archive.org/web/20040810142134/http://www.smartswinggolf.com/t . . .
Smartswing: "The SmartSwing Product, 3 pages, 2004, retrieved May 19, 2009, http://web.archive.org/web/200400403204628/http://www.smartswinggolf.com/ . . . "
Smartswing: The SmartSwing Product Technical Product: Technical Information, 1 page, 2004, retrieved May 19, 2009, http://web.archive.org/web/200400403205906/http://www.smartswinggolf.com/ . . .
Translation of the brief of BigBen of Oct. 27, 2010 and original German text (Nov. 3, 2010).
Translation of the brief of System Com 99 of Oct. 27, 2010 and original German text.
Translation of Exhibit B-B01: Cancellation Request of BigBen of Oct. 15, 2010 against German utility model 20 2006 020 818 (UM1) (Oct. 15, 2010) and original German text.
Translation of Exhibit B-C01: Cancellation Request of BigBen of Oct. 15, 2010 against German utility model 20 2006 020 819 (UM2) (Oct. 15, 2010) and original German text.
Translation of Exhibit B-D01: Cancellation Request of BigBen of Oct. 15, 2010 against German utility model 20 2006 020 820 (UM3) (Oct. 15, 2010) and original German text.
Translation of Opposition Brief of BigBen of Sep. 2, 2010 Against European Patent No. EP 1854518.
Transmission Mode (Apr. 22, 1999).
VTI, Mindflux-VTi CyberTouch, 1996, http://www.mindflux.com.au/products/vti/cybertouch.html.
Villoria, Gerald, Hands on Roll-O-Rama Game Cube, Game Spot, May 29, 2002, http://www.gamespot.com/gamecube/action/rollorama/news.html?sid=2868421&com_act=convert&om_clk=news features&tag=newsfeatures;title;1&m.
Virtual Fishing, Operational Manual, 2 pages, Tiger Electronics, Inc., 1998.

Virtual Technologies, Inc., Cyberglove brochure, Palo Alto, CA, www.virtex.com.

Wiley, M.: "Nintendo Wavebird Review," US, Jun. 11, 2002, 21 pages.

Wired Glove, Wikipedia Article, 4 pages, http://en.wikipedia.org/wiki/Wired_glove.

Wireless (Wikipedia) (Aug. 12, 2005).

www.3rdtech.com (2000-2006).

Office Action issued in related Chinese patent application 200610111559.7 (Sep. 18, 2009).

Office Action issued in corresponding Japanese patent application 2008-256858 (Sep. 9, 2010).

Notice of Allowance issued on Feb. 22, 2011 in U.S. Appl. No. 11/446,188.

Notice of Allowance issued on Apr. 15, 2010 in U.S. Appl. No. 11/532,328.

Office Action issued Oct. 19, 2010 in U.S. Appl. No. 11/446,187.

Office Action issued Aug. 19, 2009 in U.S. Appl. No. 11/446,187.

Office Action issued Apr. 29, 2009 in U.S. Appl. No. 11/446,187.

Office Action issued Feb. 26, 2009 in U.S. Appl. No. 11/446,187.

Office Action issued Jul. 1, 2008 in U.S. Appl. No. 11/404,871.

Office Action issued Jun. 14, 2010 in U.S. Appl. No. 11/404,871.

Office Action issued Sep. 1, 2010 in U.S. Appl. No. 11/790,780.

Notice of Allowance issued May 21, 2010 in U.S. Appl. No. 12/222,787.

Office Action issued Apr. 21, 2010 in U.S. Appl. No. 11/488,135.

Notice of Allowance issued Sep. 14, 2010 in U.S. Appl. No. 11/764,409.

Office Action issued Jan. 6, 2010 in U.S. Appl. No. 11/764,409.

Office Action issued Feb. 20, 2009 in U.S. Appl. No. 11/764,409.

Office Action issued Oct. 6, 2010 in U.S. Appl. No. 11/404,844.

Office Action issued Sep. 18, 2009 in U.S. Appl. No. 11/404,844.

Office Action issued Jan. 29, 2009 in U.S. Appl. No. 11/404,844.

Office Action issued Sep. 4, 2008 in U.S. Appl. No. 11/404,844.

Office Action issued May 3, 2010 in U.S. Appl. No. 11,598,787.

Office Action issued Jan. 27, 2011 in U.S. Appl. No. 11/504,086.

Examiner's Answer issued Feb. 22, 2011 in U.S. Appl. No. 11/404,871.

European Examination Report issued in EP Application No. 10176870.3 on Aug. 9, 2011.

You et al., Fusion of Vision and Gyro Tracking for Robust Augmented Reality Registration, Proceedings of the Virtual Reality 2001 Conference, 2001, 1-8.

Acar, "Robust Micromachined Vibratory Gyroscopes" Dissertation (Dec. 2004).

Acar, et al., "Experimental evaluation and comparative analysis of commercial variable-capacitance MEMS accelerometers," *Journal of Micromechanics and Microengineering*, vol. 13 (1), pp. 634-645 (May 2003).

Agard, Agard, "Advances in Strapdown Inertial Systems," Lecture Series Advisory Group for Aerospace Research and Development Neuilly-Sur-Seine (France) (1984).

Albrecht, "An Adaptive Digital Filter to Predict Pilot Head Look Direction for Helmet-mounted Displays," MS Thesis University of Dayton (copy unavailable) (1989).

Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).

Algrain, et al., "Accelerometer Based Line-of-Sight Stabilization Approach for Pointing and Tracking System," Second IEEE Conference on Control Applications, vol. 1, Issue 13-16 pp. 159-163 (Sep. 1993).

Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).

Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).

Allen, et al., "Tracking: Beyond 15 Minutes of Thought," SIGGRAPH 2001 Course 11 (Course Pack) from Computer Graphics (2001).

Alves, "Extended Kalman filtering applied to a full accelerometer strapdown inertial measurement unit," M.S. Thesis Massachusetts Institute of Technology. Dept. of Aeronautics and Astronautics, Santiago (1992).

Analog Devices "ADXL50 Single Axis Accelerometer" (Data Sheet), http://www.analog.com/en/obsolete/adxl50/products/product.html (Mar. 1996).

Analog Devices "ADXL202E Low-Cost ±2 g Dual-Axis Accelerometer with Duty Cycle Output" (Data Sheet), Rev. A (2000).

Analog Devices "ADXL330 Small, Low Power, 3-Axis ±2 g iMEMS Accelerometer" (Data Sheet), Rev. PrA (2005).

Analog Devices "ADXRS150 ±150°/s Single Chip Yaw Rate Gyro with Signal Conditioning" (Data Sheet), Rev. B (2004).

Analog Devices "ADXRS401 ±75°/s Single Chip Yaw Rate Gyro with Signal Conditioning" (Data Sheet), Rev. O (2004).

Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).

Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).

Apostolyuk, Vladislav, "Theory and design of micromechanical vibratory gyroscopes," MEMS/NEMS Handbook, Springer, 2006, vol. 1, pp. 173-195 (2006).

Arcanatech, IMP (Photos) (1994).

Arcanatech, "IMP User's Guide" (1994).

Ascension Technology, The Bird 6D Input Devices (specification) (1998).

Ator, "Imase-Velocity with Parallel-Slit Reticles," Journal of the Optical Society of America (Dec. 1963).

Azarbayejani, et al, "Real-Time 3-D Tracking of the Human Body," Proceedings of IMAGE'COM 96 (1996).

Azarbayejani, et al., "Visually Controlled Graphics," IEEE Transactions on Pattern Analysis and Machine Intelligence, vol. 15, No. 6, pp. 602-605 (Jun. 1993).

Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).

Azuma et al., "Making Augmented Reality Work Outdoors Requires Hybrid Tracking, "Proceedings of the International Workshop on Augmented Reality, San Francisco, CA, Nov. 1, 1998, Bellevue, Washington, pp. 219-224 (1999).

Azuma, "Predictive Tracking for Augmented Reality," Ph.D. Dissertation, University of North Carolina at Chapel Hill (1995).

Azuma, et al., "A Frequency-Domain Analysis of Head-Motion Prediction," Proceedings of SIGGRAPH '94, pp. 401-408 (1995).

Azuma, et al., "A motion-stabilized outdoor augmented reality system," Proceedings of IEEE Virtual Reality '99, Houston, TX (Mar. 1999).

Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).

Bachmann et al., "Orientation Tracking for Humans and Robots Using Inertial Sensors" (CIRA '99), Naval Postgraduate School, Monterey, CA (1999).

Bachmann, "Inertial and Magnetic Angle Tracking of Limb Segments for Inserting Humans into Synthetic Environments," Dissertation, Naval Postgraduate School, Monterey, CA (Dec. 2000).

Baker et al., "Active Multimodal Control of a Floppy Telescope Structure," Proc. SPIE, vol. 4825, 74 (Mar. 2003).

Balakrishnan, "The Rockin' Mouse: Integral 3D Manipulation on a Plane," (CHI '97), Univ. Toronto, 1997.

Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-544 (ACM) (Apr. 5-10, 2003).

Baraff, "An Introduction to Physically Based Modeling," SIGGRAPH 97 Course Notes (1997).
Baudisch, et al., "Soap: a pointing device that works in mid-air" Proc. UIST (2006).
BBN Report, "Virtual Environment Technology for Training (VETT)," The Virtual Environment and Teleoperator Research Consortium (VETREC) (Mar. 1992).
Behringer, "Improving Registration Precision Through Visual Horizon Silhouette Matching," Proceedings of the international workshop on Augmented reality: placing artificial objects in real scenes: placing artificial objects in real scenes, Bellevue, Washington, United States pp. 225-232 (1999).
Behringer, "Registration for Outdoor Augmented Reality Applications Using Computer Vision Techniques and Hybrid Sensors," Virtual Reality, 1999 Proceedings., IEEE Computer Society, pp. 244-261 (1999).
BEI, "BEI GyrochipTM Model QRS11 Data Sheet," BEI Systron Donner Inertial Division, BEI Technologies, Inc., (Sep. 1998).
BEI Systron Donner Inertial Division, Gyrochip Theory of Operation (copy unavailable) (2001).
Benbasat, "An Inertial Measurement Unit for User Interfaces," Massachusetts Institute of Technology Dissertation, (Sep. 2000).
Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).
Beuter, A., Publications, University of Quebec at Montreal, http://www.er.uqam.ca/nobel/r11040/publicat.htm (Aug. 2007).
BGM-109 Tomahawk, http://en.wikipedia.org/wiki/BGM-109_Tomahawk, Wikipedia, Jan. 2009.
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech." Inc. Article (Jun. 1992).
Bishop, "The Self-Tracker: A Smart Optical Sensor on Silicon," Ph.D. Dissertation, Univ. of North Carolina at Chapel Hill (1984).
Bishop, et al., "Grids Progress Meeting" (Slides), University of North Carolina at Chapel Hill, NC, (1998).
Bishop, et al., Self-Tracker: Tracking for Hybrid Environments without Infrastructure (1996).
Bona, et al., "Optimum Reset of Ship's Inertial Navigation System," IEEE Transactions on Aerospace and Electronic Systems (1965).
Borenstein, et al., "Where am I? Sensors and Methods for Mobile Robot Positioning" (1996).
Boser, "3-Axis Accelerometer with Differential Sense Electronics," http://www.eecs.berkeley.edu/~boser/pdf/3axis.pdf (1997).
Boser, "Accelerometer Design Example: Analog Devices XL-05/5," http://www.eecs.berkeley.edu/~boser/pdf/xl05.pdf (1996).
Bowman et al., 3D User Interfaces: Theory and Practice, Addison-Wesley, Inc., (2005).
Bowman, et al., "An Introduction to 3-D User Interface Design," MIT PRESENCE vol. 10, No. 1, pp. 96-108 (2001).
Britton et al., "Making Nested rotations Convenient for the User," ACM SIGGRAPH Computer Graphics, vol. 12, Issue 3, pp. 222-227 (Aug. 1978).
Britton, "A Methodology for the Ergonomic Design of Interactive Computer Graphic Systems, and its Application to Crystallography" (UNC Thesis) (1977).
Business Wire, "Feature/Virtual reality glasses that interface to Sega channel," Time Warner, TCI: project announced concourrent with COMDEX (Nov. 1994).
Business Wire, "Free-space 'Tilt' Game Controller for Sony Playstation Uses Scenix Chip; SX Series IC Processes Spatial Data in Real Time for On-Screen" (Dec. 1999).
Business Wire, "InterSense Inc. Launches InertiaCube2—The World's Smallest Precision Orientation Sensor With Serial Interface" (Aug. 14, 2001).
Business Wire, "Logitech MAGELLAN 3D Controller," Logitech (Apr. 1997).
Business Wire, "Mind Path Introduces GYROPOINT RF Wireless Remote" (Jan. 2000).
Business Wire, "Pegasus' Wireless PenCell Writes on Thin Air with ART's Handwriting Recognition Solutions," Business Editors/High Tech Writers Telecom Israel 2000 Hall 29, Booth 19-20 (Nov. 2000).
Business Wire, "RPI ships low-cost pro HMD Plus 3D Mouse and VR PC graphics card system for CES" (Jan. 1995).
Buxton, Bill, "Human input/output devices," In M. Katz (ed.), Technology Forecast: 1995, Menlo Park, C.A.: Price Waterhouse World Firm Technology Center, 49-65 (1994).
Buxton, Bill, A Directory of Sources for Input Technologies, http://www.billbuxton.com/InputSources.html, Apr. 2001 (last update 2008).
Byte, "Imp Coexists With Your Mouse," What's New, ArcanaTec (Jan. 1994).
Canaday, R67-26 "The Lincoln Wand," IEEE Transactions on Electronic Computers, vol. EC-16, No. 2, p. 240 (Apr. 1967).
Caruso et al., "New Perspective on Magnetic Field Sensing," Sensors Magazine (Dec. 1998).
Caruso et al., "Vehicle Detection and Compass Applications using AMR Magnetic Sensors," Honeywell (May 1999).
Caruso, "Application of Magnetoresistive Sensors in Navigation Systems," Sensors and Actuators, SAE SP-1220, pp. 15-21 (Feb. 1997).
Caruso, "Applications of Magnetic Sensors for Low Cost Compass Systems," Honeywell, SSEC, http://www.ssec.honeywell.com/magnetic/datasheets/lowcost.pdf (May 1999).
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with large-scale display systems using infrared laser tracking devices," ACM International Conference Proceeding Series; vol. 142 (2003).
Cho, et al., "*Magic Wand*: A Hand-Drawn Gesture Input Device in 3-D Space with Inertial Sensors," Proceedings of the 9th Intl Workshop on Frontiers in Handwriting Recognition (IWFHR-9 2004), IEEE (2004).
Computergram, "RPI Entertainment Pods Improve Virtual Experience" (1995).
Cooke, et al., "NPSNET: flight simulation dynamic modeling using quaternions," Presence, vol. 1, No. 4, pp. 404-420, MIT Press (1992/1994).
CSIDC Winners—Tablet-PC Classroom System Wins Design Competition, IEEE Computer Society Press, vol. 36 , Issue 8, pp. 15-18 , IEEE Computer Society (Aug. 2003).
Cutrone, "Hot products: Gyration GyroPoint Desk, GyroPoint Pro gyroscope-controlled wired and wireless mice" (Computer Reseller News) (Dec. 1995).
Cutts, "A Hybrid Image/Inertial System for Wide-Area Tracking" (Internal to UNC-CH Computer Science) (Jun. 1999).
Deruyck, et al., "An Electromagnetic Position Sensor," Polhemus Navigation Sciences, Inc., Burlington, VT (Nov. 1973.).
Donelson, et al., "Spatial Management of Information" (1978).
Eiβele, "Orientation as an additional User Interface in Mixed-Reality Environments," 1 workshop Ervwiterte und Virtuelle Realität, pp. 79-90. GI-Fachgruppe AR/VR (2007).
Enura, et al., "Sensor Fusion Based Measurement of Human Head Motion," 3rd IEEE International Workshop on Robot and Human Communication (Jul. 1994).
Ferrin, "Survey of Helmet Tracking Technologies," Proc. SPIE vol. 1456, p. 86-94 (Apr. 1991).
Foxlin et al., "An Inertial Head-Orientation Tracker with Automatic Drift Compensation for Use with HMD's," Proceedings of the conference on Virtual reality software and technology, Singapore, Singapore, pp. 159-173 (1994).
Foxlin et al., "Miniature 6-DOF Inertial System for Tracking HMDs," SPIE vol. 3362 (Apr. 1998).
Foxlin et al., "Miniaturization, Calibration & Accuracy Evaluation of a Hybrid Self-Tracker," The Second IEEE and ACM International Symposium on Mixed and Augmented Reality, pp. 151-160 2003.
Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).

Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).

Foxlin, "Generalized architecture for simultaneous localization, auto-calibration, and map-building," IEEE/RSJ Conf. on Intelligent Robots and Systems, Lausanne, Switzerland (Oct. 2002).

Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000 (2000).

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Foxlin, "Inertial Head-Tracking," MS Thesis, Massachusetts Institute of Technology, Dept. of Electrical Engineering and Computer Science (Sep. 1993).

Foxlin, "Motion Tracking Requirements and Technologies," Chapter 7, from Handbook of Virtual Environment Technology, Stanney Kay, Ed. (2002).

Foxlin, "Pedestrian Tracking with Shoe-Mounted Inertial Sensors," IEEE Computer Graphics and Applications, vol. 25, No. 6, pp. 38-46 (Nov. 2005).

Foxlin, et al., "Constellation: A Wide-Range Wireless Motion-Tracking System for Augmented Reality and Virtual Set Applications," ACM SIGGRAPH, pp. 372-378 (1998).

Foxlin, et al., "VIS-Tracker: A Wearable Vision-Inertial Self-Tracker," IEEE Computer Society (2003).

Freiburg Center for Data Analysis and Modeling—Publications, http://www.fdm.uni-freiburg.de/cms/puplications/publications/ (Aug. 2007).

Friedmann, et al., "Device Synchronization Using an Optimal Linear Filter," S13D '92: Proceedings of the 1992 symposium on Interactive 3D graphics, pp. 57-62 (1992).

Friedmann, et al., "Synchronization in virtual realities," MIT Presence, vol. 1, No. 1, pp. 139-144 (1992).

Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html (2003).

Green, et al., "ADI's iMEMS Angular Rate Sensing Gyroscope," Analog Dialogue (Jan. 2003).

Grimm et al., "Real-Time Hybrid Pose Estimation from Vision and Inertial Data," Proceedings, First Canadian Conference on Computer and Robot Vision, pp. 480-486 (2004).

Gyration, "Gyration GP110 Ultra Cordless Optical Mouse Data Sheet," http://www.gyration.com/descriptions/document/GP110-SPEC-EN.pdf (2002).

Gyration, "Gyration GP110 Ultra Cordless Optical Mouse User Manual," http://www.gyration.com/descriptions/document/GP110-MANUAL-EN.pdf (2002).

Gyration, "Gyration Ultra Cordless Optical Mouse," photos (2002).

Gyration, "Gyration MicroGyro 100 Developer Kit Data Sheet," http://web.archive.org/web/19980708122611/www.gyration.com/html/devkit.html (Jul. 1998).

Hamilton Institute, http://www.dcs.gla.ac.uk/.about.rod/, R. Murray-Smith (Aug. 2007).

Harada, et al., "Portable Absolute Orientation Estimation Device with Wireless Network under Accelerated Situation" Proceedings, 2004 IEEE International Conference on Robotics and Automation, vol. 2, Issue, Apr. 26-May 1, 2004 pp. 1412-1417 vol. 2 (Apr. 2004).

Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).

Haykin, et al., "Adaptive Tracking of Linear Time-Variant Systems by Extended RLS Algorithms, IEEE Transactions on Signal Processing," vol. 45, No. 5 (May 1997).

Heath, "Virtual Reality Resource Guide AI Expert," v9 n5 p32(14) (May 1994).

Hinckley et al., "The VideoMouse: A Camera-Based Multi-Degree-of-Freedom Input Device" A59, ACM UIST'99 Symposium on User Interface Software & Technology, CHI Letters 1 (1), pp. 103-112. (Jan. 1999).

Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-158 (UIST '03 Vancouver BC Canada) (ACM) (Nov. 2003).

Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).

Hinckley. et al., "A Survey of Design Issues in Spatial Input," Proceedings of the ACM Symposium in User Interface Software and Technology (1994).

Hogue, "MARVIN: A Mobile Automatic Realtime Visual and INertial tracking system," Master's Thesis, York University (2003).

Hogue, et al., "An optical-inertial tracking system for fully-enclosed VR displays," Proceedings of the 1st Canadian Conference on Computer and Robot Vision, pp. 22-29 (May 2004).

Hollands, Robin, "Sourceless Trackers," VR News (copy unavailable) (Apr. 1995).

Holloway, Richard Lee, "Registration Errors in Augmented Reality Systems," Ph.D. Dissertation, University of North Carolina at Chapel Hill (1995).

Hudson Soft, "Brochure of Toukon Road Brave Warrior, Brave Spirits" (1998).

Inman, "Cheap sensors could capture your every move," http://technology.newscientist.com/article/dn12963-cheap-sensors-could-capture-your-every-move.html (Nov. 2007).

Intersense, "InterSense InertiaCube2 Devices," (Specification) (image) (2001).

Intersense, "InterSense InertiaCube2 Manual for Serial Port Model" (2001).

Intersense, "InterSense IS-1200 FlightTracker Prototype Demonstration" (Video) (Nov. 2004).

Intersense, "InterSense IS-1200 InertiaHawk Datasheet" (2009).

Intersense, "InterSense IS-1200 VisTracker Datasheet" (2007).

Intersense, "InterSense IS-1200 VisTracker Devices," (image) (2007).

Intersense, "InterSense IS-900 MicroTraxTM Datasheet" (2007).

Intersense, "InterSense IS-900 Systems Datasheet" (2007).

Intersense, "InterSense MicroTrax Demo Reel," http://www.youtube.com/watch?v=O2F4fu_CISo (2007).

Intersense, "InterSense Mobile Mixed Reality Demonstration" (Video), http://www.youtube.com/watch?v=daVdzGK0nUE &feature=channel_page (Oct. 2006).

Intersense, "InterSense Motion Gaming Tech Demo," http://www.youtube.com/watch?v=7-3y5tdju4E, InterSense (Mar. 2008).

Intersense, "IS-1200 VisTracker Augmented Maintenance Demonstration" (Video), http://www.intersense.com/IS-1200 Systems.aspx, http://www.youtube.com/watch?v=IMI78s91WQo &feature=channel_page (Jan. 2009).

Intersense, "IS-1200 VisTracker Industrial Cart Demonstration" (Video), InterSense http://www.intersense.com/IS-1200 Systems.aspx, http://www.youtube.com/watch?v=7xKLCvDGMgY &feature=channel_page (Jan. 2008).

Intersense, "IS-900 Product Technology Brief," http://www.intersense.com/uploadedFiles/Products/White_Papers/IS900_Tech_Overview_Enhanced.pdf (1999).

Intersense, Inc., "Comparison of InterSense 1S-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).

Izumori et al, High School Algebra: Geometry (1986).

Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).

Jakubowsk, et al., "Increasing Effectiveness of Human Hand Tremor Separation Process by Using Higher-Order Statistics," Measurement Science Review, vol. 1 (2001).

Jakubowski, et al., "Higher Order Statistics and Neural Network for Tremor Recognition," IEEE Transactions on Biomedical Engineering, vol. 49, No. 2 (Feb. 2002).

Jian, et al., "Adaptive Noise Cancellation," Rice University, http://www.ece.rice.edu/.about.klwang/elec434/elec434.htm, (Aug. 2007).

Jiang, "Capacitive position-sensing interface for micromachined inertial sensors," Dissertation at Univ. of Cal. Berkley (2003).

Ju, et al., "The Challenges of Designing a User Interface for Consumer Interactive Television Consumer Electronics Digest of Technical Papers.," IEEE 1994 International Conference on Volume, Issue, Jun. 21-23, 1994 pp. 114-115 (Jun. 1994).

Keir, et al., "Gesture-recognition with Non-referenced Tracking," IEEE Symposium on 3D User Interfaces, pp. 151-158 (Mar. 25-26, 2006).

Kessler, et al., "The Simple Virtual Environment Library" (MIT Presence) (2000).

Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).

Klein et al.,"Tightly Integrated Sensor Fusion for Robust Visual Tracking," British Machine Vision Computing, vol. 22, No. 10, pp. 769-776 (2004).

Kohlhase, "NASA Report, The Voyager Neptune travel guide," Jet Propulsion Laboratory Publication 89-24, excerpt (Jun. 1989).

Krumm, et al.,"How a Smart Environment Can Use Perception," Ubicomp 2001 (Sep. 2001).

Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).

La Scala, et al., "Design of an Extended Kalman Filter Frequency Tracker," IEEE Transactions on Signal Processing, vol. 44, No. 3 (Mar. 1996).

Larimer et al., "VEWL: A Framework for building a Windowing Interface in a Virtual Environment," In Proc. of IFIP TC13 Int. Conf. on Human-Computer Interaction Interact'2003 (Zürich, http://people.cs.vt.edu/~bowman/papers/VEWL_final.pdf (2003).

Laughlin, et al., "Inertial Angular Rate Sensors: Theory and Applications," Sensors Magazine (Oct. 1992).

Lee et al., "Tilta-Pointer: the Free-Space Pointing Device," Princeton COS 436 Project, http://www.milyehuang.com/cos436/project/specs.html (2004).

Lee, et al., "Innovative Estimation Method with Measurement Likelihood for all-Accelerometer Type Inertial Navigation System," IEE Transactions on Aerospace and Electronic Systems, vol. 38, No. 1 (Jan. 2002).

Lee, et al., "Two-Dimensional Position Detection System with MEMS Accelerometer for Mouse Applications" Design Automation Conference, 2001. Proceedings, 2001 pp. 852-857 (Jun. 2001).

Leonard, "Computer Pointer Controls 3D Images in Free Space," Electronic Design, pp. 160, 162, 165, (Nov. 1991).

Liang, et al., "On Temporal-Spatial Realism in the Virtual Reality Environment," ACM 1991 Symposium on User Interface Software and Technology (Nov. 1991).

Link, "Field-Qualified Silicon Accelerometers From 1 Milli g to 200,000 g," SENSORS (Mar. 1993).

Liu, et al., "Enhanced Fisher Linear Discriminant Models for Face Recognition," Proc. 14.sup.th International Conference on Pattern Recognition, Queensland, Australia (Aug. 1998).

Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).

Logitech, "Logitech 2D/6D Mouse Devices Specification" (1991).

Logitech, "Logitech 2D/6D Mouse Technical Reference Manual" 1991.

Logitech, Inc., "3D Mouse & Head Tracker Technical Reference Manual" (1992).

Luinge, Inertial sensing of human movement, Thesis, University of Twente (2002).

Luinge, et al., "Estimation of orientation with gyroscopes and accelerometers," Proceedings of the First Joint BMES/EMBS Conference, 1999., vol. 2, p. 844 (Oct. 1999).

Luthi, P. et al., "Low Cost Inertial Navigation System," and translation (2000).

Mackenzie et al., "A two-ball mouse affords three degrees of freedom," Extended Abstracts of the CHI '97 Conference on Human Factors in Computing Systems, pp. 303-304. New York: ACM (1997).

Mackinlay, "Rapid Controlled Movement Through a Virtual 3D Workspace," ACM SIGGRAPH Computer Graphics archive, vol. 24, No. 4, pp. 171-176 (Aug. 1990).

MacLean, "Designing with Haptic Feedback", Proceedings of IEEE Robotics and Automation (ICRA '2000), at 783-88 (Apr. 22-28, 2000).

Masliah, "Measuring the Allocation of Control in 6 Degree of Freedom Human-Computer Interaction Tasks," Proceedings of the SIGCHI conference on Human factors in computing systems, pp. 25-32 (2001).

Maybeck, "Stochastic Models, Estimation and Control," vol. 1, Mathematics in Science and Engineering, vol. 141 (1979).

Merrill, "FlexiGesture: A sensor-rich real-time adaptive gesture and affordance learning platform for electronic music control," Thesis, Massachusetts Institute of Technology (Jun. 2004).

Meyer et al., "A Survey of Position Tracker," vol. 1, Issue 2, pp. 173-200, MIT Presence, (1992).

Miles, "New pads lack control," The Times, Dec. 6, 1999.

Mizell, "Using Gravity to Estimate Accelerometer Orientation," IEEE Computer Society (2003).

Morris, "Accelerometry—a technique for the measurement of human body movements," J Biomechanics 6: 729-736 (1973).

Mulder, "How to Build an Instrumental Glove Based on the Powerglove Flex Sensors," PCVR 16, pp. 10-14 (1994).

Mulder, "Human movement tracking technology," School of Kinesiology, Simon Fraser University (Jul. 1994).

Myers, et al., "Interacting at a Distance: Measuring the Performance of Laser Pointers and Other Devices," CHI 2002, (Apr. 2002).

N.I.C.E., "The N.I.C.E. Project" (video), http://www.niceproject.com/about/ (1997).

Naimark, et al., "Circular Data Matrix Fiducial System and Robust Image Processing for a Wearable Vision-Inertial Self-Tracker," Proceedings. International Symposium on Mixed and Augmented Reality, ISMAR (2002).

Naimark, et al., "Encoded LED System for Optical Trackers," Fourth IEEE and ACM International Symposium on Mixed and Augmented Reality, pp. 150-153 (2005).

Navarrete, et al., "Eigenspace-based Recognition of Faces: Comparisons and a new Approach," Image Analysis and Processing (2001).

Newswire PR, "Five New Retailers to Carry Gyration's Gyropoint Point and Gyropoint Pro" (1996).

Newswire PR, "Three-Axis MEMS-based Accelerometer From STMicroelectronics Targets Handheld Terminals," STMicro (Feb. 2003).

Nichols, "Geospatial Registration of Information for Dismounted Soldiers (GRIDS)," Contractors Progress, Status, and Management Report (Milestone 3 Report to DARPA ETO) (Oct. 1998).

Nintendo, Nintendo Entertainment System (NES) (1984).

Nintendo, NES System and Controllers (1984).

Nintendo, NES Controller (1984).

Nintendo, NES Zapper Guns (1984).

Nintendo, NES Duck Hunt Game (1984).

Nintendo, Nintendo GameBoy System (1989).

Nintendo, Nintendo Super NES (SNES) (1991).

Nintendo, SNES System & Controllers (1991).

Nintendo, SNES Superscope (1991).

Nintendo, Nintendo 64 System (N64) (1996).

Nintendo, Nintendo 64 System and Controllers (1996).

Nintendo, Nintendo 64 Controller (1996).

Nintendo, Nintendo N64 Controller with Rumble Pack (1996-1997).

Nintendo, Nintendo N64 Rumble Packs 1996-1997.

Nintendo, Nintendo GameBoy Color System (1998).

Nintendo, GameBoy Color (1998).

Nintendo, Nintendo: Kirby Tilt & Tumble game, packaging and user manual (Aug. 2000-2001).
Nintendo, Pokemon Pinball (1998).
Nintendo, Nintendo Game Boy Advance System (2001).
Nintendo, Nintendo Game Boy Advance (2001).
Nintendo, Nintendo: WarioWare: Twisted game, packaging and user manual (2004-2005).
Nintendo, Nintendo Game Boy Advance Wireless Adapter (Sep. 26, 2003).
Nintendo, Nintendo GameCube System (2001).
Nintendo, GameCube System and Controller (2001).
Nintendo, GameCube Controller (2001).
Nintendo, Wavebird Wireless Controllers (May 2002).
Nintendo, G3 Wireless Controller (Pelican) (2001).
Nintendo, Game Boy Advance SP System (2003).
Nintendo, Nintendo Game Boy Color Game Cartridge with Built-In Rumble (Jun. 28, 2009).
Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Odell, "An Optical Pointer for Infrared Remote Controllers," Proceedings of International Conference in Consumer Electronics (1995).
Odell, Transcript of Testimony, Investigation No. 337-TA-658, Before the United States International Trade Commission, vol. IV, redacted (May 14, 2009).
Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004).
Omelyan, "On the numerical integration of motion for rigid polyatomics: The modified quaternion approach" Computers in Physics, vol. 12 No. 1, pp. 97-103 (1998).
Ovaska, "Angular Acceleration Measurement: A Review," Instrumentation and Measurement Technology Conference, Conference Proceedings. IEEE, vol. 2 (Oct. 1998).
Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paradiso, et al., "Interactive Therapy with Instrumented Footwear," CHI 2004, Apr. 24-29, 2004, Vienna, Austria (2004).
Park, Adaptive control strategies for MEMS gyroscopes (Dissertation), Univ. Cal. Berkley (2000).
Pelican Accessories G3 Wireless Controller (Sep. 6, 2002).
Pham, Hubert, "Pointing in Intelligent Environments with the WorldCursor," Proceedings of Interact 2003, Andrew Wilson & (2003).
Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr. 2000).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," IEEE Transactions on Control Systems Technology, vol. 13, Issue 2, pp. 185-195 (Mar. 2005).
Piyabongkarn, "Development of a MEMS Gyroscope for Absolute Angle Measurement," Dissertation, Univ. Minnesota (Nov. 2004).
Polhemus, "Polhemus 3SPACE FASTRAK devices" (image) (2000).
Pryor et al., "A Reusable Software Architecture for Manual Controller Integration," IEEE Conf. on Robotics and Automation, Univ of Texas (Apr. 1997).

Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," SENSORS, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, C., Robotics Institute, http://www.ri.cmu.edu/people/riviere.sub.—cameron.html, http://www.ri.cmu.edu/person.html?type=publications&person_id=248 (Aug. 2007).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Robbinett et al., "Implementation of Flying, Scaling, and Grabbing in Virtual Worlds," ACM Symposium (1992).
Roberts, "The Lincoln Wand," AFIPS Conference Proceedings, MIT Lincoln Laboratory (1966).
Robinett et al., "The Visual Display Transformation for Virtual Reality," University of North Carolina at Chapel Hill (1994).
Roetenberg, "Inertial and magnetic sensing of human motion," Thesis (2006).
Roetenberg, et al., "Inertial and Magnetic Sensing of Human Movement Near Ferromagnetic Materials," Proceedings. The Second IEEE and ACM International Symposium on Mixed and Augmented Reality (Mar. 2003).
Rolland, et al., "A Survey of Tracking Technology for Virtual Environments," University of Central Florida, Center for Research and Education in Optics Lasers (CREOL) (2001).
Sakai, et al., "Optical Spatial Filter Sensor for Ground Speed," Optical Review, vol. 2, No. 1 pp. 65-67 (1994).
Saxena et al., "In Use Parameter Estimation of Inertial Sensors by Detecting Multilevel Quasi-Static States," Lecture Notes in Computer Science, 2005—Berlin: Springer-Verlag, (Apr. 2004).
Sayed, "A Framework for State-Space Estimation with Uncertain Models," IEEE Transactions on Automatic Control, vol. 46, No. 7 (Jul. 2001).
Sayed, UCLA Adaptive Systems Laboratory-Home Page, UCLA, http://asl.ee.ucla.edu/index.php?option=com.sub.—frontpage&Itemid=1 (Aug. 2007).
Schofield, Jack et al., Coming up for airpad, The Guardian (Feb. 2000).
Screen Shot of Brave Spirits (1998).
Selectech, Selectech AirMouse Devices (image) (1991).
Selectech, "Selectech AirMouse Remote Controls, Model # AM-R1," photographs (1991).
Selectech, "Airmouse Remote Control System Model AM-1 User's Guide," Colchester, VT (Sep. 24, 1991).
Selectech, Facsimile Transmission from Rossner to Monastiero, Airmouse Remote Controls, Colchester, VT (Mar. 25, 1992).
Selectech, "Changing Driver Versions on CDTV/AMIGA" (Oct. 17, 1991).
Selectech, "AirMouse Remote Controls, AirMouse Remote Control Warrant " (1991).
Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).

Seoul National Univ., "EMMU System"—Seoul National Univ Power Point Presentation, www.computer.org/portal/cms_docs_ieeecs/ieeecs/education/csidc/CSIDC03Presentations/SNU.ppt (2003).

Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).

Simon, et al., "The YoYo: A Handheld Device Combining Elastic and Isotonic Input," Human-Computer Interaction—INTERACT'03, pp. 303-310 (2003).

Smith, "Gyrevolution: Orienting the Digital Era," http://www.gyration.com/images/pdfs/Gyration_White_Paper.pdf (2007).

Sorenson, et al., "The Minnesota Scanner: A Prototype Sensor for Three-Dimensional Tracking of Moving Body Segments," IEEE Transactions on Robotics and Animation (Aug. 1989).

Sourceforge.com, "ARToolkit API Documentation" (SourceForge web pages) (2004-2006).

Stovall, "Basic Inertial Navigation," NAWCWPNS TM 8128, Navigation and Data Link Section, Systems Integration Branch (Sep. 1997).

Sutherland, "A Head-Mounted Three Dimensional Display," AFIPS '68 (Fall, part I): Proceedings of the Dec. 9-11, 1968, fall joint computer conference, part I, pp. 757-764 (Dec. 1968).

Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).

Sweetster, "A Quaternion Algebra Tool Set," http://world.std.com/%7Esweetser/quaternions/intro/tools/tools.html (Jun. 2005).

Thinkoptics, Thinkoptics Wavit devices (image) (2007).

Timmer, "Data Analysis and Modeling Dynamic Processes in the Life Sciences," Freiburg Center for Data Analysis and Modeling, http://webber.physik.uni-freiburg.de/.about.jeti/ (Aug. 2007).

Timmer, "Modeling Noisy Time Series: Physiological Tremor," International Journal of Bifurcation and Chaos, vol. 8, No. 7 (1998).

Timmer, et al, "Pathological Tremors: Deterministic Chaos or Nonlinear Stochastic Oscillators?" Chaos, vol. 10, No. 1 (Mar. 2000).

Timmer, et al., "Characteristics of Hand Tremor Time Series," Biological Cybernetics, vol. 70 (1993).

Timmer, et al., Cross-Spectral Analysis of Physiological Tremor and Muscle Activity: II Application to Synchronized Electromyogram, Biological Cybernetics, vol. 78 (1998).

Timmer, et al., "Cross-Spectral Analysis of Tremor Time Series," International Journal of Bifurcation and Chaos, vol. 10, No. 11 (2000).

Titterton et al., "Strapdown Inertial Navigation Technology," pp. 1-56 and pp. 292-321 (May 1997).

Tokimec, et al., "A Wearable Attitude-Measurement System Using a Fiberoptic Gyroscope," MIT Presence (Apr. 2002).

UNC Computer Science Department, "News & Notes from Sitterson Hall," UNC Computer Science, Department Newsletter, Issue 24, Spring 1999 (Apr. 1999).

Univ. Illinois At Chicago, "Cave—A Virtual Reality Theater," http://www.youtube.com/watch?v=-Sf6bJjwSCE 1993.

Univ. Wash., "ARToolkit" (U. Wash. web pages) (1999).

Urban, "BAA 96-37 Proposer Information," DARPA/ETO (1996).

US Dynamics Corp, "Spinning Mass Mechanical Gyroscopes" (Aug. 2006).

US Dynamics Corp, "The Concept of 'Rate' (more particularly, angular rate pertaining to rate gyroscopes) (rate gyro explaination)," (Aug. 2006).

US Dynamics Corp, "US Dynamics Model 475 Series Rate Gyroscope Technical Brief—brief discussion on rate gyroscope basics, operation, and uses, and a dissection of the model by major component" (Dec. 2005).

US Dynamics Corp, "US Dynamics Rate Gyroscope Interface Brief (rate gyro IO)" (Aug. 2006).

Van Den Bogaard, "Using linear filters for real-time smoothing of rotational data in virtual reality application, " http://www.science.uva.nl/research/ias/alumni/m.sc.theses/theses/RobvandenBogaard.pdf (Aug. 2004).

Van Laerhoven, et al., "Using an Autonomous Cube for Basic Navigation and Input," Proceedings of the 5th International Conference on Multimodal interfaces, Vancouver, British Columbia, Canada, pp. 203-210 (2003).

Van Rheeden, et al., "Noise Effects on Centroid Tracker Aim Point Estimation," IEEE Trans. on Aerospace and Electronic Systems, vol. 24, No. 2, pp. 177-185 (Mar. 1988).

Vaz, et al., "An Adaptive Estimation of Periodic Signals Using a Fourier Linear Combiner," IEEE Transactions on Signal Processing, vol. 42, Issue 1, pp. 1-10 (Jan. 1994).

Verplaetse, "Inertial Proprioceptive Devices: Self-Motion Sensing Toys and Tools," IBM Systems Journal (Sep. 1996).

Verplaetse, "Inertial-Optical Motion-Estimating Camera for Electronic Cinematography," Masters of Science Thesis, MIT, (1997).

Vorozcovs, et al.,"The Hedgehog: A Novel Optical Tracking Method for Spatially Immersive Displays," MIT Presence, vol. 15, No. 1, pp. 108-121 (2006).

Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).

Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).

Watt, *3D Computer Graphics*, "Three-Dimensional Geometry in Computer Graphics,", pp. 1-22 Addison-Wesley (1999).

Welch et al., "HiBall-3100™ Wide-Area, High-Precision Tracker and 3D Digitizer," http://www.3rdtech.com/HiBall.htm (2002-2006).

Welch et al., HiBall Devices (image) (2002-2006).

Welch et al., Motion Tracking: No Silver Bullet, but a Respectable Arsenal IEEE Computer Graphics and Applications, vol. 22, No. 6, pp. 24-38 (Nov. 2002).

Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995).

Welch, "A Self-Contained Wide-Area Tracker Using Sensor Fusion" (copy unavailable) (2001).

Welch, "Hawkeye Zooms in on Mac Screens with Wireless Infrared Penlight Pointer," MacWeek (May 1993).

Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).

Welch, et al., "High-Performance Wide-Area Optical Tracking: The HiBall Tracking System," MIT Presence: Teleoperators & Virtual Environments (2001).

Welch, et al., "SCAAT: Incremental Tracking with Incomplete Information," Computer Graphics, SIGGRAPH 97 Conference Proceedings, pp. 333-344 (Aug. 1997).

Welch, et al., "Source Code for HiBall+lnerital device," UNC-CH Computer Science (copy unavailable) (Jun. 1998).

Welch, et al., "The HiBall Tracker: High-Performance Wide-Area Tracking for Virtual and Augmented Environments," ACM SIGGRAPH, Addison-Wesley (1999).Elch, et al., "The High-Performance Wide-Area Optical Tracking : the HiBall Tracking System,".

Welch, et al., "The High-Performance Wide-Area Optical Tracking: The HiBall Tracking System," MIT Presence, Presence, vol. 10 , No. 1 (Feb. 2001).

Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap.1, pp. 23-47] (2008).

Widrow, et al., "Fundamental Relations Between the LMS Algorithm and the DFT," IEEE Transactions on Circuits and Systems, vol. 34, No. CAS-7, (Jul. 1987).

Williams, et al., "Physical Presence: Palettes in Virtual Spaces," Society of Photo-Optical Instrumentation Engineers (SPIE) Conference Series, vol. 3639, No. 374-384 (May 1999).

Wilson, "Wireless User Interface Devices for Connected Intelligent Environments," Ubicomp 2003 Workshop (2003).

Wilson, "WorldCursor: Pointing in Intelligent Environments with a Tele-operated Laser Pointer," UIST '03 Companion (Nov. 2003).

Wilson, "XWand: UI for Intelligent Environments," http://research.microsoft.com/en-us/um/people/awilson/wand/default.htm (Apr. 2004).

Wilson, et al., "Demonstration of the XWand Interface for Intelligent Spaces," UIST '02 Companion, pp. 37-38 (Oct. 2002).

Wilson, et al., "Gesture Recognition Using the Xwand," ri.cmu.edu (2004).

Wilson, et al., "Xwand: UI for Intelligent Spaces," CHI 2003, Proceedings of the SIGCHI conference in Human factors in computing systems, pp. 545-552 (Apr. 2003).

Wilson, Research page, biography available at http://research.microsoft.com/en-us/um/people/awilson/?0sr=a, Microsoft Corp. (2009).

Wilson, XWand video, http://research.microsoft.com/~awilson/wand/wand%20video%20768k.WMV (Mar. 2002).

Wilson, Transcript of Testimony, Investigation No. 337-TA-658, Before the United States International Trade Commission, vol. V (May 15, 2009).

Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000 (2000).

Wormell, et al., "Advancements in 3D Interactive Devices for Virtual Environments," ACM International Conference Proceeding Series; vol. 39 (2003).

Worringham, et al., "Directional Stimulus-Response Compatibility: A Test of Three Alternative Principles," Ergonomics, vol. 41, Issue 6, pp. 864-880 (Jun. 1998).

Worringham, et al., "Tablet-PC Classroom System Wins Design Competition," Computer, vol. 36, No. 8, pp. 15-18 (Aug. 2003).

Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).

You, et al., "Hybrid Inertial and Vision Tracking for Augmented Reality Registration," http://graphics.usc.edu/cgit/pdf/papers/Vr1999.PDF (1999).

You, et al., "Orientation Tracking for Outdoor Augmented Reality Registration," IEE Computer Graphics and Applications, IEEE, vol. 19, No. 6, pp. 36-42 (Nov. 1999).

Youngblut, et al., "Review of Virtual Environment Interface Technology," Institute for Defense Analyses (Jul. 1996).

Yun, et al., "Recent Developments in Silicon Microaccelerometers," SENSORS, University of California at Berkeley (Oct. 1992).

Zhai, "Human Performance in Six Degree of Freedom Input Control," Thesis, University of Toronto (1995).

Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004).

Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004).

Altmann, Rotations, Quaternions, and Double Groups, Dover Publications (2005).

Bowman et al., *3D User Interfaces: Theory and Practice*, Addison-Wesley, (2005).

Brown et al., *Introduction to Random Signals and Applied Kalman Filtering*, Third Ed., Wiley, John & Sons, Incorporated, (1997).

Brown, et al., *Introduction to Random Signals and Applied Kalman Filtering*, 2d ed., John Wiley & Sons Inc. (1992).

Burdea, et al., *Virtual Reality Technology*, Wiley, John & Sons, Incorporated (1994).

Cohn, et al., *The PSI Handbook of Virtual Environments for Training and Education*, Praeger Security International, vol. 1-3 (2009)

Durlach, et al., *Virtual Reality: Scientific and Technological Challenges*, National Academy Press, (1995).

Foley, et al., *Computer Graphics: Principles and Practice*, 2nd ed., Addison-Wesley Publishing Company, Inc., (1990).

Foley, et al., *Computer Graphics: Principles and Practice*, 2nd ed. In C, Addison-Wesley Publishing Company, Inc. (1996).

Foley, et al., *Fundamentals of Interactive Computer Graphics*, Addison-Wesley Publishing Co., Inc. Boston, MA, USA (1982) [we do not have a hard copy of this book as far as I know].

Fraden, *Handbook of Modern Sensors: Physics, Designs and Applications*, $3^{rd}$ ed., Springer Science +Business Media, LLC, New York, NY (2004).

Greenberg, *Advanced Engineering Mathematics*, 2nd ed., Prentice-Hall, Inc., (1998).

Grewal, et al., *Global Positioning Systems, Inertial Navigation, and Integration*, John Wiley & Sons Inc. (2001).

Hildebrand, *Methods of Applied Mathematics*, $2^{nd}$ ed, Dover Publications Inc., (1992).

Hoffman et al., *Linear Algebra*, 2nd ed., Prentice Hall, (1971).

Jekeli, *Inertial Navigation Systems with Geodetic Applications*, Walter de Gruyter GmbH & Co. (2001).

Kalawsky, *The Science of Virtual Reality and Virtual Environments*, Addison Wesley Publishing Company. (1993).

Kibble et al., *Classical Mechanics*, Imperial College Press (2004).

Kreyszig, *Advanced Engineering Mathematics*, Wiley, John & Sons, Incorporated (1999).

Kuipers, *Quaternions and Rotation Sequences*, Princeton University Press (1999).

Latombe, *Robot Motion Planning*, Kluwer Academic Press (1991).

Lavalle, *Planning Algorithms*, Cambridge University Press, (2006).

Markey, et al., *The Mechanics of Inertial Position and Heading Indication*, MIT, Cambridge Mass., New York: John Wiley & Sons Inc. (1961).

Misner, et al., *Gravitation*, 1st ed., W. H. Freeman & Co. (1973).

Poole, *The Physics Handbook: Fundamentals and Key Equations*, 2nd ed., Wiley-VHC, (2007).

Spong et al., *Robot Modeling and Control*, Wiley & Sons, Inc., (2006).

Thornton, et al., *Classical Dynamics of Particles & Systems*, 5th ed., Brooks Cole, (2004).

Titterton, et al., *Strapdown Inertial Navigation Technology*, $2^{nd}$ ed., Institution of Electrical Engineers (2004).

Wilson, *Sensor Technology Handbook*, Elsevier, Inc., (2005).

Zuang, et al., *Camera-Aided Robot Calibration*, CRC Press, Inc., (1996).

\* cited by examiner

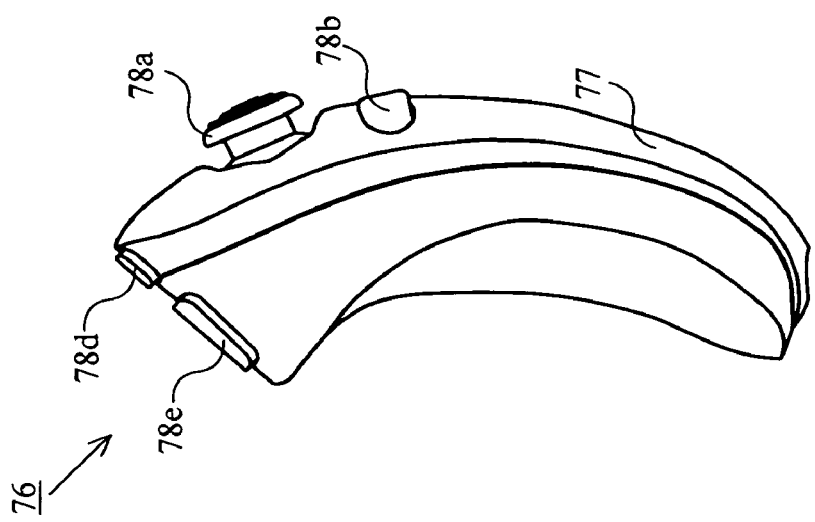
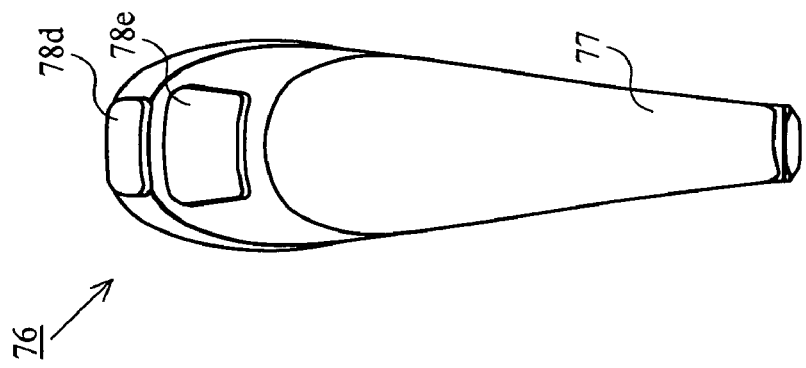
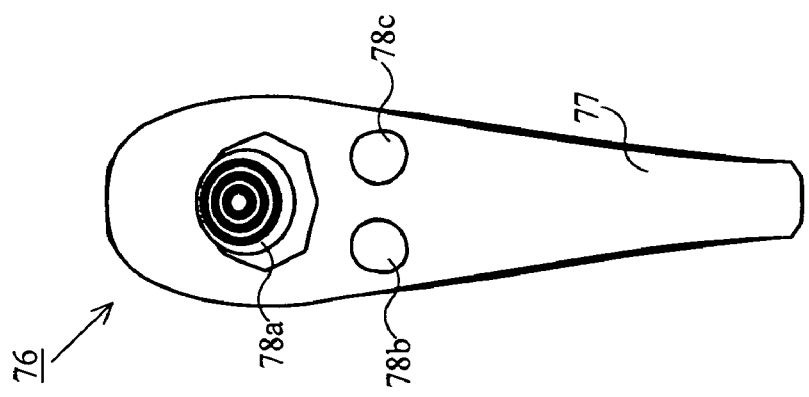

F I G. 1 1
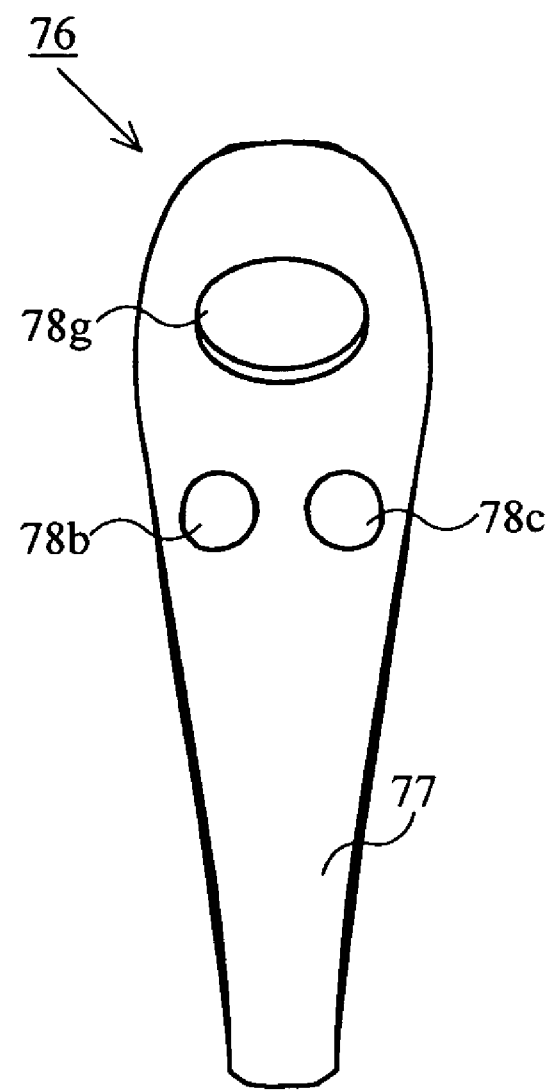

F I G. 1 4
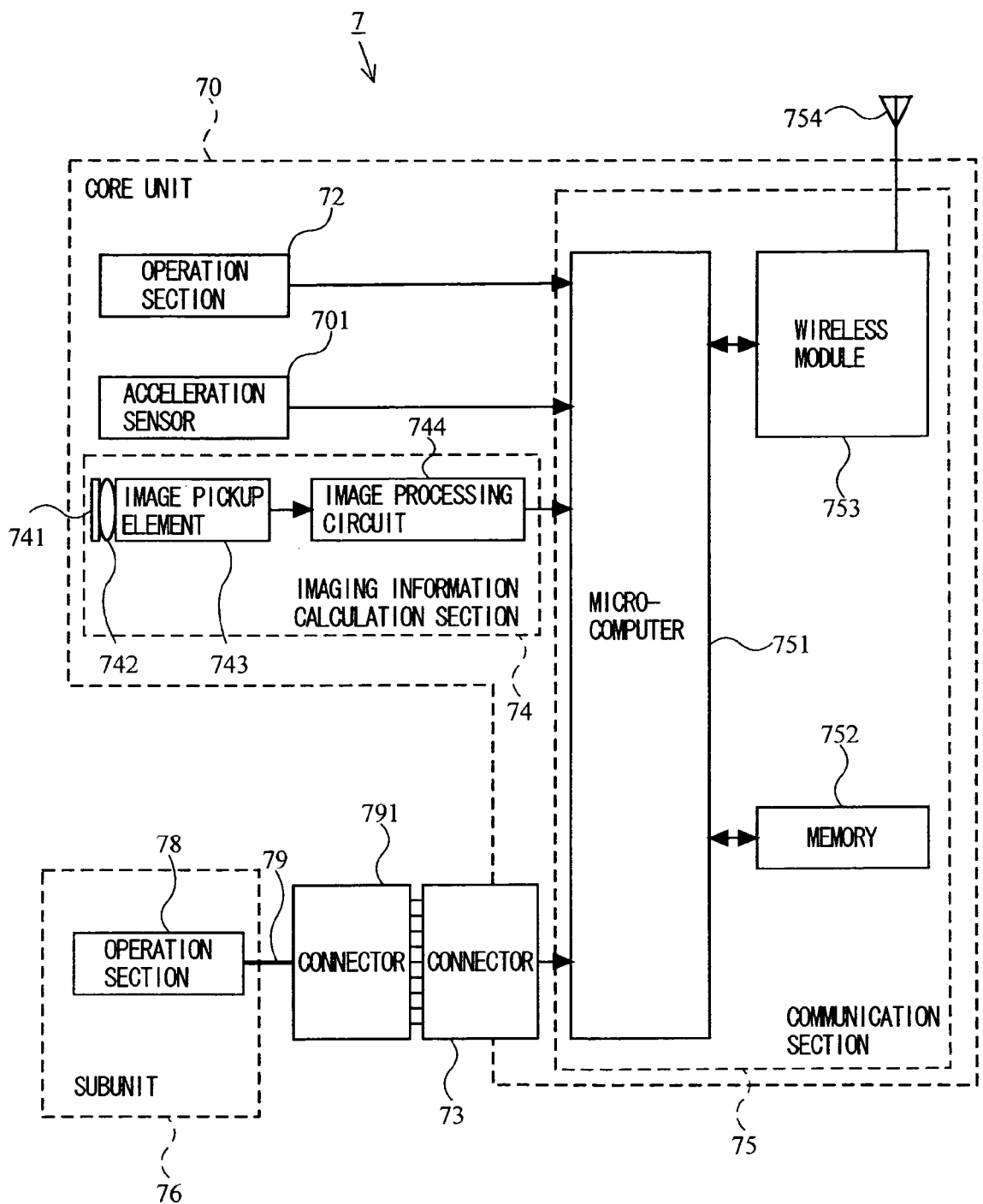

F I G. 1 5
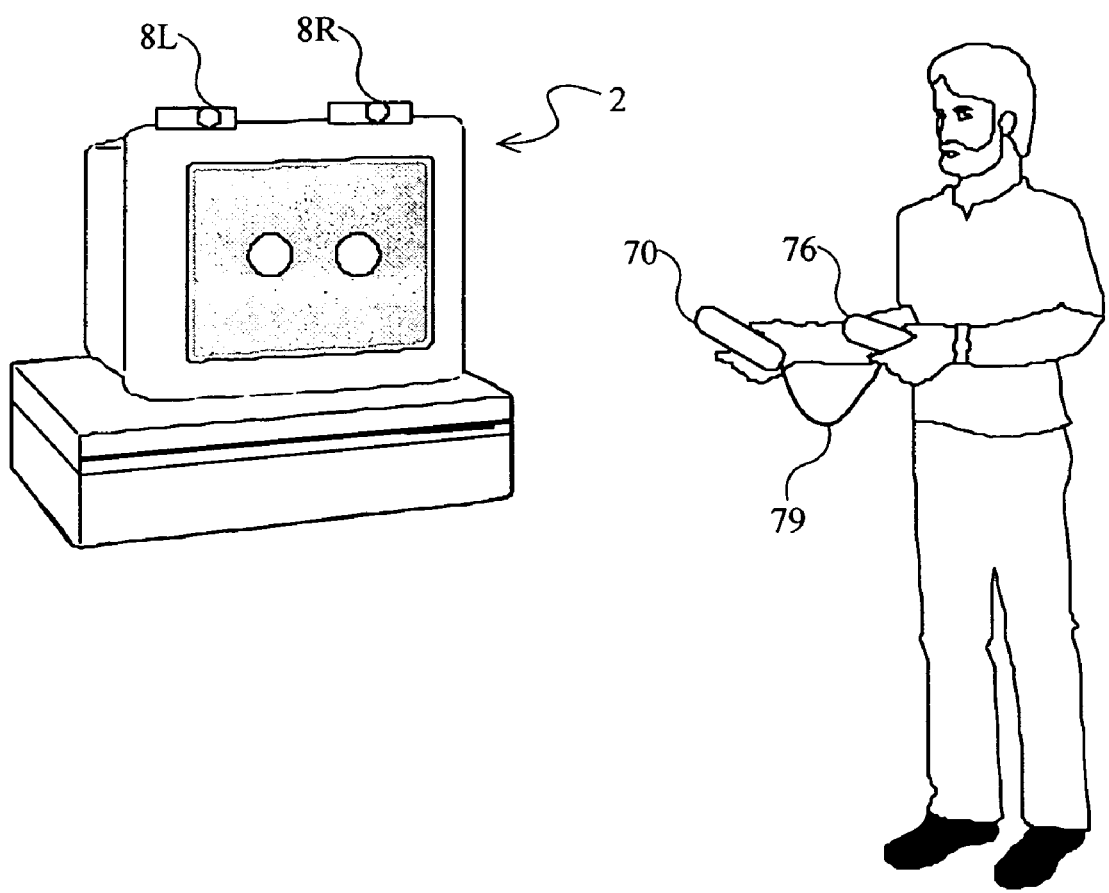

F I G. 1 7
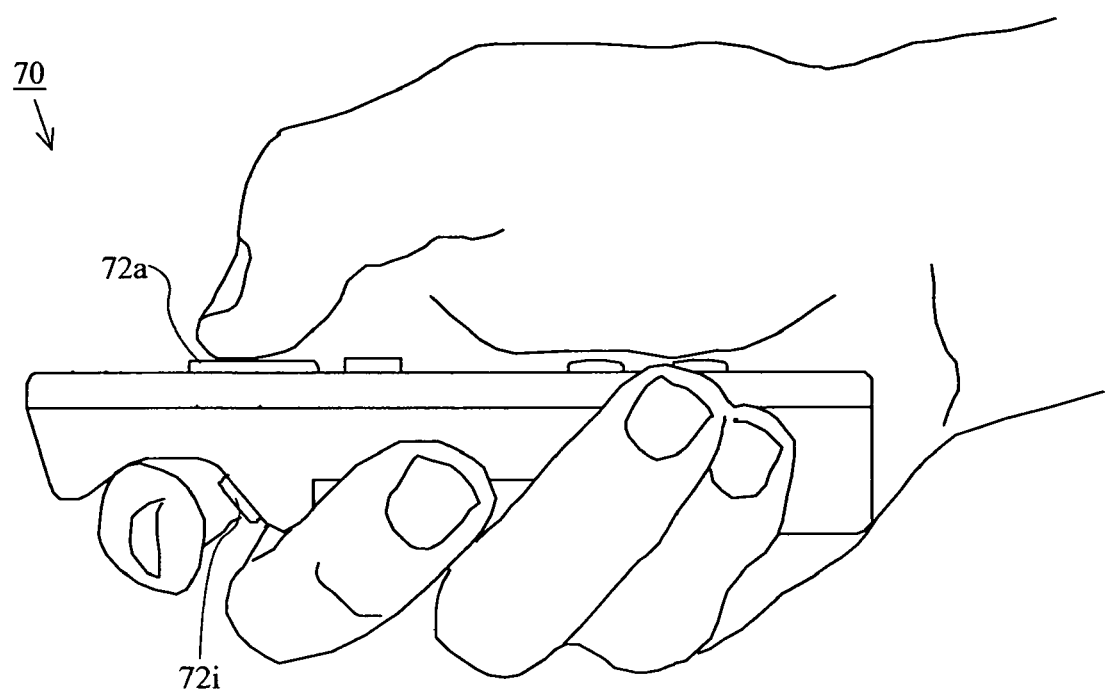

GAME SYSTEM AND STORAGE MEDIUM HAVING GAME PROGRAM STORED THEREON

CROSS REFERENCE OF RELATED APPLICATION

The disclosure of Japanese Patent Application No. 2005-249265 is incorporated herein by reference. This application also claims the benefit of Provisional Application No. 60/714,861, filed Sep. 8, 2005, the entire contents of which is hereby incorporated by reference in this application.

BACKGROUND OF THE INVENTION

1. Field of the Invention

The present invention relates to a game system and a storage medium having a game program stored thereon, and more particularly to a game system controlled using two controllers and a storage medium having a game program stored thereon.

2. Description of the Background Art

For example, Japanese Laid-Open Patent Publication No. 2004-313492 (hereinafter, referred to as Patent Document 1) discloses a controller having its control units held by both hands of a player, respectively, so as to play a game.

The controller disclosed in Patent Document 1 is composed of an R unit to be held by a right hand of a player and an L unit to be held by a left hand of the player. The R unit and the L unit each has an operation button and a stick on the top surface and the side of a housing thereof. The R unit and the L unit can be physically coupled to each other so as to be used as a combined controller.

However, the controller disclosed in Patent Document 1 is constructed by simply separating a conventional game apparatus controller into right and left units. That is, although a player can place his or her right and left hands anywhere when the player holds the R and L units by his or her right and left hands, respectively, the player cannot control the controller itself with improved flexibility. For example, not only the combined controller but also the game apparatus controller separated into the right and the left units cannot realize a new operation.

Further, in a shooting game played using the controller, a stick is often used to move a shooting target. In this case, a direction in which the stick is to be inclined on the controller is different, in an actual space, from a direction in which the shooting target is to move on a screen, thereby making it difficult to intuitively recognize an operation direction. Accordingly, each player differently recognizes the correspondence between the direction in which the stick is to be inclined and the direction in which the shooting target is to move on the screen. Therefore, a "reverse" mode has to be provided so as to enable each player to set his or her desired direction. Moreover, the respective directions in which two sticks of the combined controller can be moved are coplanar on the controller. Therefore, when a character allowed to move in a depth direction of a virtual game space and a target which moves on a plane in a display area are to be separately controlled, the combined controller is not suitable in that a user cannot easily recognize the directions. Furthermore, since the R unit and the L unit are invariably assigned to a right hand and a left hand, respectively, it is difficult to set an operation based on each player's dominant hand.

Further, in a role playing game and the like, a menu selection is sometimes required during the game. At this time, in the game played using the controller, a selection item changes over one by one by making an input using a direction key and the like, whereby it takes long to perform the menu selection. Therefore, when the game is played in real time, a player cannot control a player character while selecting a selection item from a menu, thereby sometimes failing in the game. Moreover, in order to change the facing direction of the character, an operation section such as a stick must be kept inclined, thereby preventing the facing direction of the character from being quickly changed.

SUMMARY OF THE INVENTION

Therefore, an object of the present invention is to provide a game system which can realize a new operation having enhanced flexibility by using a plurality of controllers, and a storage medium having a game program stored thereon.

The present invention has the following features to attain the object mentioned above. The reference numerals, step numbers and the like in the parentheses indicate the correspondence with the embodiment described below in order to aid in understanding the present invention and are not intended to limit, in any way, the scope of the present invention.

A first aspect of the present invention is directed to a game system (1) comprising a first controller (70), a second controller (76) and a game apparatus (3). The game apparatus executes a predetermined game program to cause a display device (2) to display, on a display area, one of a two-dimensional virtual game world and a three-dimensional virtual game world. The first controller includes a first operation data generation section (74, 701). The first operation data generation section generates first operation data (Da1, Da2, Da5) in accordance with a motion of a first controller body included in the first controller. The second controller includes a second operation data generation section (78). The second operation data generation section generates second operation data (Da3) in accordance with a direction input operation performed by a player. The game apparatus includes a game process means (S52 to S56) and a display process means (S57). The game process means obtains the first operation data and the second operation data and subjects the virtual game world to a predetermined game process in accordance with the obtained operation data. The display process means causes the display device to display, on the display area, an image of the virtual game world having been subjected to the game process.

In a second aspect based on the first aspect, the game process means includes a designated coordinate determination means (S53). The designated coordinate determination means determines, based on the first operation data, predetermined coordinates represented in the display area of the display device as designated coordinates (Dc3). The game process means performs the game process by performing a predetermined calculation using the designated coordinates and the second operation data.

In a third aspect based on the second aspect, the first controller includes an image pickup section (74). The image pickup section is fixed to the first controller body and is operable to take an image of a periphery along a predetermined direction from the first controller body. The first operation data includes one selected from the group consisting of an image taken by the image pickup section and a result (Da1, Da2) of subjecting the image taken by the image pickup section to a predetermined calculation. The designated coordinate determination means changes a position of designated coordinates from a predetermined position in accordance with a movement of a position of a predetermined imaging target (8) in the taken image, thereby determining the designated coordinates.

In a fourth aspect based on the second aspect, the first controller includes an acceleration sensor (701). The first operation data includes acceleration data (Da5) outputted by the acceleration sensor. The designated coordinate determination means changes a position of designated coordinates from a predetermined position in accordance with the acceleration data, thereby determining the designated coordinates.

In a fifth aspect based on the second aspect, the game process means calculates, in a three-dimensional virtual game space (S), three-dimensional designated coordinates corresponding to the designated coordinates and performs the game process including a calculation using the three-dimensional designated coordinates. The display process means displays, on the display area of the display device, the three-dimensional virtual game space obtained by the game process performed by the game process means.

In a sixth aspect based on the fifth aspect, the game process means changes at least one selected from the group consisting of position coordinates of a player character (P) in the virtual game world, position coordinates of a virtual camera (C), and a direction vector of the virtual camera, in accordance with the second operation data.

In a seventh aspect based on the fifth aspect, the game process means subjects an object (E) positioned at the three-dimensional designated coordinates to a predetermined process.

In an eighth aspect based on the second aspect, the game process means disposes a predetermined object (T) at a position corresponding to the designated coordinates.

In a ninth aspect based on the seventh aspect, the game process means changes at least one selected from the group consisting of position coordinates of a player character in the virtual game world, position coordinates of a virtual camera, and a direction vector of the virtual camera, in accordance with the second operation data.

In a tenth aspect based on the second aspect, the game process means generates the virtual game world including at least a menu area for allowing a player to select from a plurality of selection items (M1 to M7). The game process means performs a process for selecting the selection item displayed at a position (Cs) including the designated coordinates in the display area.

In an eleventh aspect based on the tenth aspect, the game process means changes at least one selected from the group consisting of position coordinates of a player character in the virtual game world, position coordinates of a virtual camera, and a direction vector of the virtual camera, in accordance with the second operation data.

In a twelfth aspect based on the fifth aspect, the game process means changes a direction of a virtual camera such that a sight point of the virtual camera coincides with the three-dimensional designated coordinates.

In a thirteenth aspect based on the twelfth aspect, the game process means changes at least one selected from the group consisting of position coordinates of a player character in the virtual game world and position coordinates of the virtual camera, in accordance with the second operation data.

In a fourteenth aspect based on the first aspect, the game process means subjects, to a predetermined calculation, an amount by which the first operation data varies in accordance with the motion of the first controller, determines a predetermined motion vector in a coordinate system of the display area, and changes a direction of a virtual camera such that a sight point of the virtual camera in a three-dimensional virtual game space moves on the display area in accordance with the motion vector. The display process means displays, on the display area of the display device, the three-dimensional virtual game space obtained by the game process performed by the game process means.

In a fifteenth aspect based on the fourteenth aspect, the game process means changes at least one selected from the group consisting of position coordinates of a player character in the virtual game world and position coordinates of the virtual camera, in accordance with the second operation data.

A sixteenth aspect of the present invention is directed to a storage medium having stored thereon a game program executable by a computer (30) of a game apparatus. The game apparatus obtains first operation data in accordance with a motion of a first controller body included in the first controller and second operation data based on a direction input operation supplied to a second controller. The game program causes the computer to execute a game process step (S52 to S56) and a display process step (S57). The game process step obtains the first operation data and the second operation data and subjects one of a two-dimensional virtual game world and a three-dimensional virtual game world to a predetermined game process in accordance with the obtained operation data. The display process step causes a display device to display, on a display area, an image of the virtual game world having been subjected to the game process executed by the computer.

In a seventeenth aspect based on the sixteenth aspect, the game process step includes a designated coordinate determination step (S53). The designated coordinate determination step determines, based on the first operation data, predetermined coordinates represented in the display area of the display device as designated coordinates. The game process step includes a step of performing the game process by performing a predetermined calculation using the designated coordinates and the second operation data.

In an eighteenth aspect based on the seventeenth aspect, the first operation data includes one selected from the group consisting of an image and a result of subjecting the image to a predetermined calculation. The designated coordinate determination step includes a step of determining a movement of a position of a predetermined subject in the image, and a step of determining new designated coordinates by changing a position of the designated coordinates from a predetermined position in accordance with the determined movement.

In a nineteenth aspect based on the seventeenth aspect, the first operation data includes acceleration data outputted by the acceleration sensor of the first controller. The designated coordinate determination step includes a step of determining new designated coordinates by changing a position of the designated coordinates from a predetermined position in accordance with the acceleration data.

In a twentieth aspect based on the seventeenth aspect, the game process step includes a step of calculating, in a three-dimensional virtual game space, three-dimensional designated coordinates corresponding to the designated coordinates, and a step of performing the game process including a calculation using the three-dimensional designated coordinates. The display process step includes a step of displaying, on the display area of the display device, the three-dimensional virtual game space obtained by the game process performed by the game process step.

In a twenty-first aspect based on the twentieth aspect, the game process step includes a step of changing at least one selected from the group consisting of position coordinates of a player character in the virtual game world, position coordinates of a virtual camera, and a direction vector of the virtual camera, in accordance with the second operation data.

In a twenty-second aspect based on the twentieth aspect, the game process step includes a step of determining an object positioned at the three-dimensional designated coordinates, and a step of subjecting the object to a predetermined process.

In a twenty-third aspect based on the seventeenth aspect, the game process step includes a step of disposing a predetermined object at a position corresponding to the designated coordinates.

In a twenty-fourth aspect based on the twenty-third aspect, the game process step includes a step of changing at least one selected from the group consisting of position coordinates of a player character in the virtual game world, position coordinates of a virtual camera, and a direction vector of the virtual camera, in accordance with the second operation data.

In a twenty-fifth aspect based on the seventeenth aspect, the game process step includes a step of generating the virtual game world including at least a menu area for allowing a player to select from a plurality of selection items, and a step of performing a process for selecting the selection item displayed at a position including the designated coordinates in the display area.

In a twenty-sixth aspect based on the twenty-fifth aspect, the game process step includes a step of changing at least one selected from the group consisting of position coordinates of a player character in the virtual game world, position coordinates of a virtual camera, and a direction vector of the virtual camera, in accordance with the second operation data.

In a twenty-seventh aspect based on the twentieth aspect, the game process step includes a step of changing a direction of a virtual camera such that a sight point of the virtual camera coincides with the three-dimensional designated coordinates.

In a twenty-eighth aspect based on the twenty-seventh aspect, the game process step includes a step of changing at least one selected from the group consisting of position coordinates of a player character in the virtual game world and position coordinates of a virtual camera, in accordance with the second operation data.

In a twenty-ninth aspect based on the sixteenth aspect, the game process step include: a step of subjecting, to a predetermined calculation, an amount by which the first operation data varies in accordance with the motion of the first controller; a step of determining a predetermined motion vector in a coordinate system of the display area; and a step of changing a direction of a virtual camera such that a sight point of the virtual camera in a three-dimensional virtual game space moves on the display area in accordance with the motion vector. The display process step includes a step of displaying, on the display area of the display device, the three-dimensional virtual game space obtained by the game process performed by the game process step.

In a thirtieth aspect based on the twenty-ninth aspect, the game process step includes a step of changing at least one selected from the group consisting of position coordinates of a player character in the virtual game world and position coordinates of the virtual camera, in accordance with the second operation data.

According to the first aspect, the first controller generates operation data in accordance with a motion of a controller body included in the first controller, and the second controller generates operation data in accordance with a direction input operation. Thereby, when these game controllers are used in a game, a player can make an input with a finger of one hand as in the case of a conventional controller while moving the other hand. That is, the player can cause his or her right and left hands to perform respective separate operations, thereby providing a new operation, which cannot be conventionally performed.

According to the second aspect, designated coordinates are represented on a display area of a display device in accordance with a signal based on a motion of the controller body, whereby an operation input immediately applied to the display screen can be performed and an input having higher flexibility is enabled.

According to the third aspect, an image taken by the image pickup section secured to the first controller or information obtained from the taken image can be used as operation data. For example, a direction and a position of the first controller with respect to the imaging target can be detected, whereby a game operation can be performed in accordance with the direction and the position of the controller.

According to the fourth aspect, an acceleration sensor is used, thereby reducing a cost for the first operation data generation section.

According to the fifth aspect, in a game having a three-dimensional virtual game space displayed, designated coordinates can be set in the virtual game space in accordance with a signal based on a motion of the controller body.

According to the seventh aspect, a game process for influencing an object positioned at the designated coordinates obtained from the signal based on a motion of the controller body can be realized (for example, shooting an object positioned at the designated coordinates).

According to the eighth aspect, a game process for disposing an object (for example, a target cursor) at a position of the designated coordinates obtained from the signal based on a motion of the controller body can be realized.

According to the tenth aspect, a player can directly select an item with one hand, thereby reducing time loss and providing an operation having higher flexibility.

According to the sixth, the ninth, and the eleventh aspects, while an operation input immediately applied to a display screen in accordance with a motion of the controller body is performed with one hand, a direction input operation is performed with the other hand, thereby enabling an operation having wide variations. For example, a player can respectively perform a direction instruction operation and an operation of designating a position in the game space using different controllers, and therefore one operation will not influence the other and two direction instruction operations can be stably performed. Further, a player can use the two controllers based on his or her dominant hand. Moreover, for example, while a player uses one controller for instructing a player character and the like to move, the player can observe a position to be designated with the other controller. Furthermore, for example, while a player controls a character or the like with one hand, the player can directly select an item with the other hand, thereby reducing time loss and providing an operation having higher flexibility.

According to the twelfth and the fourteenth aspects, a sight point is moved in accordance with an operation input based on a motion of the controller body, whereby a quick direction change is enabled as necessary, the input can be intuitively performed, and a "reverse" mode is eliminated.

According to the thirteenth and the fifteenth aspect, while a player can instruct a player character, a virtual camera or the like to move using one controller, the player can observe a position to be designated with the other controller.

According to the present invention, the storage medium having the game program stored thereon can realize the same effect as the aforementioned game system by executing the game program stored on the storage medium by the computer of the game apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8A is a top view of a subunit 76 shown in FIG. 3;

FIG. 8B is a bottom view of the subunit 76 shown in FIG. 3;

FIG. 8C is a left side view of the subunit 76 shown in FIG. 3;

FIG. 11 is a top view illustrating an example of a second modification of the subunit 76 shown in FIG. 3;

FIG. 14 is a block diagram illustrating a structure of the controller 7 shown in FIG. 3;

FIG. 15 is a diagram illustrating a state of a game being generally controlled with the controller 7 shown in FIG. 3;

FIG. 17 shows an exemplary state of a player holding the core unit 70 with a right hand as seen from the left side of the core unit 70;

DESCRIPTION OF THE PREFERRED EMBODIMENTS

Figure 1:
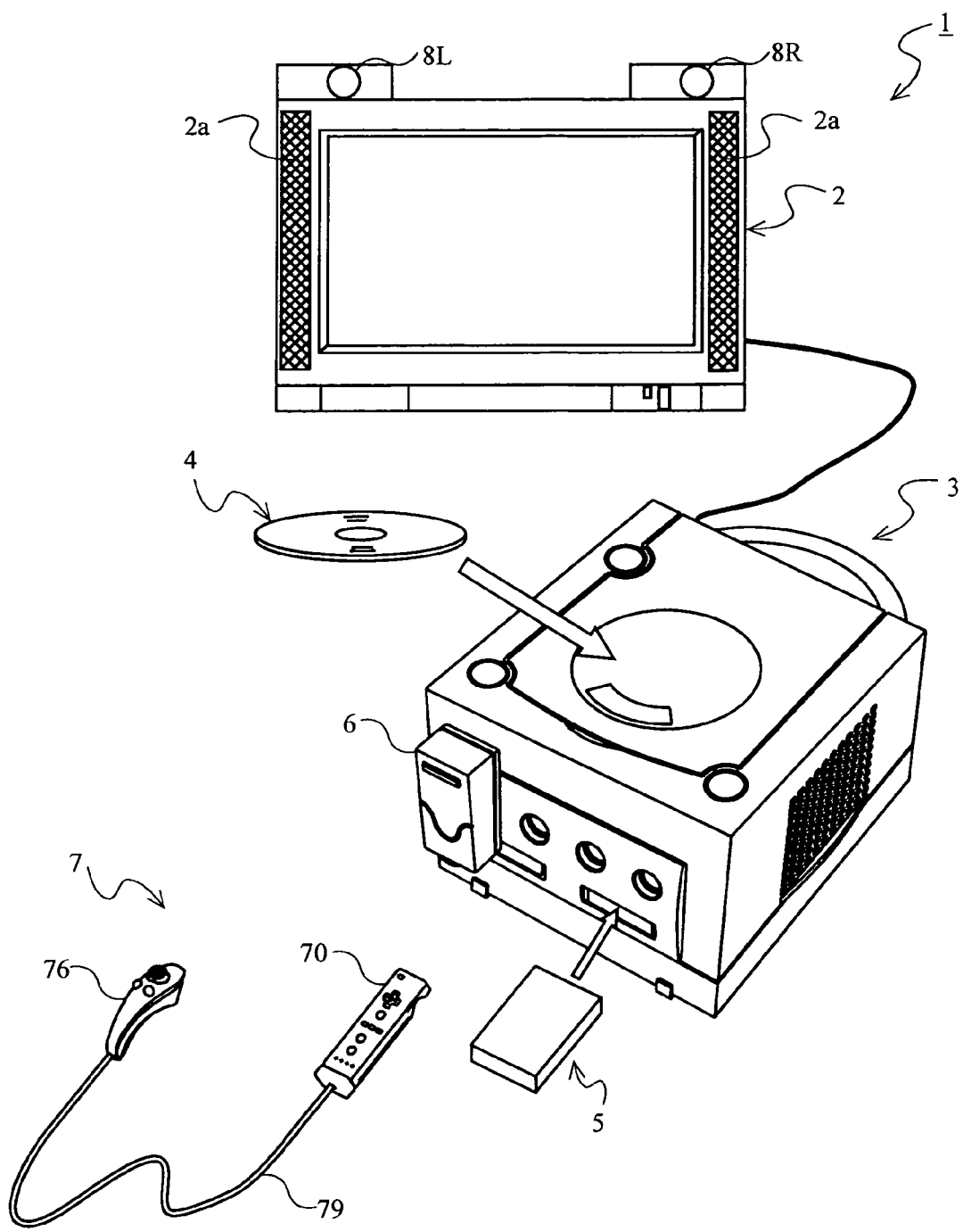
FIG. 1 is an external view illustrating a game system 1 according to an embodiment of the present invention.

With reference to FIG. 1, a game system 1 according to one embodiment of the present invention will be described. FIG. 1 is an external view illustrating the game system 1. In the following description, the game system 1 according to the present invention includes a stationary game apparatus.

As shown in FIG. 1, the game system 1 includes an installation type game apparatus (hereinafter, referred to simply as a "game apparatus") 3, which is connected to a display (hereinafter, referred to as a "monitor") 2 of a home-use television receiver or the like having a speaker 2a via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game process reset switch, and an OPEN switch for opening a top lid of the game apparatus 3 on a top main surface of the game apparatus 3. When a player presses the OPEN switch, the lid is opened, so that the optical disc 4 can be mounted or dismounted.

Further, on the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored in the external memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 has two control units, a core unit 70 and a subunit 76, connected to each other by a flexible connecting cable 79. The controller 7 is an operation means for mainly operating a player object appearing in a game space displayed on the monitor 2. The core unit 70 and the subunit 76 each includes an operation section such as a plurality of operation buttons, a key, a stick and the like. As described later in detail, the core unit 70 includes an imaging information calculation section 74 for taking an image viewed from the core unit 70. As an example of an imaging target of the imaging information calculation section 74, two LED modules 8L and 8R are provided in the vicinity of a display screen of the monitor 2. The LED modules 8L and 8R each outputs infrared light forward from the monitor 2. Although in the present embodiment the core unit 70 and the subunit 76 are connected to each other by the flexible cable, the subunit 76 may have a wireless unit, thereby eliminating the connecting cable 79. For example, the subunit 76 has a Bluetooth (registered trademark) unit as the wireless unit, whereby the subunit 76 can transmit operation data to the core unit 70.

Figure 2:
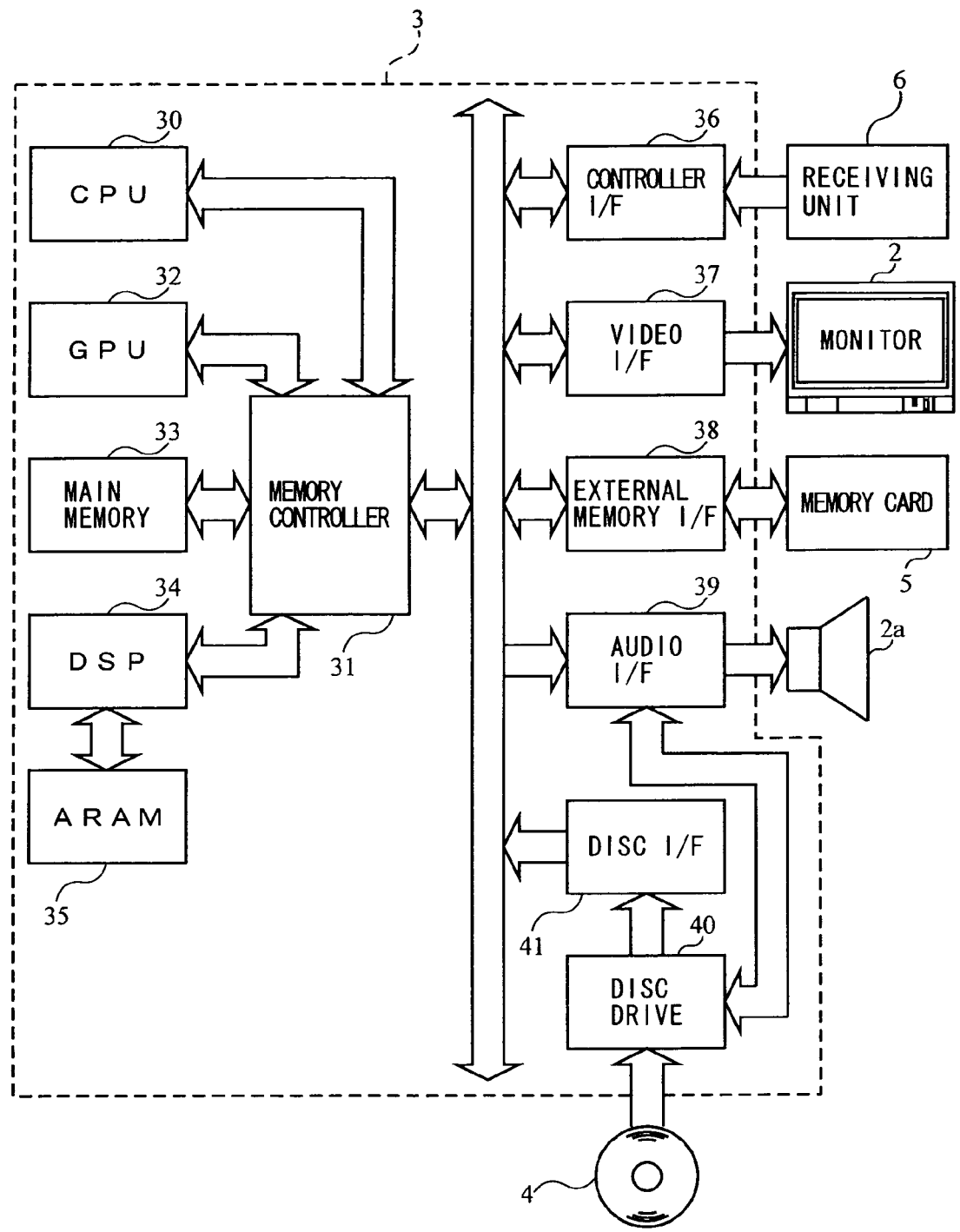
FIG. 2 is a functional block diagram of a game apparatus 3 shown in FIG. 1.

Next, with reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a boot program stored in a boot ROM (not shown) to, for example, initialize memories including a main memory 33, and then executes a game program stored on the optical disc 4 to perform game process or the like in accordance with the game program. The CPU 30 is connected to a GPU (Graphics Processing Unit) 32, the main memory 33, a DSP (Digital Signal Processor) 34, and an ARAM (audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to the receiving unit 6, the monitor 2, the external memory card 5, the speaker 2a, and a disc drive 40.

The GPU 32 performs image processing based on an instruction from the CPU 30. The GPU 32 includes, for example, a semiconductor chip for performing calculation process necessary for displaying 3D graphics. The GPU 32 performs the image process using a memory dedicated for image process (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data and the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs a predetermined process (for example, storage of the game program or sound data already read). The DSP 34 reads the sound data stored in the ARAM 35, and outputs the sound data to the speaker 2a included in the monitor 2 via the memory controller 31 and the audio I/F 39.

The memory controller 31 comprehensively controls data transmission, and is connected to the various I/Fs described above. The controller I/F 36 includes, for example, four controller I/Fs 36a, 36b, 36c and 36d, and communicably connects the game apparatus 3 to an external device which is engageable via connectors of the controller I/Fs 36a, 36b, 36c and 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external memory card 5. The audio I/F 39 is connected to the speaker 2a built in the monitor 2 such that the sound data read by the DSP 34 from the ARAM 35 or sound data directly outputted from the disc drive 40 can be outputted from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 3:
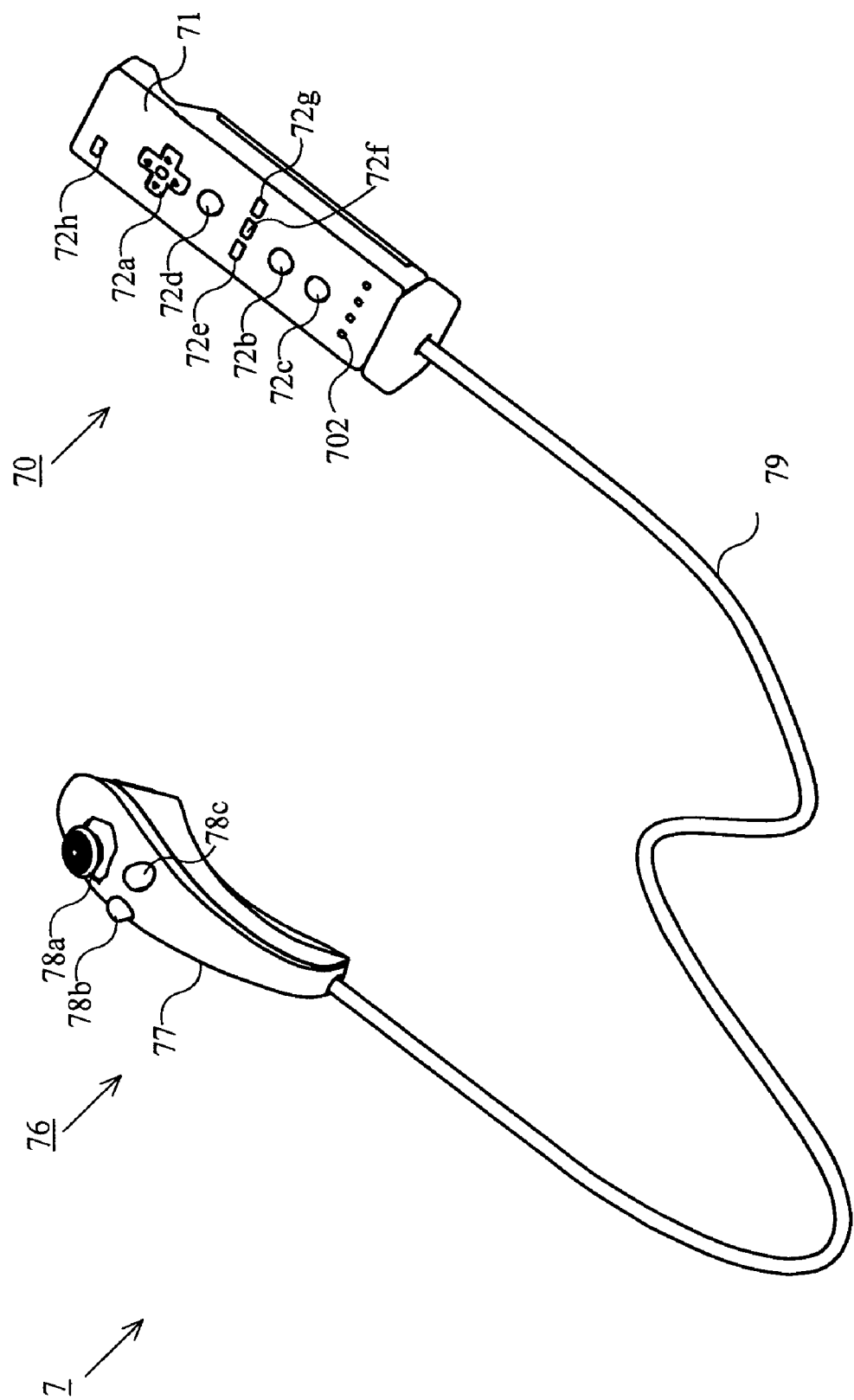
FIG. 3 is a perspective view illustrating an outer appearance of a controller 7 shown in FIG. 1.
Figure 4:
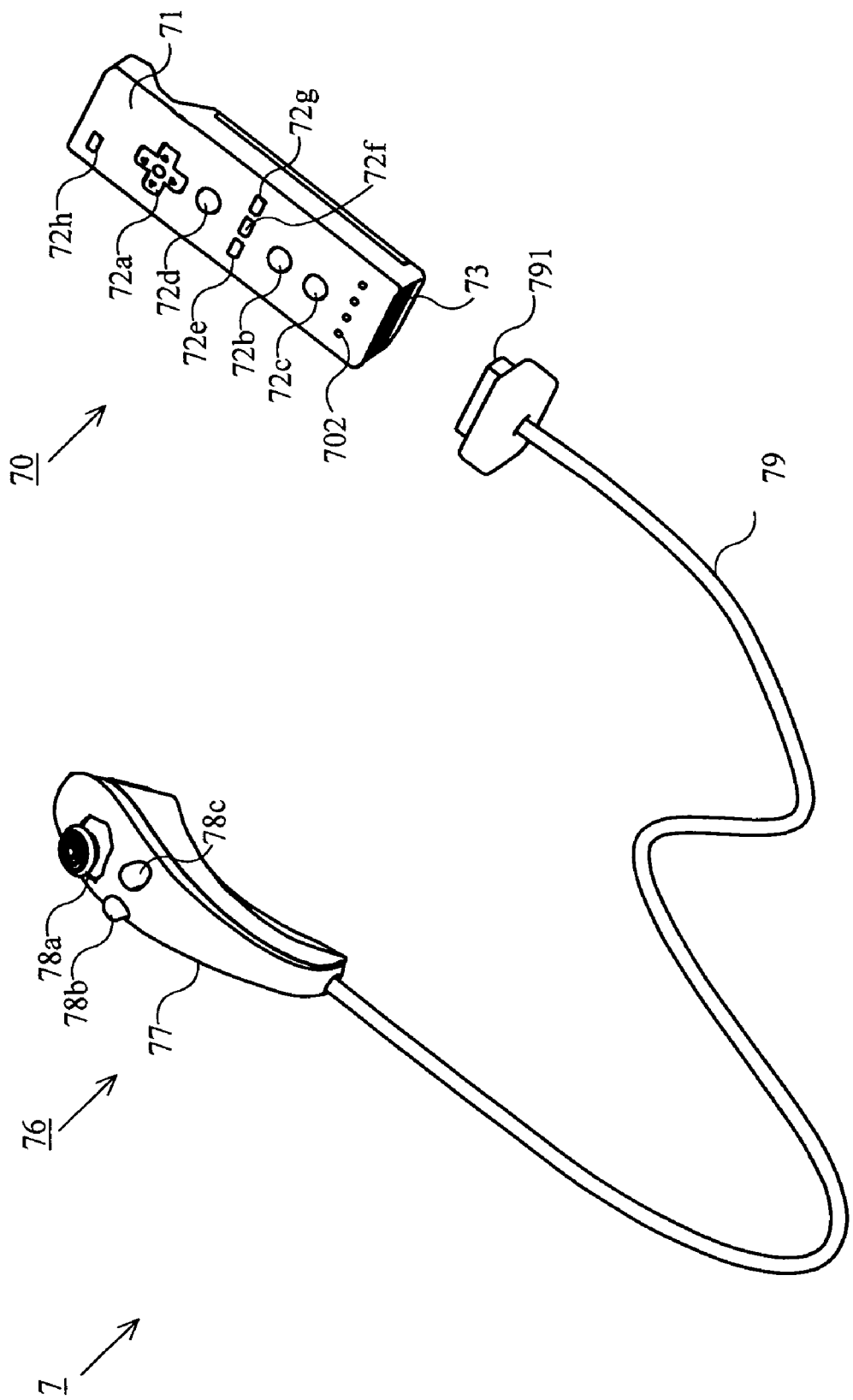
FIG. 4 is a perspective view illustrating a state of a connecting cable 79 of the controller 7 shown in FIG. 3 being connected to or disconnected from a core unit 70.

Next, with reference to FIGS. 3 and 4, the controller 7 will be described. FIG. 3 is a perspective view illustrating an outer appearance of the controller 7. FIG. 4 is a perspective view illustrating a state of the connecting cable 79 of the controller 7 shown in FIG. 3 being connected to or disconnected from the core unit 70.

As shown in FIG. 3, the controller 7 includes the core unit 70 and the subunit 76 connected to each other by the connecting cable 79. The core unit 70 has a housing 71 including a plurality of operation sections 72. The subunit 76 has a housing 77 including a plurality of operation sections 78. The core unit 70 and the subunit 76 are connected to each other by the connecting cable 79.

As shown in FIG. 4, the connecting cable 79 has a connector 791 detachably connected to the connector 73 of the core unit 70 at one end thereof, and the connecting cable 79 is fixedly connected to the subunit 76 at the other end thereof. The connector 791 of the connecting cable 79 is engaged with the connector 73 provided at the rear surface of the core unit 70 so as to connect the core unit 70 and the subunit 76 with each other by the connecting cable 79.

Figure 5:
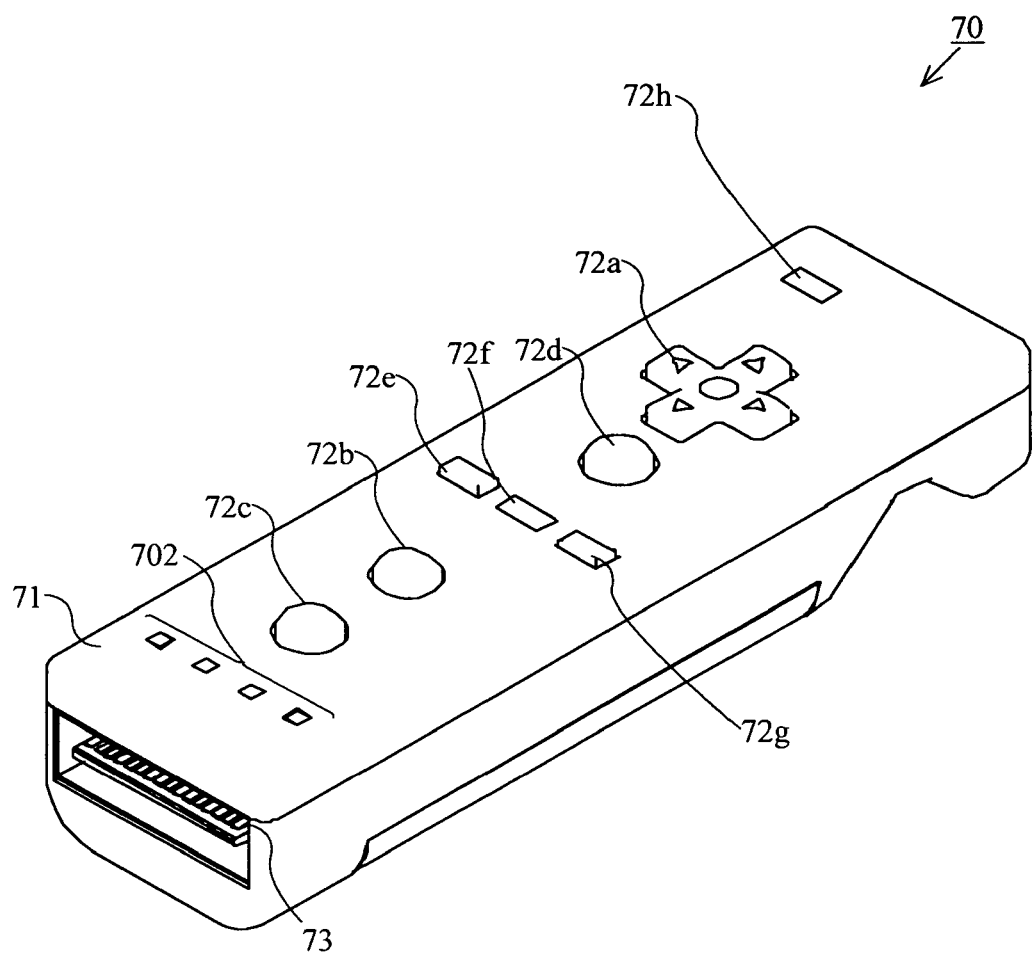
FIG. 5 is a perspective view of the core unit 70 shown in FIG. 3 as seen from the top rear side thereof.
Figure 6:
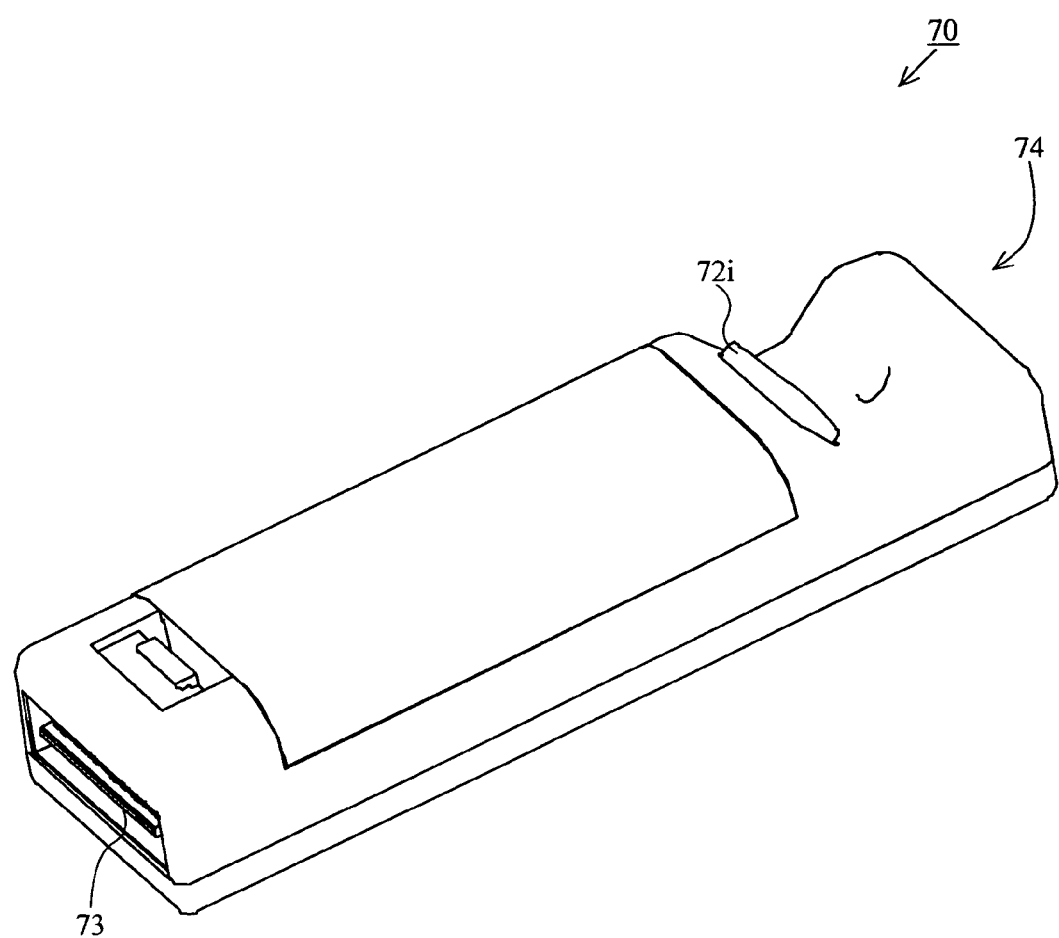
FIG. 6 is a perspective view of the core unit 70 shown in FIG. 3 as seen from the bottom rear side thereof.

With reference to FIGS. 5 and 6, the core unit 70 will be described. FIG. 5 is a perspective view of the core unit 70 as seen from the top rear side thereof. FIG. 6 is a perspective view of the core unit 70 as seen from the bottom rear side thereof.

As shown in FIGS. 5 and 6, the core unit 70 includes the housing 71 formed by plastic molding or the like. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions (front, rear, right and left) represented by arrows, which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

Although the cross key 72a is an operation section for outputting an operation signal in accordance with the aforementioned direction input operation performed by the player, such an operation section may be provided in another form. For example, the cross key 72a may be replaced with a composite switch including a push switch including a ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touchpad. Still alternatively, the cross key 72a may be replaced with an operation section which includes switches representing at least four directions (front, rear, right and left) and outputs an operation signal in accordance with the switch pressed by the player.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when the player presses a head thereof. For example, the operation buttons 72b, 72c, and 72d, are assigned with functions of an X button, a Y button, and a B button. Further, the operation buttons 72e, 72f and 72g are assigned with functions of a select switch, a menu switch and a start switch, for example. The operation buttons 72b, 72c, 72d, 72e, 72f and 72g are assigned with various functions in accordance with the game program executed by the game apparatus 3, but this will not be described in detail because the functions are not directly relevant to the present invention. In an exemplary arrangement shown in FIG. 5, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he or she is using. Specifically, when the core unit 70 transmits the transmission data to the receiving unit 6, one of the plurality of LEDs 702 corresponding to the controller type is lit up.

On a bottom surface of the housing 71, a recessed portion is formed. As described later in detail, the recessed portion is formed at a position at which an index finger or middle finger of the player is located when the player holds the core unit 70. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object.

On a front surface of the housing 71, an image pickup element 743 included in the imaging information calculation section 74 is provided. The imaging information calculation section 74 is a system for analyzing image data taken by the core unit 70 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the core unit 70. The imaging information calculation section 74 will be described later in detail. On a rear surface of the housing 71, the connector 73 is provided. The connector 73 is, for example, a 32-pin edge connector, and is used for engaging and connecting the core unit 70 with the connector 791 of the connecting cable 79.

Figure 7A:
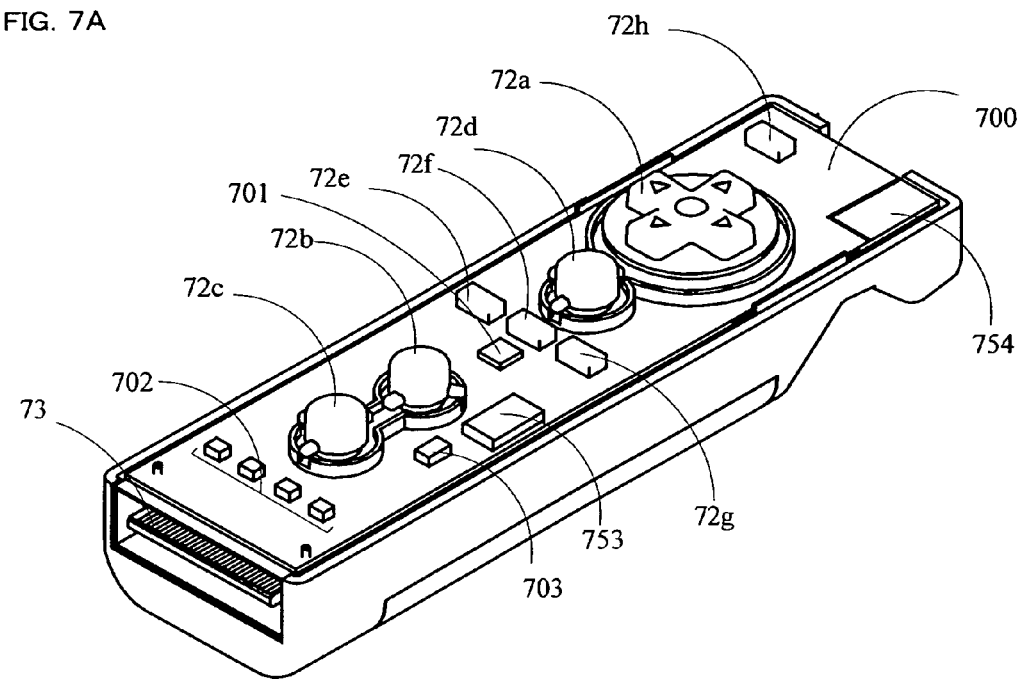
FIG. 7A is a perspective view illustrating a state where an upper casing of the core unit 70 shown in FIG. 3 is removed.
Figure 7B:
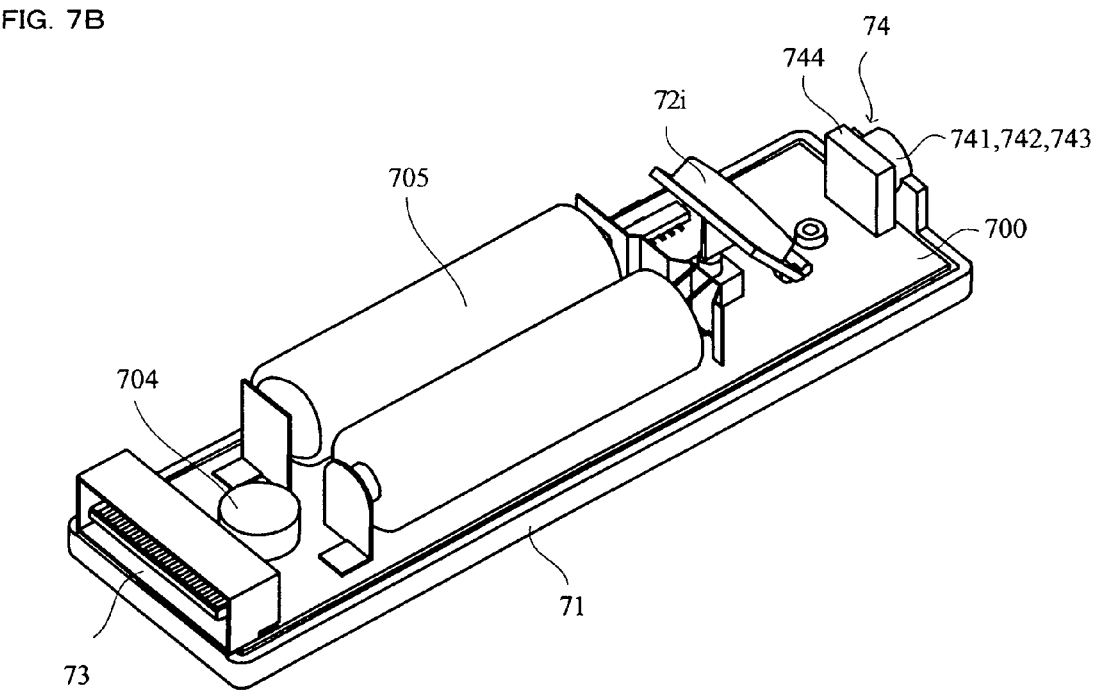
FIG. 7B is a perspective view illustrating a state where a lower casing of the core unit 70 shown in FIG. 3 is removed.

With reference to FIG. 7, an internal structure of the core unit 70 will be described. FIG. 7A is a perspective view illustrating a state where an upper casing (a part of the housing 71) of the core unit 70 is removed. FIG. 7B is a perspective view illustrating a state where a lower casing (a part of the housing 71) of the core unit 70 is removed. FIG. 7B is a perspective view illustrating a reverse side of a substrate 700 shown in FIG. 7A.

As shown in FIG. 7A, the substrate 700 is fixed inside the housing 71. On a top main surface of the substrate 700, the operation buttons 72a, 72b, 72c, 72d, 72e, 72f, 72g and 72h, an acceleration sensor 701, the LEDs 702, a quartz oscillator 703, a wireless module 753, an antenna 754 and the like are provided. These elements are connected to a microcomputer 751 (see FIG. 14) via lines (not shown) formed on the substrate 700 and the like. The wireless module 753 and the antenna 754 allow the core unit 70 to act as a wireless controller. The quartz oscillator 703 generates a reference clock of the microcomputer 751 described later.

As shown in FIG. 7B, at a front edge of a bottom main surface of the substrate 700, the imaging information calculation section 74 is provided. The imaging information calculation section 74 includes an infrared filter 741, a lens 742, the image pickup element 743 and an image processing circuit 744 located in this order from the front surface of the core unit 70 on the bottom main surface of the substrate 700. At a rear edge of the bottom main surface of the substrate 700, the connector 73 is attached. The operation button 72i is attached on the bottom main surface of the substrate 700 behind the imaging information calculation section 74, and cells 705 are accommodated behind the operation button 72i. On the bottom main surface of the substrate 700 between the cells 705 and the connector 73, a vibrator 704 is attached. The vibrator 704 may be, for example, a vibration motor or a solenoid. The core unit 70 is vibrated by an actuation of the vibrator 704, and the vibration is conveyed to the player's hand holding the core unit 70. Thus, a so-called vibration-feedback game is realized.

Figure 9:
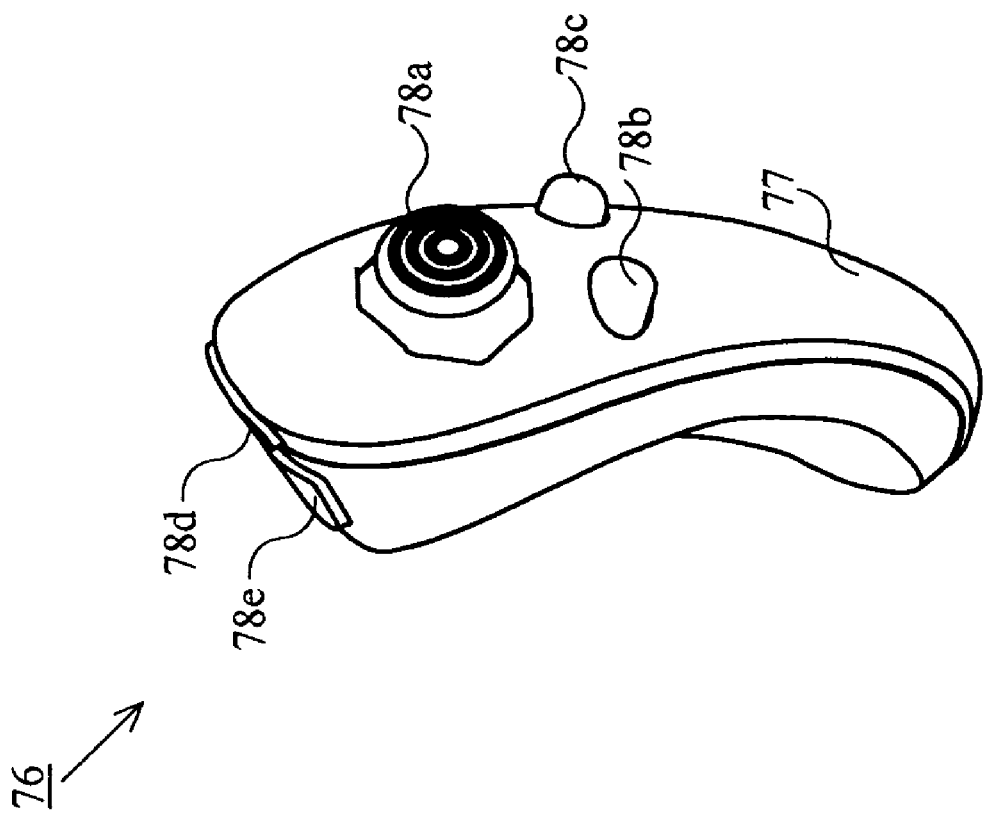
FIG. 9 is a perspective view of the subunit 76 shown in FIG. 3 as seen from the top front side thereof.

With reference to FIGS. 8A, 8B, 8C and 9, the subunit 76 will be described. FIG. 8A is a top view of the subunit 76. FIG. 8B is a bottom view of the subunit 76. FIG. 8C is a left side view of the subunit 76. FIG. 9 is a perspective view of the subunit 76 as seen from the top front side thereof.

As shown in FIGS. 8A, 8B, 8C and 9, the subunit 76 includes the housing 77 formed by, for example, plastic molding. The housing 77 extends in a longitudinal direction from front to rear, and has a streamline solid shape including a head which is a widest portion in the subunit 76. The overall size of the subunit 76 is small enough to be held by one hand of an adult or even a child.

In the vicinity of the widest portion on the top surface of the housing 77, a stick 78a is provided. The stick 78a is an operation section which includes an inclinable stick projecting from the top surface of the housing 77 and outputs an operation signal in accordance with the inclining direction of the stick. For example, a player can arbitrarily designate a direction and a position by inclining a stick tip in any direction of 360 degrees, whereby the player can instruct a direction in which a player character or the like appearing in a virtual game world is to move, or can instruct a direction in which a cursor is to move.

Although the stick 78a is an operation section for outputting an operation signal in accordance with a direction input operation performed by the player as described above, such an operation section may be provided in another form. Hereinafter, with reference to FIGS. 10 to 13, a first through a fifth exemplary modifications, each of which includes the subunit 76 having an operation section for outputting an operation signal in accordance with the direction input operation, will be described.

Figure 10:
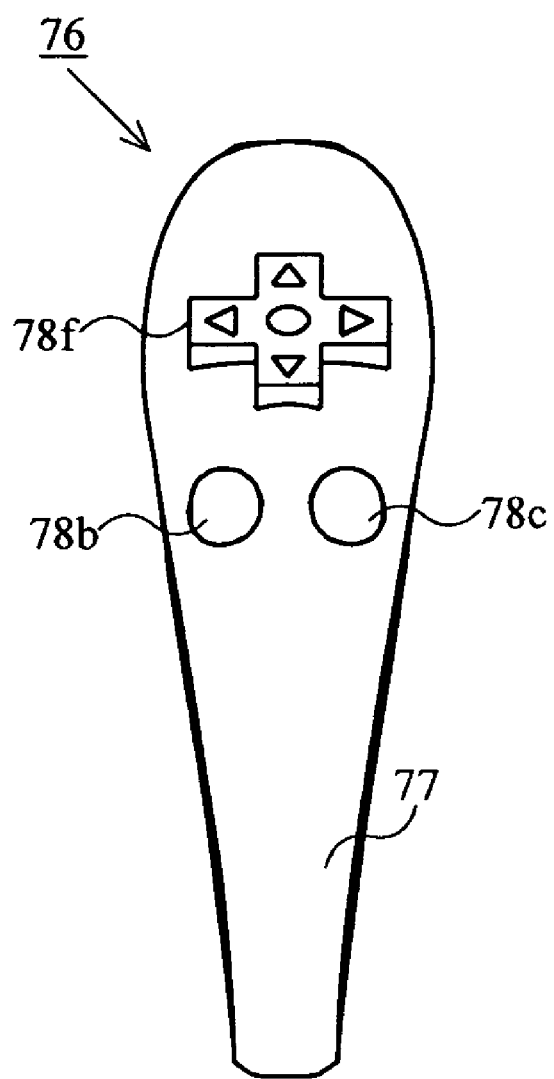
FIG. 10 is a top view illustrating an example of a first modification of the subunit 76 shown in FIG. 3.
Figure 12:
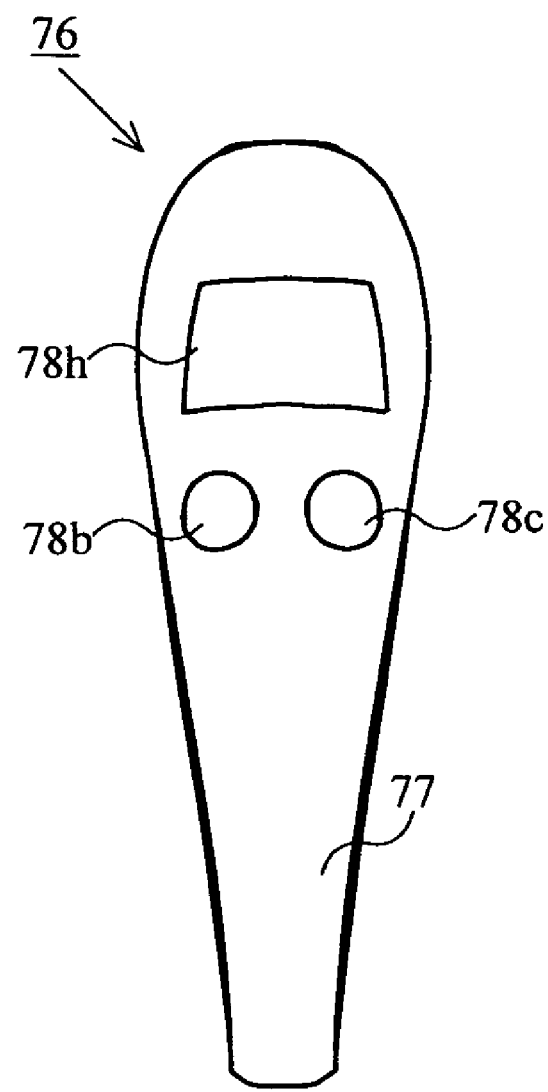
FIG. 12 is a top view illustrating an example of a third modification of the subunit 76 shown in FIG. 3.
Figure 13:
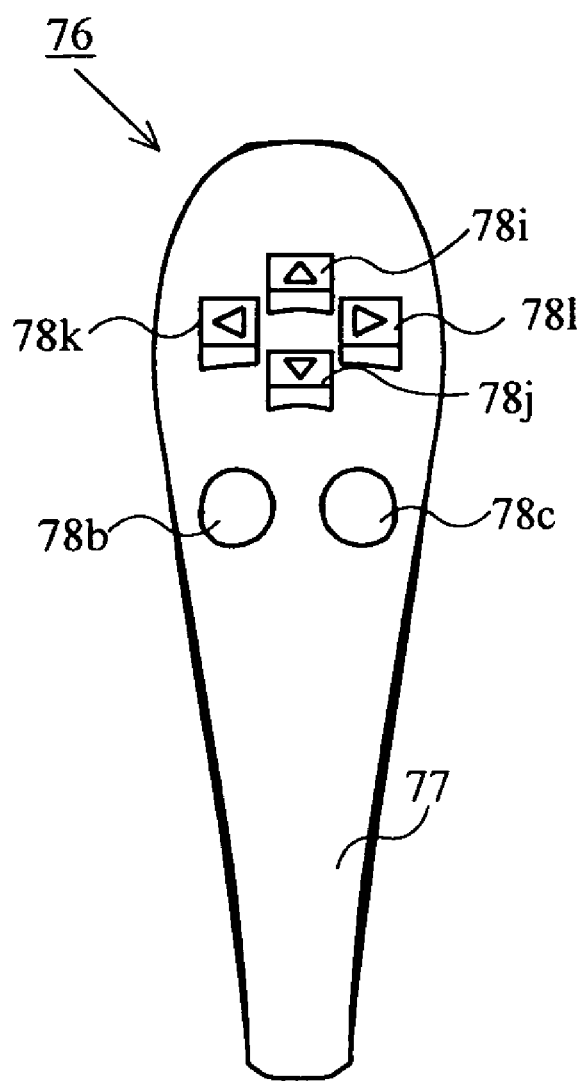
FIG. 13 is a top view illustrating an example of a fourth modification of the subunit 76 shown in FIG. 3.

As the first exemplary modification, as shown in FIG. 10, the subunit 76 may include a cross key 78f similar to the cross key 72a of the core unit 70 instead of the stick 78a. As the second exemplary modification, as shown in FIG. 11, the subunit 76 may include a slide pad 78g which includes a disc-shaped member horizontally slidable and outputs an operation signal in accordance with the sliding direction of the disc-shaped member, instead of the stick 78a. As the third exemplary modification, as shown in FIG. 12, the subunit 76 may include a touch pad 78h instead of the stick 78a. As the fourth exemplary modification, as shown in FIG. 13, the subunit 76 may include an operation section which has buttons 78i, 78j, 78k, and 78l representing at least four directions (front, rear, right and left), respectively, and outputs an operation signal in accordance with the button (78i, 78j, 78k, or 78l) pressed by a player, instead of the stick 78a. As the fifth exemplary modification, the subunit 76 may include a composite switch including a push switch having a ring-shaped four-direction operation section and a center switch provided at the center thereof, instead of the stick 78a.

Behind the stick 78a on the top surface of the housing 77 and on the front surface of the housing 77, a plurality of operation buttons 78b, 78c, 78d and 78e are provided. The operation buttons 78b, 78c, 78d and 78e are each an operation section for outputting a respective operation signal assigned to the operation buttons 72b, 72c, 72d, and 72e when the player presses ahead thereof. For example, the operation buttons 78b, 78c, 78d and 78e are assigned with functions of an X button, a Y button and the like. The operation buttons 78b, 78c, 78d and 78e are assigned with various functions in accordance with the game program executed by the game apparatus 3, but this will not be described in detail because the functions are not directly relevant to the present invention. In the exemplary arrangement shown in FIGS. 8A, 8B, 8C and 9, the operation buttons 78b and 78c are arranged in a line at the center in the left-right direction on the top surface of the housing 77. The operation buttons 78d and 78e are arranged in a line in the front-rear direction on the front surface of the housing 77.

Next, with reference to FIG. 14, an internal structure of the controller 7 will be described. FIG. 14 is a block diagram illustrating the structure of the controller 7.

As shown in FIG. 14, the core unit 70 includes the communication section 75 and the acceleration sensor 701 in addition to the aforementioned operation section 72 and the imaging information calculation section 74.

The imaging information calculation section 74 includes the infrared filter 741, the lens 742, the image pickup element 743 and the image processing circuit 744. The infrared filter 741 allows only infrared light to pass therethrough, among light incident on the front surface of the core unit 70. The lens 742 collects the infrared light which has passed through the infrared filter 741 and outputs the infrared light to the image pickup element 743. The image pickup element 743 is a solid-state image pickup device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs process result data representing the identified position coordinates and size of the area to the communication section 75. The imaging information calculation section 74 is fixed to the housing 71 of the core unit 70. The imaging direction of the imaging information calculation section 74 can be changed by changing the direction of the housing 71. The housing 71 is connected to the subunit 76 by the flexible connecting cable 79, and therefore the imaging direction of the imaging information calculation section 74 is not changed by changing the direction and position of the subunit 76. As described later in detail, a signal can be obtained in accordance with the position and the motion of the core unit 70 based on the process result data outputted by the imaging information calculation section 74.

The core unit 70 preferably includes a three-axis, linear acceleration sensor 701 that detects linear acceleration in three directions, i.e., the up/down direction, the left/right direction, and the forward/backward direction. Alternatively, a two axis linear accelerometer that only detects linear acceleration along each of the up/down and left/right directions (or other pair of directions) may be used in another embodiment depending on the type of control signals desired. As a non-limiting example, the three-axis or two-axis linear accelerometer 701 may be of the type available from Analog Devices, Inc. or STMicroelectronics N. V. Preferably, the acceleration sensor 701 is an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the three-axis or two-axis acceleration sensor 701.

As one skilled in the art understands, linear accelerometers, as used in acceleration sensor 701, are only capable of detecting acceleration along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 701, additional information relating to the core unit 70 can be inferred or calculated, as one skilled in the art will readily understand from the description herein. For example, by detecting static, linear acceleration (i.e., gravity), the linear acceleration output of the acceleration sensor 701 can be used to infer tilt of the object relative to the gravity vector by correlating tilt angles with detected linear acceleration. In this way, the acceleration sensor 701 can be used in combination with the micro-computer 751 (or another processor) to determine tilt, attitude or position of the core unit 70. Similarly, various movements and/or positions of the core unit 70 can be calculated or inferred through processing of the linear acceleration signals generated by the acceleration sensor 701 when the core unit 70 containing the acceleration sensor 701 is subjected to dynamic accelerations by, for example, the hand of a user, as explained herein. In another embodiment, the acceleration sensor 701 may include an embedded signal processor or other type of dedicated processor for performing any desired processing of the acceleration signals output from the accelerometers therein prior to outputting signals to microcomputer 751. For example, the embedded or dedicated processor could convert the detected acceleration signal to a corresponding tilt angle when the acceleration sensor is intended to detect static acceleration (i.e., gravity). Data representing the acceleration detected by the acceleration sensor 701 is outputted to the communication section 75.

In another exemplary embodiment, the acceleration sensor 701 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 107, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application.

More specifically, when a tilt or inclination is calculated using a gyroscope instead of the acceleration sensor, significant changes are necessary. Specifically, when using a gyro-sensor, the value of inclination is initialized at the start of detection. Then, data on the angular velocity which is output from the gyroscope is integrated. Next, a change amount in inclination from the value of inclination previously initialized is calculated. In this case, the calculated inclination corresponds to an angle. In contrast, when an acceleration sensor is used, the inclination is calculated by comparing the value of the acceleration of gravity of each axial component with a predetermined reference. Therefore, the calculated inclination can be represented as a vector. Thus, without initialization, an absolute direction can be determined with an accelerometer. The type of the value calculated as an inclination is also very different between a gyroscope and an accelerometer; i.e., the value is an angle when a gyroscope is used and is a vector when an accelerometer is used. Therefore, when a gyroscope is used instead of an acceleration sensor or vice versa, data on inclination also needs to be processed by a predetermined conversion that takes into account the fundamental differences between these two devices. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the process.

Data from the core unit 70 including an operation signal (core key data) from the operation section 72, acceleration signals (acceleration data) from the acceleration sensor 701, and the process result data from the imaging information calculation section 74 are outputted to the microcomputer 751. An operation signal (sub key data) from the operation section 78 of the subunit 76 is outputted to the microcomputer 751 via the connecting cable 79. The microcomputer 751 temporarily stores the input data (core key data, sub key data, acceleration data, and process result data) in the memory 752 as the transmission data which is to be transmitted to the receiving unit 6. The wireless transmission from the communication section 75 to the receiving unit 6 is performed periodically at a predetermined time interval. Since game process is generally performed at a cycle of 1/60 sec., the wireless transmission needs to be performed at a cycle of a shorter time period. Specifically, the game process unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to transmit the operation information from the antenna 754 as a carrier wave signal of a predetermined frequency. Thus, the core key data from the operation section 72 included in the core unit 70, the sub key data from the operation section 78 included in the subunit 76, acceleration data from the acceleration sensor 701, and the process result data from the imaging information calculation section 74 are transmitted from the core unit 70. The receiving unit 6 of the game apparatus 3 receives the carrier wave signal, and the game apparatus 3 demodulates or decodes the carrier wave signal to obtain the series of operation information (the core key data, the sub key data, the acceleration data, and the process result data). Based on the obtained operation information and the game program, the CPU 30 of the game apparatus 3 performs the game process. In the case where the communication section 75 is structured using the Bluetooth (registered trademark) technology, the communication section 75 can have a function of receiving transmission data which is wirelessly transmitted from other devices. The acceleration data and/or process result data are included in first operation data and the sub key data is included in the second operation data.

Figure 19:
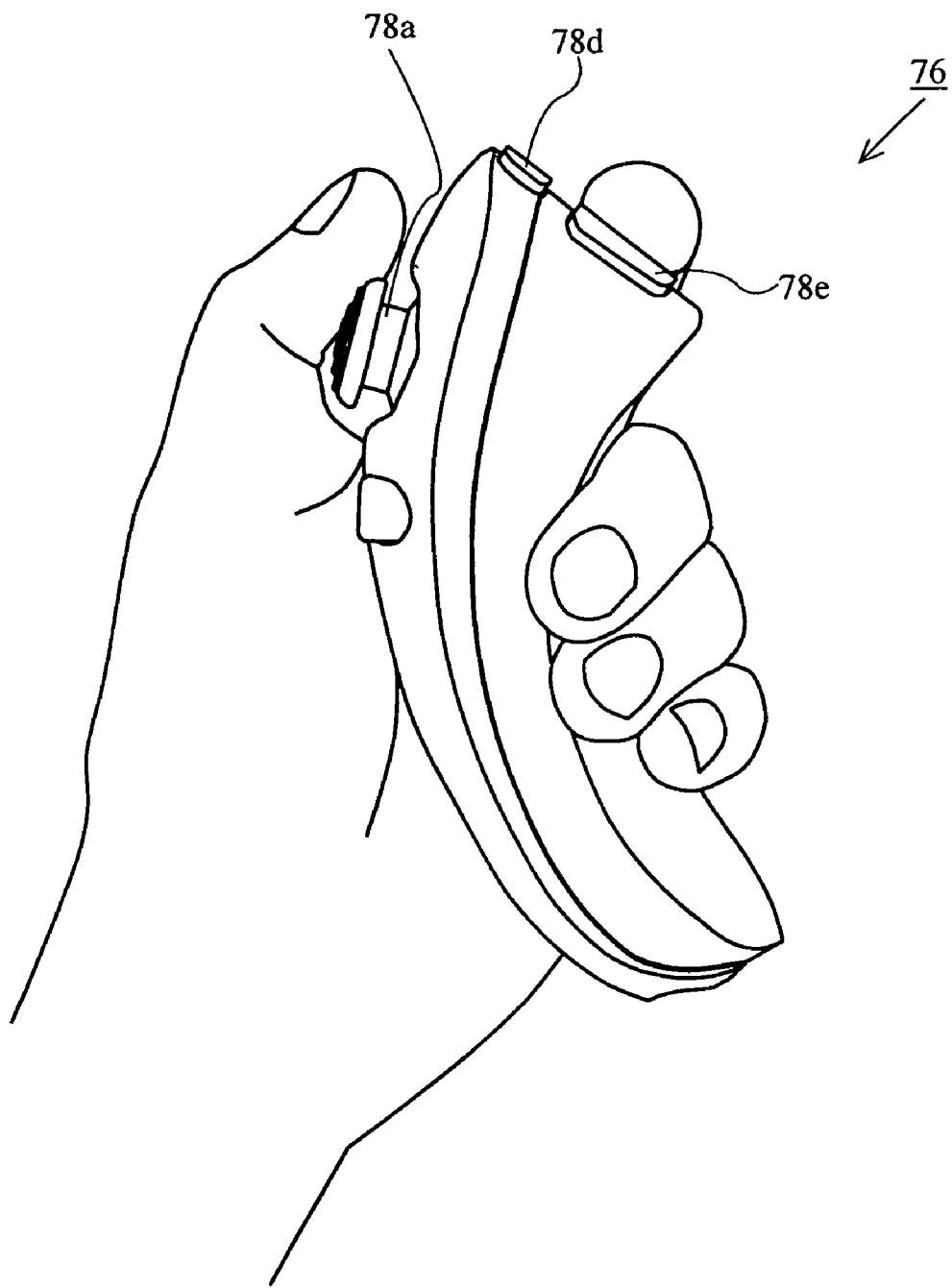
FIG. 19 shows an exemplary state of a player holding the subunit 76 with a left hand as seen from the right side of the subunit 76.

As shown in FIG. 15, in order to play a game using the controller 7 with the game system 1, a player holds the core unit 70 with one hand (for example, a right hand) (see FIGS. 16 and 17), and holds the subunit 76 with the other hand (for example, a left hand) (see FIG. 19). The player holds the core unit 70 so as to point the front surface of the core unit 70 (that is, a side having an entrance through which light is incident on the imaging information calculation section 74 taking an image of the light) to the monitor 2. On the other hand, two LED modules 8L and 8R are provided in the vicinity of the display screen of the monitor 2. The LED modules 8L and 8R each outputs infrared light forward from the monitor 2.

When a player holds the core unit 70 so as to point the front surface thereof to the monitor 2, infrared lights outputted by the two LED modules 8L and 8R are incident on the imaging information calculation section 74. The image pickup element 743 takes images of the infrared lights incident through the infrared filter 741 and the lens 742, and the image processing circuit 744 processes the taken images. The imaging information calculation section 74 detects infrared components outputted by the LED modules 8L and 8R so as to obtain positions (a position of a subject image) and area information of the LED modules 8L and 8R in the taken images. Specifically, the image processing circuit 744 analyzes image data taken by the image pickup element 743, eliminates images which do not represent the infrared lights outputted by the LED modules 8L and 8R from the area information, and further identifies points each having a high brightness as positions of the LED modules 8L and 8R. The imaging information calculation section 74 obtains positional information such as the center of gravity of each of the identified points having the high brightness and outputs the positional information as the process result data. Here, as the positional information outputted as the process result data, a coordinate value based on a predetermined originating reference point (for example, the center or the upper left corner of the taken image) in the taken image may be outputted, or a difference between a reference point having a high brightness identified at a predetermined timing and a currently identified point having a high brightness may be outputted as a vector. That is, in the case where a predetermined reference point is set in the image taken by the image pickup element 743, the positional information of the subject image represents a parameter corresponding to a difference from the predetermined reference point. When such process result data is transmitted to the game apparatus 3, the game apparatus 3 can obtain, based on the difference between a value represented by the positional information and a value represented by the reference point, an amount by which a signal changes in accordance with a motion, a posture, a position and the like of the imaging information calculation section 74, i.e., the core unit 70, with respect to the LED modules 8L and 8R. Specifically, the position having a high brightness in the image obtained through the communication section 75 is changed in accordance with the motion of the core unit 70, and therefore a direction input or coordinate input is performed in accordance with the position having the high brightness being changed, thereby enabling the direction input or the coordinate input to be performed along the moving direction of the core unit 70. In an exemplary game process described later, the imaging information calculation section 74 obtains coordinates of the center of gravity for each subject image of the LED modules 8L and 8R in the taken image, and outputs the coordinates of the center of gravity as the process result data.

Thus, the imaging information calculation section 74 of the core unit 70 takes images of stationary markers (infrared lights from the two LED modules 8L and 8R in the present embodiment), and the game apparatus 3 processes data outputted by the core unit 70 during the game process, whereby enabling an operation to be performed in accordance with the motion, posture, position and the like of the controller. Therefore, an operation input, which is different from an input made by pressing an operation button or using an operation key, is intuitively performed. As described above, since the markers are provided in the vicinity of the display screen of the monitor 2, the motion, posture, position and the like of the core unit 70 with respect to the display screen of the monitor 2 can be easily calculated based on positions from the markers. That is, the process result data used for obtaining the motion, posture, position and the like of the core unit 70 can be used as operation input immediately applied to the display screen of the monitor 2.

Figure 16:
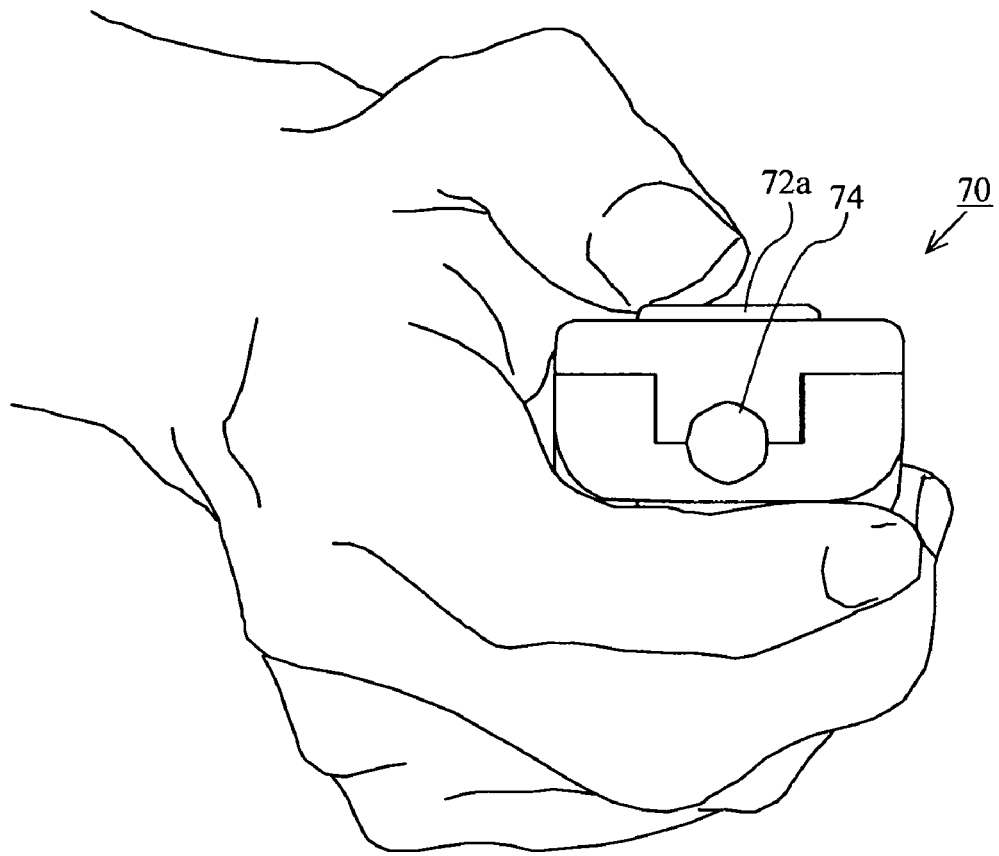
FIG. 16 shows an exemplary state of a player holding the core unit 70 with a right hand as seen from the front side of the core unit 70.

With reference to FIGS. 16 and 17, a state of a player holding the core unit 70 with one hand will be described. FIG. 16 shows an exemplary state of a player holding the core unit 70 with a right hand as seen from the front surface side of the core unit 70. FIG. 17 shows an exemplary state of a player holding the core unit 70 with a right hand as seen from the left side of the core unit 70.

As shown in FIGS. 16 and 17, the overall size of the core unit 70 is small enough to be held by one hand of an adult or even a child. When the player puts a thumb on the top surface of the core unit 70 (for example, near the cross key 72a), and puts an index finger in the recessed portion on the bottom surface of the core unit 70 (for example, near the operation button 72i), the light entrance of the imaging information calculation section 74 on the front surface of the core unit 70 is exposed forward to the player. It should be understood that also when the player holds the core unit 70 with a left hand, the holding state is the same as that described for the right hand.

Thus, the core unit 70 allows a player to easily operate the operation section 72 such as the cross key 72a or the operation button 72i while holding the core unit 70 with one hand. Further, when the player holds the core unit 70 with one hand, the light entrance of the imaging information calculation section 74 on the front surface of the core unit 70 is exposed, whereby the light entrance can easily receive infrared lights from the aforementioned two LED modules 8L and 8R. That is, the player can hold the core unit 70 with one hand without preventing the imaging information calculation section 74 of the core unit 70 from functioning. That is, when the player moves his or her hand holding the core unit 70 with respect to the display screen, the core unit 70 can further perform an operation input enabling a motion of the player's hand to directly act on the display screen.

Figure 18:
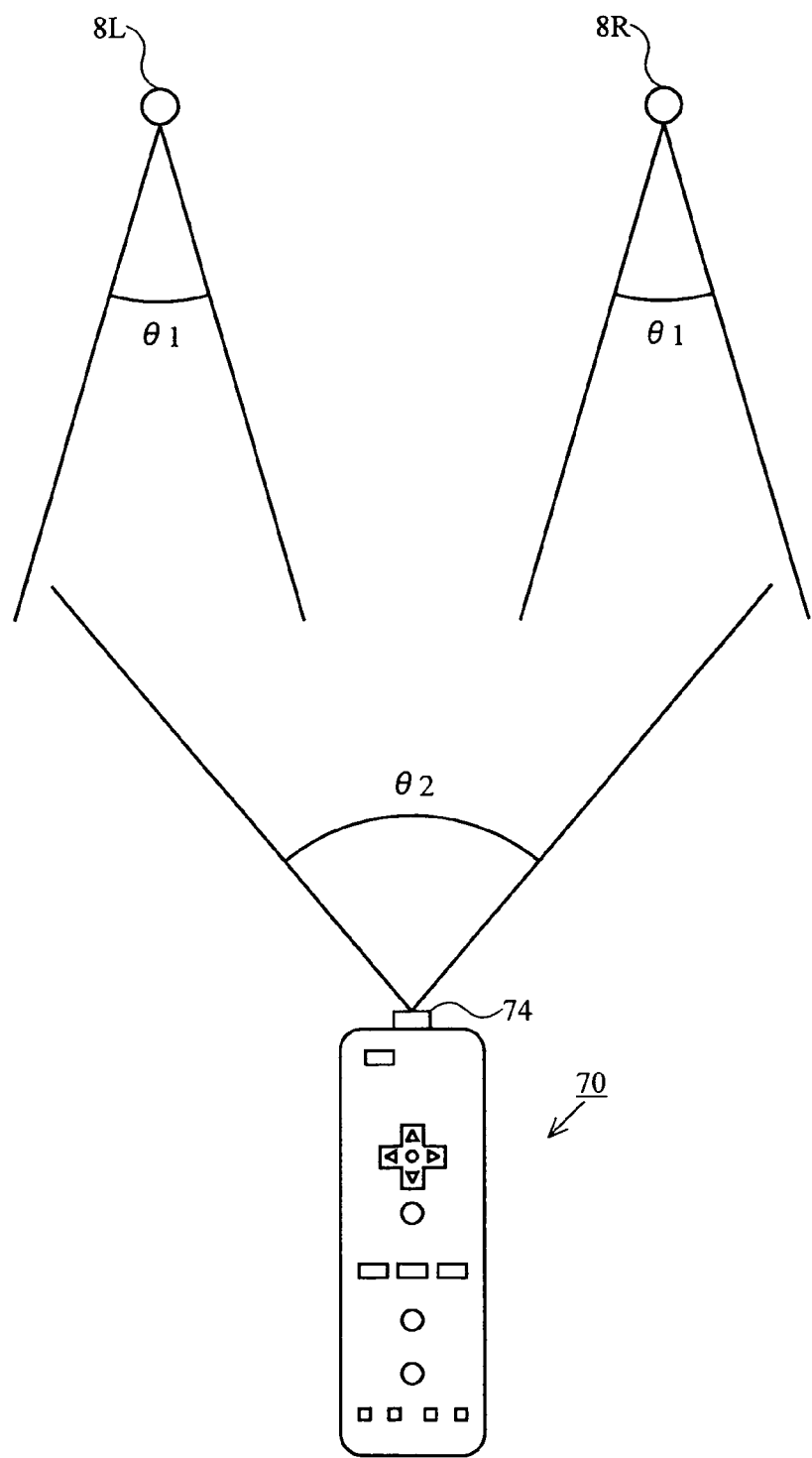
FIG. 18 is a diagram illustrating a viewing angle of a LED module 8L, a viewing angle of a LED module 8R, and a viewing angle of an imaging information calculation section 74.

As shown in FIG. 18, the LED modules 8L and 8R each has a viewing angle θ1. The image pickup element 743 has a viewing angle θ2. For example, the viewing angle θ1 of the LED modules 8L and 8R is 34 degrees (half-value angle), and the viewing angle θ2 of the image pickup element 743 is 41 degrees. When both the LED modules 8L and 8R are in the viewing angle θ2 of the image pickup element 743, and the image pickup element 743 is in the viewing angle θ1 of the LED module 8L and the viewing angle θ1 of the LED module 8R, the game apparatus 3 determines a position of the core unit 70 using positional information relating to the points having high brightness of the two LED modules 8L and 8R.

When either the LED module 8L or LED module 8R is in the viewing angle θ2 of the image pickup element 743, or when the image pickup element 743 is in either the viewing angle θ1 of the LED module 8L or the viewing angle θ1 of the LED module 8R, the game apparatus 3 determines a position of the core unit 70 using the positional information relating to the points having high brightness of the LED module 8L or the LED module 8R.

Next, with reference to FIG. 19, a state of a player holding the subunit 76 with one hand will be described. FIG. 19 shows an exemplary state of a player holding the subunit 76 with a left hand as seen from the right side of the subunit 76.

As shown in FIG. 19, the overall size of the subunit 76 is small enough to be held by one hand of an adult or even a child. For example, a player can put a thumb on the top surface of the subunit 76 (for example, near the stick 78a), put an index finger on the front surface of the subunit 76 (for example, near the operation buttons 78d and 78e), and put a middle finger, a ring finger and a little finger on the bottom surface of the subunit 76 so as to hold the subunit 76. It should be understood that also when the player holds the subunit 76 with a right hand, the holding state is similar to that described for the left hand. Thus, the subunit 76 allows the player to easily operate the operation section 78 such as the stick 78a and the operation buttons 78d and 78e while holding the subunit 76 with one hand.

Figure 20:
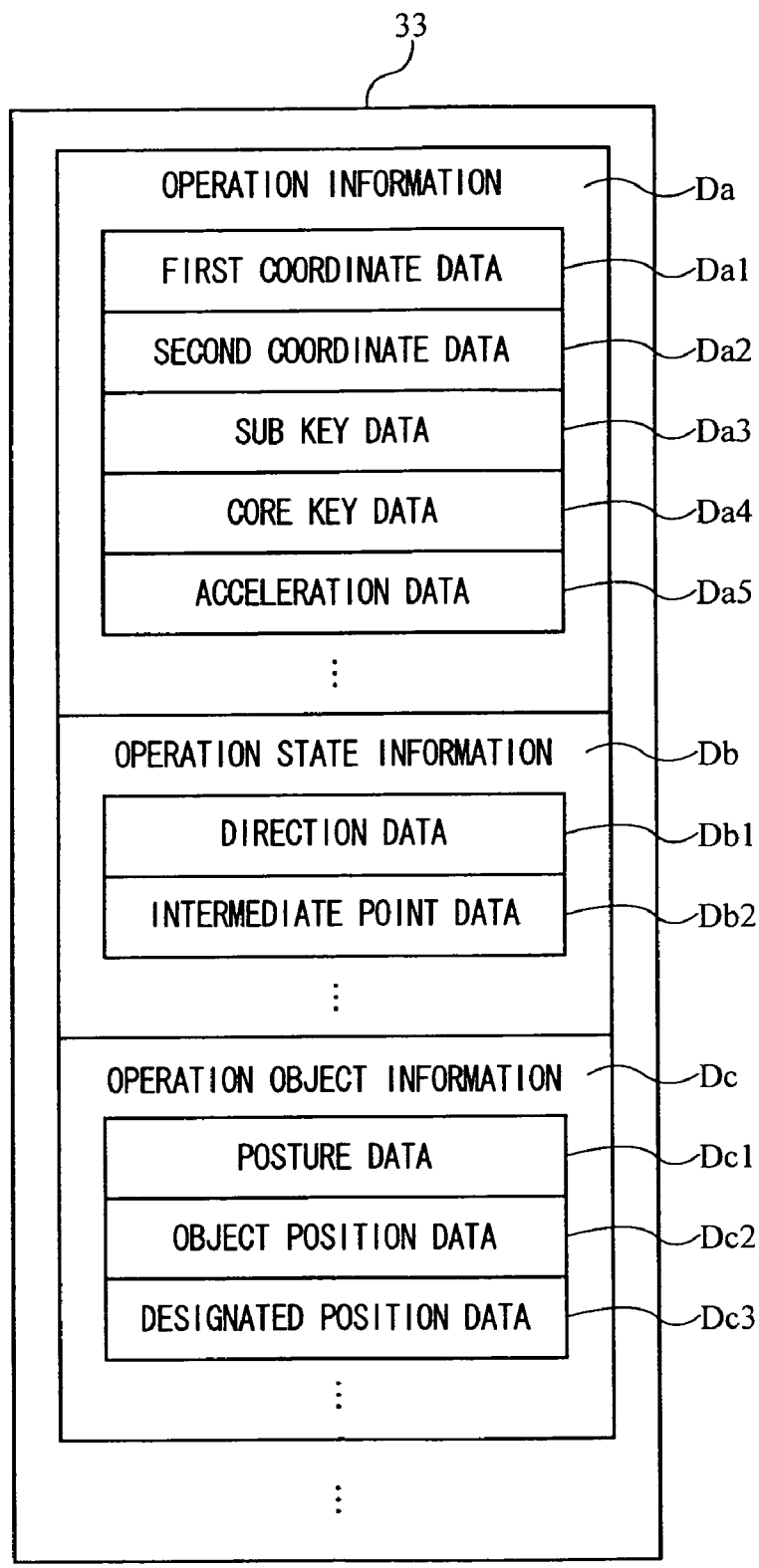
FIG. 20 is a diagram illustrating main data stored in a main memory 33 of the game apparatus 3.

Next, a game process performed by the game system 1 will be described in detail. Initially, with reference to FIG. 20, main data used for the game process will be described. FIG. 20 is a diagram illustrating main data stored in the main memory 33 of the game apparatus 3.

As shown in FIG. 20, the main memory 33 stores operation information Da, operation state information Db, operation object information Dc, and the like. The main memory 33 stores data necessary for the game process such as data relating to a player character appearing in the game (image data, position data and the like of the player character), data relating to a game space (for example, topography data), and the like, in addition to data contained in the information shown in FIG. 20.

The operation information Da is a series of operation information transmitted as transmission data from the controller 7, and is updated to the latest operation information. The operation information Da includes first coordinate data Da1 and second coordinate data Da2 corresponding to the process result data described above. The first coordinate data Da1 represents coordinates of a position (a position in the taken image) of an image of one of the two markers (the LED modules 8L and 8R) in the image taken by the image pickup element 743. The second coordinate data Da2 represents coordinates of a position (a position in the taken image) of an image of the other marker. For example, the position of the image of the marker is represented using an x-y coordinate system of the taken image.

Further, the operation information Da includes sub key data Da3 obtained by the operation section 78, core key data Da4 obtained by the operation section 72, acceleration data Da5 obtained by the acceleration sensor 701, and the like, in addition to the coordinate data (the first coordinate data Da1 and the second coordinate data Da2) included in the process result data obtained from the taken image. The receiving unit 6 of the game apparatus 3 receives operation information Da transmitted from the controller 7 at regular time intervals, for example, every 5 ms, and stores the operation information Da in a buffer (not shown) of the receiving unit. Thereafter, the operation information Da is read at game process intervals, for example, every one frame (every 1/60 seconds), and the latest operation information is stored in the main memory 33.

The operation state information Db represents an operation state of the controller 7 determined based on the taken image. The operation state information Db indicates a position and a direction of the subject image (marker) contained in the taken image, and specifically includes direction data Db1 and intermediate point data Db2. The direction data Db1 indicates a direction from a position represented by the first coordinate data Da1 to a position represented by the second coordinate data Da2. Here, the direction data Db1 represents a vector starting at the position represented by the first coordinate data Da1 and ending at the position represented by the second coordinate data Da2. The intermediate point data Db2 indicates coordinates of an intermediate point between the position represented by the first coordinate data Da1 and the position represented by the second coordinate data Da2. Here, when an image of the two markers (LED modules 8L and 8R) is regarded as one subject image, the intermediate point data Db2 indicates a position of the subject image.

The operation object information Dc indicates a posture and a position of an operation object or a designated position on the screen or in the game space. Here, the operation object is an object displayed on the screen and an object appearing in a virtual game space. In addition thereto, when a three-dimensional virtual game space is constructed, the operation object may be a virtual camera for displaying the virtual game space on the screen. Further, the operation object information Dc includes posture data Dc1, object position data Dc2 and designated position data Dc3. The posture data Dc1 represents a posture of the operation object. The object position data Dc2 represents a position of the operation object in the game space or on the screen. The designated position data Dc3 represents a position which is on the screen of the monitor 2, designated by the core unit 70, and obtained based on the first coordinate data Da1 and the second coordinate data Da2.

Next, with reference to FIG. 21, the game process performed by the game apparatus 3 will be described in detail.

Figure 21:
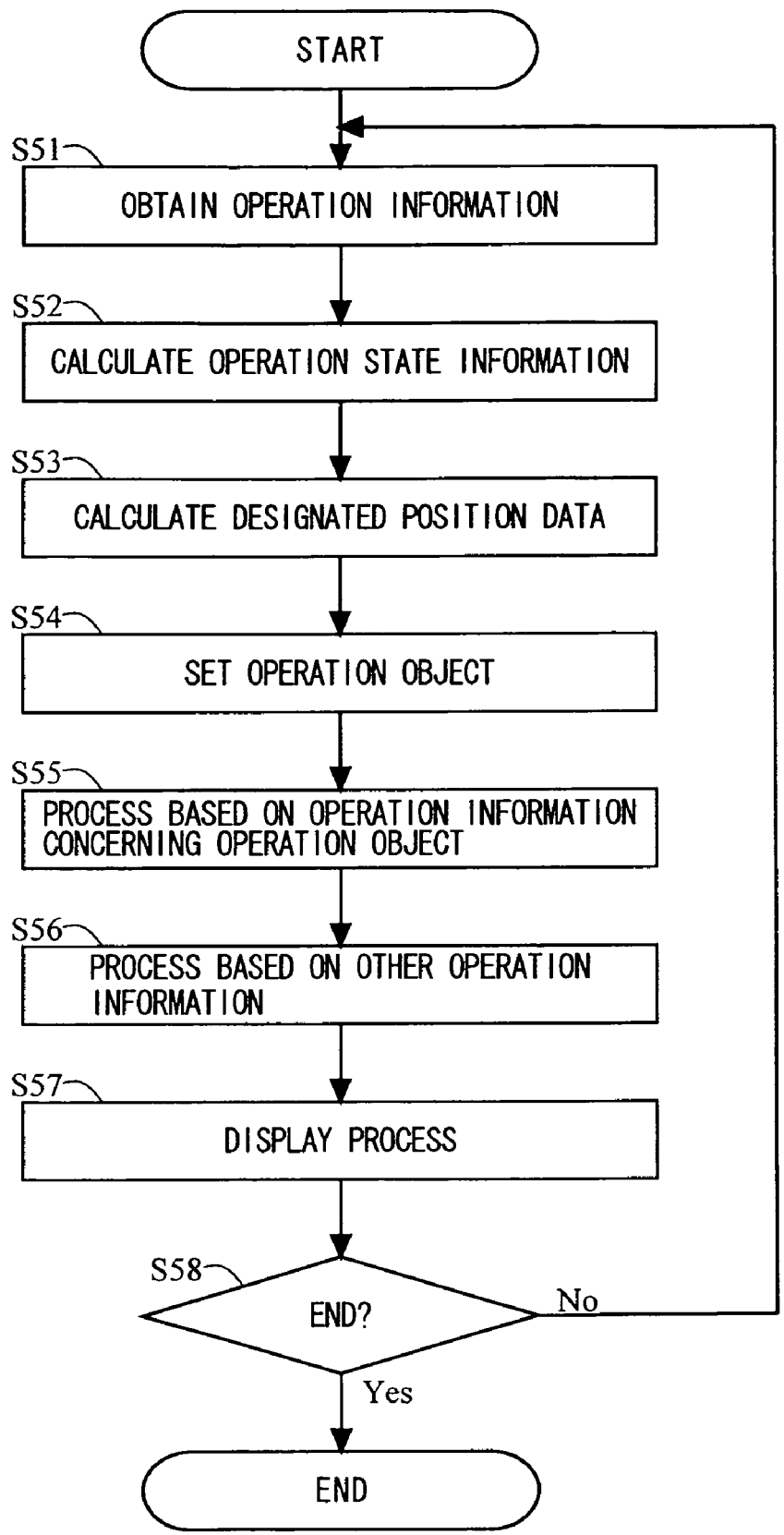
FIG. 21 is a flow chart illustrating a flow of a game process performed by the game apparatus 3.

FIG. 21 is a flow chart illustrating a flow of a game process performed by the game apparatus 3. When the game apparatus 3 is powered on, the CPU 30 of the game apparatus 3 executes a boot program stored in a boot ROM not shown so as to initialize each unit such as the main memory 33. The game program stored in the optical disc 4 is loaded to the main memory 33 and the CPU 30 starts to execute the game program. The flow chart of FIG. 21 shows a game process performed after these processes are completed. The flow chart of FIG. 21 shows only a game process performed based on a game operation using the controller 7, and other game processes, which are not directly relevant to the present invention, are not described in detail. In FIG. 21, each step executed by the CPU 30 is abbreviated as "S".

As shown in FIG. 21, the CPU 30 obtains operation information having been received from the controller 7 in step 51, and advances the process to the next step. The CPU 30 stores the obtained operation information as the operation information Da in the main memory 33. The operation information obtained in step 51 includes data (sub key data Da3 and core key data Da4) indicating how the operation section 72 of the core unit 70 and the operation section 78 of the subunit 76 are operated, and data (acceleration data Da5) indicating an acceleration detected by the acceleration sensor 701, in addition to the coordinate data (the first coordinate data Da1 and the second coordinate data Da2) indicating positions of the LED modules 8L and 8R in the taken image. Here, the communication section 75 transmits the operation information to the game apparatus 3 at regular time intervals, for example, at intervals of 5 ms. The CPU 30 uses the operation information for each frame. Accordingly, a process loop of steps 51 to 58 shown in FIG. 21 is one frame which is repeatedly executed.

Next, the CPU 30 calculates the operation state information in step 52, and advances the process to the next step. In the process of calculating the operation state information, the CPU 30 calculates the operation state of the core unit 70 such as a motion, position, and posture of the core unit 70 based on the first coordinate data Da1 and the second coordinate data Da2 which are transmitted from the controller 7 and stored.

In step 52, the CPU 30 calculates the direction data Db1 representing a direction from a position represented by the first coordinate data Da1 to a position represented by the second coordinate data Da2. Specifically, the CPU 30 calculates a vector starting at the position represented by the first coordinate data Da1 and ending at the position represented by the second coordinate data Da2, with reference to the first coordinate data Da1 and the second coordinate data Da2. The CPU 30 stores data of the vector having been calculated as the direction data Db1 in the main memory 33. A rotation about an axis perpendicular to an imaging surface of the core unit 70 can be calculated based on a difference between the direction represented by the direction data Db1 and a predetermined reference direction.

Further, the CPU 30 calculates the intermediate point data Db2 representing an intermediate point between the position represented by the first coordinate data Da1 and the position represented by the second coordinate data Da2. Specifically, the CPU 30 calculates coordinates of the intermediate point with reference to the first coordinate data Da1 and the second coordinate data Da2. The CPU 30 stores data of the intermediate point coordinates having been calculated as the intermediate point data Db2 in the main memory 33. Here, the intermediate point data Db2 represents a position of the subject image (the LED modules 8L and 8R) in the taken image. Change in image position can be calculated in accordance with change in position of the core unit 70 based on a difference between the position represented by the intermediate point data Db2 and a predetermined reference position.

Next, the CPU 30 calculates the designated position data in step 53, and advances the process to the next step. The CPU 30 calculates the designated position data Dc3 using the direction data Db1 and the intermediate point data Db2 having been calculated in step 52.

For example, a case where a player designates the center of the screen of the monitor 2 having the two LED modules 8L and 8R on the top surface thereof (see FIG. 15) by using the core unit 70 having its top surface pointed upward will be described, that is, a case where the center of the screen appears at the center of the image taken by the imaging information calculation section 74 will be described. In this case, in the image taken by the imaging information calculation section 74, the intermediate point of the subject image (the intermediate point between the LED modules 8L and 8R) does not coincide with the designated position (the center of the screen). Specifically, the position of the subject image in the taken image is upward to the center of the taken image. For example, a reference position is set such that when the subject image is positioned upward to the center of the taken image as described above, it is determined that the center of the screen is designated. In this case, the designated position on the screen is moved in accordance with the position of the subject image in the taken image moving in accordance with the motion of the core unit 70 (the moving directions are reverse to each other), and therefore a position on the screen can be designated in accordance with the moving direction of the core unit 70. In order to set the reference position, when a user previously designates a predetermined position on the screen as described above, the position of the subject image at this time may be associated with a reference designated position and stored. Alternatively, when the position of the subject image is fixed with respect to the screen, the reference position may be predetermined. The designated position is calculated using a function for calculating coordinates (designated position data Dc3) on the screen of the monitor 2 based on the intermediate point data Db2. Using the function, a coordinate value of the intermediate point calculated using a certain image being taken is converted into coordinates representing a position (designated position) on the screen designated by the core unit 70 which is taking the certain image. Using the function, the designated position on the screen can be calculated based on the coordinates of the intermediate point. When the coordinates of the intermediate point are converted into coordinates representing a position in a game space, the position on the screen calculated using the aforementioned function may be converted into a position in the game space corresponding to the position on the screen. The position in the game space corresponding to the position on the screen is a position in the game space displayed at the position on the screen.

However, when a player designates the center of the screen of the monitor 2 using the core unit 70 having its top surface pointed in a direction (for example, the right direction) other than the upward direction, the position of the subject image in the taken image is offset from the center of the taken image in a direction (for example, the left direction) other than the upward direction. That is, since the core unit 70 is inclined, the moving direction of the core unit 70 does not coincide with a direction in which the designated position is to move on the screen. In this case, the intermediate point data Db2 is corrected based on the direction data Db1. Specifically, the intermediate point data Db2 calculated in step 52 is corrected so as to represent the coordinates of the intermediate point obtained when the core unit 70 has its top surface pointed upward. More specifically, a reference of the direction data is set when the reference position is set, and a position of the coordinates represented by the intermediate point data Db2 calculated in step 52 is rotated about the center of the taken image by an amount corresponding to an angular difference between the direction represented by the direction data Db1 and the reference direction so as to correct the intermediate point data Db2. Using the intermediate point data Db2 having been corrected, the designated position data Dc3 is calculated as described above.

Next, the CPU 30 sets an operation object to be controlled by the controller 7 in step 54, and advances the process to the next step. The CPU 30 sets the respective operation objects of the respective operation sections, the imaging information calculation section 74, the sensor and the like in the controller 7.

For example, the operation object is changed depending on a game progress or a player's operation as necessary. For example, the operation object designated by a signal from the imaging information calculation section 74 of the core unit 70 is set as an object positioned at a position in the virtual game world having been converted from the designated position. Further, when a menu screen is displayed on the monitor 2 so as to allow a player to select from a plurality of choices, the operation object designated by a signal from the imaging information calculation section 74 is set as one of the plurality of choices displayed on the designated position. The operation object of the stick 78a on the subunit 76 is set as one of objects which appear in the virtual game world and are currently displayed on the monitor 2.

Alternatively, the operation object may be fixedly set. For example, the operation object of the stick 78a on the subunit 76 is fixed as a player character appearing in the virtual game space. The operation object designated by a signal from the imaging information calculation section 74 of the core unit 70 is fixed as a cursor such as a target cursor displayed on the monitor 2 or the virtual camera for displaying the virtual game space on the screen. When the operation object is fixedly set, it is unnecessary that the operation object is repeatedly set for each process loop. Therefore, step 54 may be performed only in the initialization of the game process.

Next, the CPU 30 performs a process on the operation object in step 55. In step 55, the CPU 30 performs the process on the operation object set in step 54 in accordance with the operation information Da, and updates the posture data Dc1 and the object position data Dc2. For example, when the operation object of the stick 78a is the player character or the virtual camera, the position of the player character or the virtual camera is moved or the direction of the virtual camera is changed in accordance with the sub key data Da3 of the stick 78a. When the operation object of the imaging information calculation section 74 in the core unit 70 is the target cursor, the virtual camera, or the menu screen, the position of the target cursor is moved, the direction of the virtual camera is changed or one or more choices are selected from the menu screen. In step 56, the CPU 30 performs processes in accordance with other operation information Da which have not been used in step 55, and advances the process to the next step. An exemplary process based on the operation information Da will be specifically described later.

Next, the CPU 30 performs display process in step 57 and advances the process to the next step. The CPU 30 generates a game image with reference to the operation object information Dc and data necessary for generating the game image (image data and position data of a player character, topography data and the like), which are stored in the main memory 33. The CPU 30 displays the generated image on the screen of the monitor 2.

Next, the CPU 30 determines in step 58 whether or not the game is to be ended. When a game end condition is satisfied, for example, when the game is over since a parameter indicating a physical capacity of the player character is zero, or when a player performs an operation for ending the game, the game is to be ended. When the game is not to be ended, the CPU 30 returns the process to step 51 and repeats the process. When the game is to be ended, the CPU 30 ends the process according to the flow chart.

Thus, the imaging information calculation section 74 of the core unit 70 takes images of the stationary markers (infrared lights from the two LED modules 8L and 8R in the present embodiment), whereby a function of an apparatus for intuitively performing an operation in accordance with a position of the core unit 70 based on the markers can be realized. The game apparatus 3 uses a position of the core unit 70 as operation data based on a player's operation during the game process so as to provide an operation input which is different from an operation input by pressing an operation button or by using an operation key. As described above, the markers are provided in the vicinity of the display screen of the monitor 2, whereby a position of the core unit 70 based on the markers can be easily converted into a position of the core unit 70 on the display screen of the monitor 2. That is, the operation data relating to a position and a posture of the core unit 70 can be used as an operation input directly acting on the display screen of the monitor 2.

Figure 22:
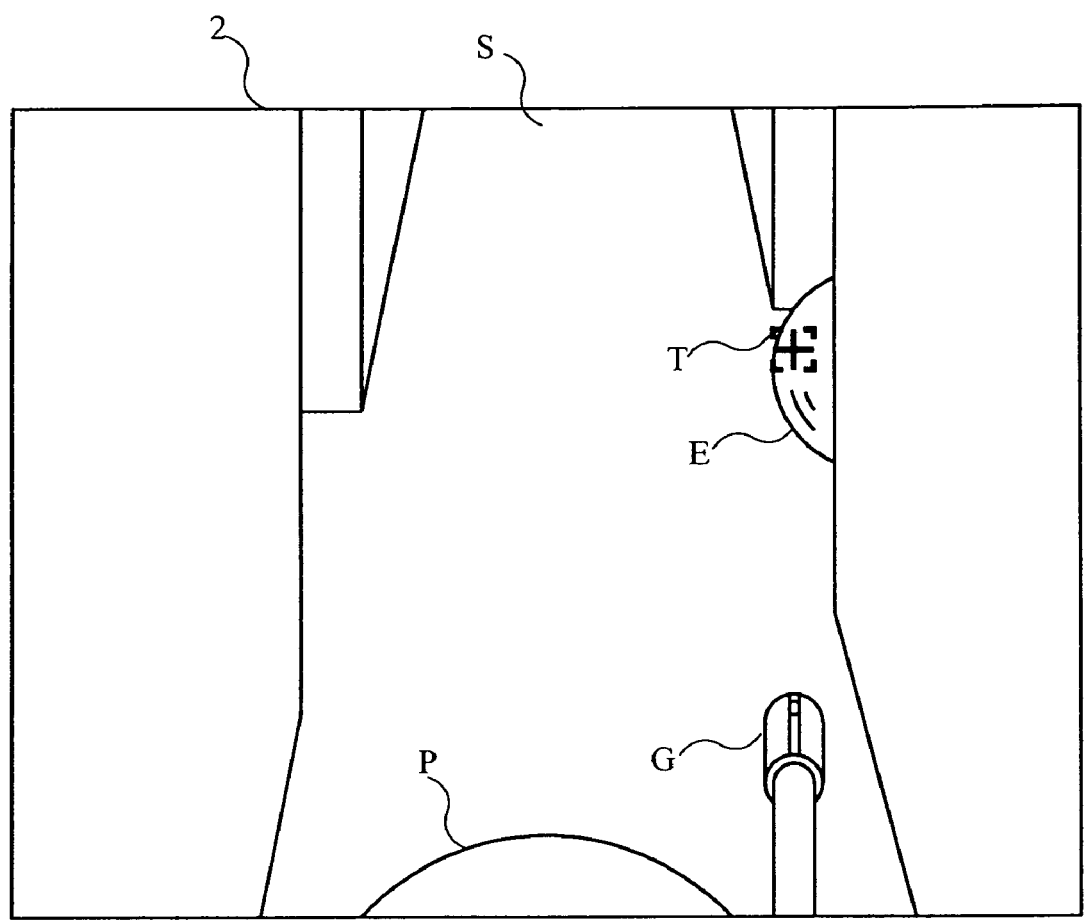
FIG. 22 is a diagram illustrating an exemplary game image displayed on a monitor 2 when the game apparatus 3 executes a shooting game as a first example.

Here, an exemplary game played using the aforementioned controller 7 will be described. As a first example, a shooting game played using the controller 7 will be described. FIG. 22 is a diagram illustrating an exemplary game image displayed on the monitor 2 when the game apparatus 3 executes the shooting game as the first example.

As shown in FIG. 22, a portion of a three-dimensional virtual game space S is displayed on the display screen of the monitor 2. As a game object acting in accordance with an operation of the controller 7, a portion of the player character P and a portion of a gun G held by the player character P are displayed on the display screen. Moreover, the virtual game spaces displayed on the display screen represents a field of front vision of the player character P, and for example an opponent character E is displayed as a shooting target in FIG. 22. A target to be shot by the player character P with the gun G is displayed on the display screen as the target cursor T.

In the shooting game having such a game image displayed on the monitor 2, a player operates the core unit 70 with one hand and operates the subunit 76 with the other hand as shown in FIG. 15 so as to play the game. The operation object of the stick 78a on the subunit 76 is fixedly set as the player character P. Further, the operation object of the imaging information calculation section 74 of the core unit 70 is fixedly set as the target cursor T. When the operation objects are set as described above, the player inclines the stick 78a on the subunit 76, whereby the player character P is moved in the virtual game space S in accordance with the inclining direction. Further, the player moves his or her hand holding the core unit 70 with respect to the display screen, whereby a designated position on the monitor 2 having the LED modules 8L and 8R is set and the target cursor T is moved to the designated position. When the player presses the operation button 72i (shown in FIG. 6) on the core unit 70, the player character P shoots the gun G at a position in the virtual three-dimensional space corresponding to a position of the target cursor T. When the opponent character E is at the shooting position, the opponent character E is damaged or destroyed.

That is, while the player uses the stick 78a on the subunit 76 so as to instruct the player character P to move, the player can operate the core unit 70 as if the core unit 70 is a gun for the shooting game, thereby enhancing enjoyment in playing a shooting game. Further, since a direction in which a position designated by the core unit 70 is to move with respect to the screen of the monitor 2 is the same as a direction in which the target cursor T is to move, the player can easily and intuitively recognize the operation direction. The player can perform an operation of moving the player character P and an operation of moving the target cursor T by using respective units held by different hands, whereby the player can perform the respective operations as independent ones. For example, since the virtual game space S displayed on the display screen is changed in accordance with the movement of the player character P, it is sometimes difficult to keep the target positioned near a position observed by the player in the virtual game space S because, for example, the player may be paying attention to the opponent character E suddenly jumping into the virtual game space S. However, while the player is moving the player character P with one hand (for example, a thumb of a left hand), the player can move the arm (for example, a right arm) which is not used for moving the player character P such that a position designated by the core unit 70 coincides with the observed position, thereby substantially enhancing flexibility for operating the controller 7 and increasing the reality of the shooting game. Since a player can perform a direction indication operation for moving the player character P and a direction indication operation for moving the target cursor T without one operation influencing the other, the player can perform two stable direction instruction operations. That is, by using the controller 7, the player can freely use his or her left and right hands and can perform a new operation which has increased flexibility and which cannot be achieved using a physically single controller. Further, the player can use the two units based on his or her dominant hand.

Figure 23:
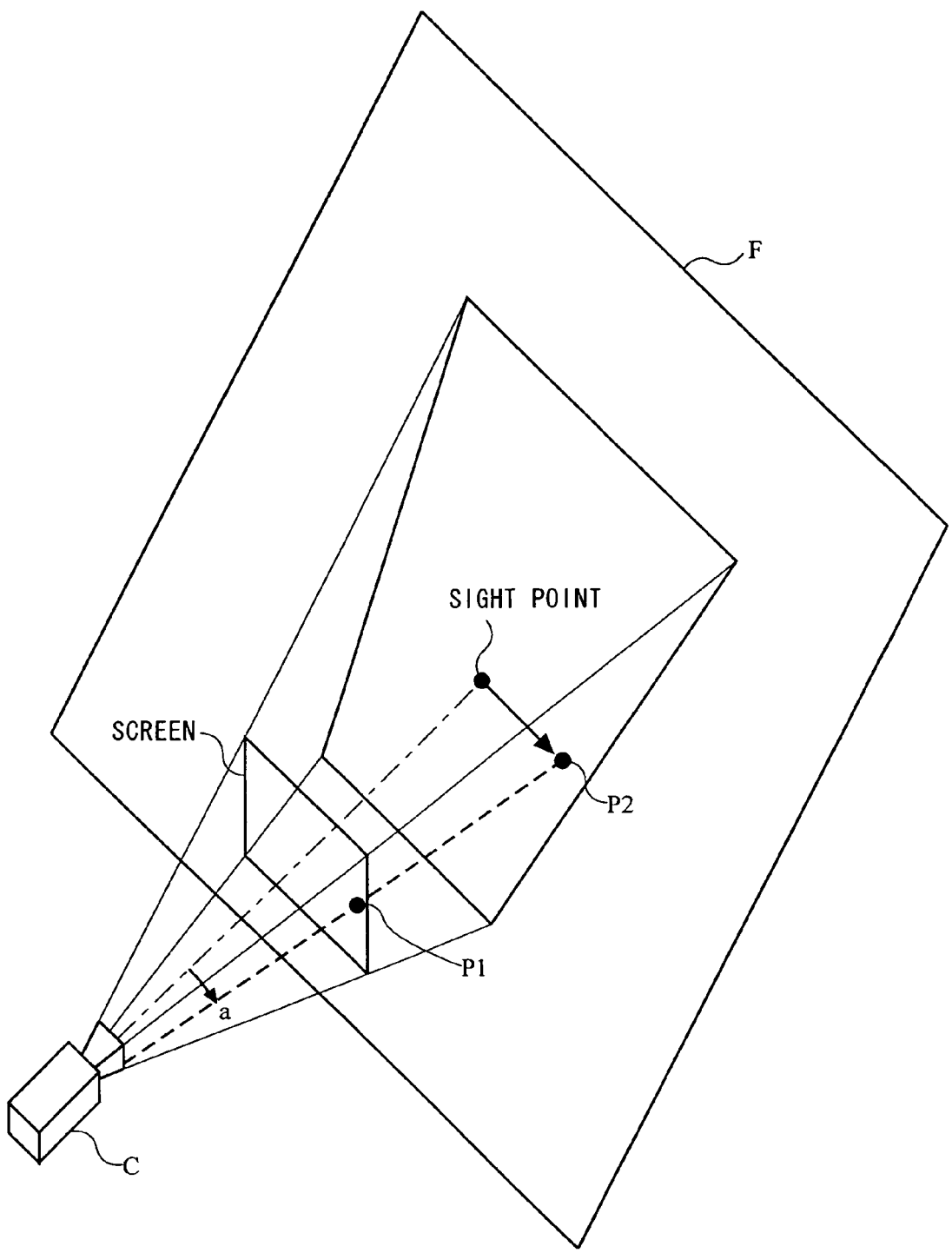
FIG. 23 is a diagram illustrating a state of a virtual camera C used when the game apparatus 3 generates a game image as a second example.

With reference to FIG. 23, a second example in which a game is played using the aforementioned controller 7 will be described. FIG. 23 is a diagram illustrating a state of the virtual camera C used when the game apparatus 3 generates a game image as the second example.

As shown in FIG. 23, an image of a game field F as seen from the virtual camera C is generated as a game image. As in the first example, a player operates the core unit 70 with one hand and operates the subunit 76 with the other hand so as to play the game. The operation object of the stick 78a on the subunit 76 is fixedly set as the player character P. The operation object of the imaging information calculation section 74 in the core unit 70 is fixedly set as the virtual camera C. When the operation objects are fixedly set as described above, the player inclines the stick 78a on the subunit 76, thereby moving the player character P on the game field F in accordance with the inclining direction. Further, the player moves his or her hand holding the core unit 70 with respect to the display screen, thereby setting a designated position P1 on the screen of the monitor 2. The designated position P1 on the screen is converted into a position P2 in the game space corresponding to a position on the screen. At this time, the virtual camera C has its imaging direction changed to a direction indicated by "a" shown in FIG. 23 such that a sight point of the virtual camera C follows the position P2. That is, the player moves his or her hand holding the core unit 70 with respect to the display screen, whereby the sight point of the virtual camera C moves so as to follow a position designated on the monitor 2. In this case, the operation of the core unit 70 changes a state of the screen display, resulting in the designated position being moved in the virtual three-dimensional space. Therefore, when the virtual camera C is operated using the core unit 70, another operation key and the like are also used to move the virtual camera C for causing its sight point to follow a position designated at the instant of pressing the operation key. Alternatively, the designated position may not be used as the sight point, and an amount by which the designated position is moved while the key is being kept pressed is calculated, and the virtual camera C may be moved such that its sight point is moved in accordance with the amount.

In the aforementioned operations, while the player is operating the stick 78a on the subunit 76 so as to instruct the player character P to move, the player can observe a position on the game field F designated by the core unit 70. For example, in a game having a shooting target fixedly set at the center of the screen, the shooting target is caused to follow a position designated by the core unit 70 through the operation described as the second example. Conventionally, in order to change the facing direction of the player character P, it is necessary to keep the operation section such as the stick inclined, thereby preventing the player character P from quickly changing its facing direction. Further, a relationship between the direction in which the stick is inclined and the direction on the screen depends on each player and therefore it is necessary to provide a "reverse" mode for allowing the player to set his or her desired direction. However, according to the second example, in a game having the sight point of the virtual camera C fixedly set as a position observed by the player character P, and the like, when a speed at which the sight point is moved is controlled through an operation input based on the motion of the core unit 70, the facing direction of the player character P can be quickly changed as necessary, that is, an input can be intuitively performed, thereby eliminating the reverse mode.

Figure 24:
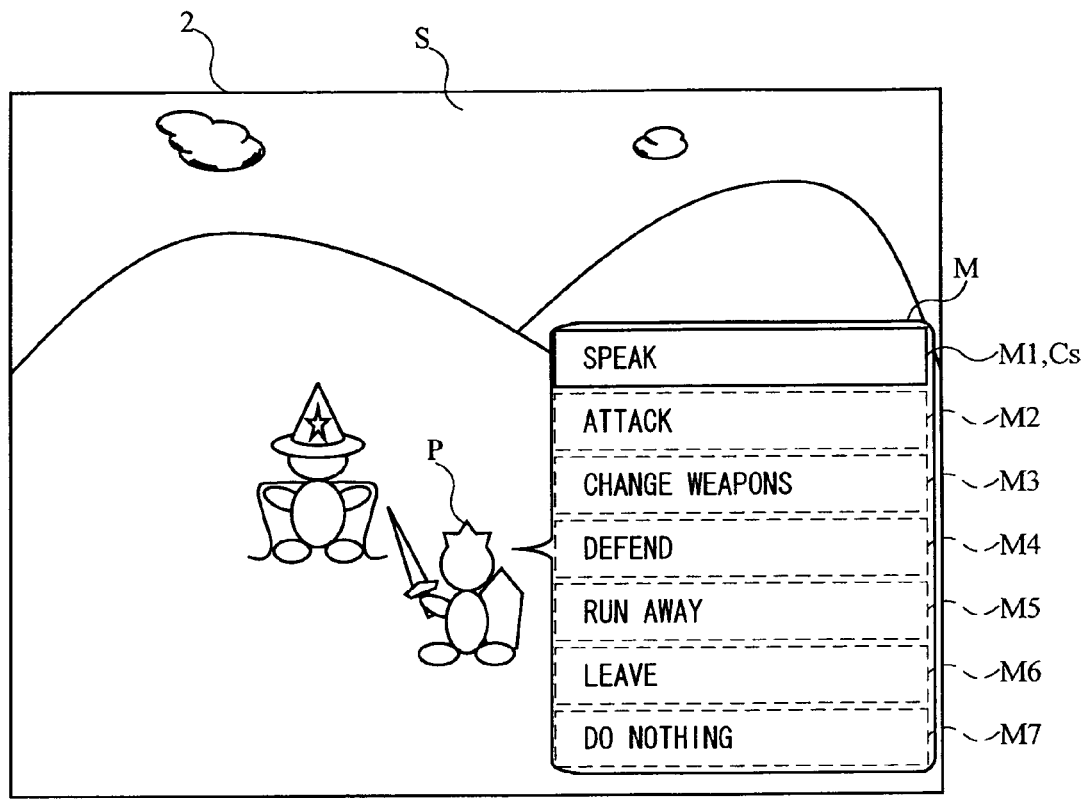
FIG. 24 is a diagram illustrating an exemplary game image displayed on the monitor 2 when the game apparatus 3 executes a role playing game as a third example.

Next, with reference to FIG. 24, a third example in which a game is played using the aforementioned controller 7 will be described. As the third example, a role playing game played using the controller 7 will be described. FIG. 24 is a diagram illustrating an exemplary game image displayed on the monitor 2 when the game apparatus 3 executes the role playing game as the third example.

As shown in FIG. 24, a portion of the three-dimensional virtual game space S is displayed on the display screen of the monitor 2. The player character P and a menu M are displayed on the display screen as game objects acting in accordance with an operation of the controller 7. The menu M includes a plurality of choices M1 to M7 each indicating an action to be performed by the player character P in the virtual game space S, and the menu M is a menu screen for allowing the player to select from the plurality of choices M1 to M7.

In the role playing game having such a game image displayed on the monitor 2, as in the first example, a player operates the core unit 70 with one hand and operates the subunit 76 with the other hand, so as to play the game. The operation object of the stick 78a on the subunit 76 is fixedly set as the player character P. The operation object of the imaging information calculation section 74 in the core unit 70 is set as one of the choices M1 to M7 displayed at a currently designated position. When the operation objects are set as described above, the player inclines the stick 78a on the subunit 76 so as to move the player character P in the virtual game space S in accordance with the inclining direction. Further, the player moves his or her hand holding the core unit 70 with respect to the display screen so as to set the designated position on the monitor 2, thereby displaying a selection cursor Cs corresponding to one of the choices M1 to M7 (for example, choice M1 in FIG. 24) displayed at the designated position. When the player presses the operation button 72i on the core unit 70, the currently selected choice (that is, a choice having the selection cursor Cs displayed) among the choices M1 to M7 is determined as an action to be performed by the player character P.

In the aforementioned operations, while the player is operating the stick 78a on the subunit 76 so as to instruct the player character P to move, the player can designate and select one of choices M1 to M7 from the menu using the core unit 70. The conventional game operation takes some amount of time for performing menu selection using the controller and also requires an input using a direction key and the like. Therefore, when the game is played in real time, the player cannot control the player character while selecting a choice from the menu, thereby failing to control the player character. However, in the third example, the player can control a character with one hand and directly select a choice with the other hand, thereby providing the player with an operation having time loss reduced and having controllability improved.

The aforementioned first to third examples are only examples of games which can enhance, by realizing the present invention, an effect thereof, and it should be understood that the present invention is not restricted to these games. For example, the player character or other game objects may be moved to positions in the game space corresponding to the designated positions by the core unit 70.

In the above description, the controller 7 and the game apparatus 3 are connected to each other by wireless communication. However, the controller 7 and the game apparatus 3 may be electrically connected to each other by a cable. In this case, the cable connected to the core unit 70 is connected to a connection terminal of the game apparatus 3.

Moreover, in the present embodiment, only the core unit 70 among the core unit 70 and the subunit 76 of the controller 7 has the communication section 75. However, the subunit 76 may have the communication section for wirelessly transmitting the transmission data to the receiving unit 6. Further, both the core unit 70 and the subunit 76 may have the respective communication sections. For example, the respective communication sections included in the core unit 70 and the subunit 76 may wirelessly transmit the transmission data to the receiving unit 6, or the communication section of the subunit 76 may wirelessly transmit the transmission data to the communication section 75 of the core unit 70, and the communication section 75 of the core unit 70 may wirelessly transmit, to the receiving unit 6, the received transmission data from the subunit 76 and the transmission data of the core unit 70. In these cases, the connecting cable 79 for electrically connecting between the core unit 70 and the subunit 76 can be eliminated, and the two units are completely separated from each other, thereby enabling two persons to play the game.

In the above description, the receiving unit 6 connected to the connection terminal of the game apparatus 3 is used as a receiving means for receiving transmission data which is wirelessly transmitted from the controller 7. Alternatively, the receiving means may be a receiving module built into the game apparatus 3. In this case, the transmission data received by the receiving module is outputted to the CPU 30 via a predetermined bus.

Although in the present embodiment the imaging information calculation section 74 included in the core unit 70 is described as an example of a determining section for outputting a signal (process result data) in accordance with a motion of the core unit 70 body, the imaging information calculation section 74 may be provided in another form. For example, the core unit 70 may include the acceleration sensor 701 as described above, or may include a gyro sensor. The acceleration sensor or the gyro sensor can be used to determine a motion or posture of the core unit 70, and, therefore, can be used as a determining section for outputting a signal in accordance with the motion of the core unit 70 body using the detection signal for the motion or posture. In this case, the imaging information calculation section 74 may be eliminated from the core unit 70, or sensor and the imaging information calculation section can be used in combination.

Although in the present embodiment only the core unit 70 includes the imaging information calculation section 74, the subunit 76 may also include the similar imaging information calculation section so as to allow a player to intuitively perform operation in accordance with the motion of the controller using both units. In this case, input operation can be performed with increased flexibility. Although in the present embodiment the core unit 70 and the subunit 76 form a controller, the subunit 76 can be replayed with another device having the same function as the core unit 70 or, for example, the subunit 76 may be replaced with the core unit 70. In this case, two core units 70 are used, and when the core unit 70 is regarded as a controller, two controllers are used. Since the core unit 70 includes a communication section for communicating with the game apparatus, the respective core units 70 communicate with the game apparatus, and the game apparatus performs a game process based on both operation data received from one core unit 70 and operation data received from the other core unit 70.

In the present embodiment, image data taken by the image pickup element 743 is analyzed so as to obtain position coordinates of infrared lights from the LED modules 8L and 8R, coordinates of the center of gravity thereof, and the like, and the core unit 70 generates process result data from the obtained coordinates and the like and transmits the process result data to the game apparatus 3. However, the core unit 70 may transmit data obtained in another process step to the game apparatus 3. For example, the core unit 70 transmits to the game apparatus 3 image data taken by the image pickup element 743, and the CPU 30 may perform the aforementioned analysis so as to obtain process result data. In this case, the image processing circuit 744 can be eliminated from the core unit 70. Alternatively, the core unit 70 may transmit, to the game apparatus 3, the image data having been analyzed halfway. For example, the core unit 70 transmits to the game apparatus 3 data indicating a brightness, a position, an area size and the like obtained from the image data, and the CPU 30 may perform the remaining analysis so as to obtain process result data.

Although in the present embodiment infrared lights from the two LED modules 8L and 8R are used as imaging targets of the imaging information calculation section 74 in the core unit 70, the imaging target is not restricted thereto. For example, infrared light from one LED module or infrared lights from at least three LED modules provided in the vicinity of the monitor 2 may be used as the imaging target of the imaging information calculation section 74. Alternatively, the display screen of the monitor 2 or another emitter (room light or the like) can be used as the imaging target of the imaging information calculation section 74. When the position of the core unit 70 with respect to the display screen is calculated based on the positional relationship between the imaging target and the display screen of the monitor 2, various emitters can be used as the imaging target of the imaging information calculation section 74.

The aforementioned shapes of the core unit 70 and the subunit 76 are merely examples. Further, the shape, the number, setting position and the like of each of the operation section 72 of the core unit 70 and the operation section 78 of the subunit 76 are merely examples. Needless to say, even when the shape, the number, the setting position and the like of each of the core unit 70, the subunit 76, the operation section 72, and the operation section 78 are different from those described in the embodiment, the present invention can be realized. Further, the imaging information calculation section 74 (light entrance of the imaging information calculation section 74) of the core unit 70 may not be positioned on the front surface of the housing 71. The imaging information calculation section 74 may be provided on another surface at which light can be received from the exterior of the housing 71.

Thus, the controller of the present invention allows a player to operate both the core unit 70 and the subunit 76 included therein so as to enjoy a game. The core unit 70 has a function of outputting a signal in accordance with motion of the unit body including the imaging information calculation section 74 and the accelerator sensor 701. The subunit 76 has a function of outputting a signal in accordance with a direction input operation performed by the player. For example, when used is a controller into which the core unit 70 and the subunit 76 are integrated, the whole controller has to be moved so as to output a signal in accordance with the motion of the unit body, thereby exerting some influence on the direction input operation. Further, the integration of the core unit 70 and the subunit 76 causes the opposite influence, that is, flexibility, which is realized by separation between the core unit 70 and the subunit 76, is substantially reduced. Therefore, the core unit 70 and the subunit 76 can be separated into a right unit and a left unit as in the case of a conventional controller for the game apparatus, and simultaneously the core unit 70 and the subunit 76 allow the player to freely use his or her right and left hands, thereby providing the player with new operation, which cannot be anticipated by the integrated controller. Further, the controller can be operated with substantially enhanced flexibility, thereby providing a player with a game operation having increased reality.

The game system and the storage medium having the game program stored thereon according to the present invention can realize operation having enhanced flexibility, and are useful as a game system which can be operated by a player by holding physically separated units, a game program and the like.

While the invention has been described in detail, the foregoing description is in all aspects illustrative and not restrictive. It is understood that numerous other modifications and variations can be devised without departing from the scope of the invention.

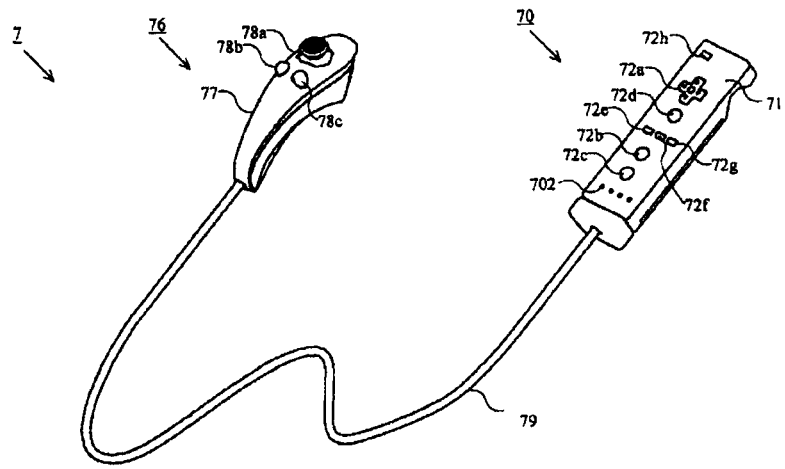

What is claimed is:

1. A game system, comprising:
    a first handheld controller configured to be supported in free space by a first hand of a user;
    a second handheld controller configured to be supported in free space by a second hand of the user; and
    a game apparatus for executing a predetermined game program to cause a display device to display, on a display area, one of a two-dimensional virtual game world and a three-dimensional virtual game world, wherein
    the first controller includes a first operation data generation section for generating first operation data relating to an orientation of the first controller and an input operation performed by a player;

the second controller includes a second operation data generation section for generating second operation data relating to an orientation of the second controller and an input operation performed by a player, the first controller includes an acceleration sensor that generates acceleration data relating to an orientation of the first controller and an image pickup section that captures images that include plural infrared markers and that generates coordinate related information based on the infrared markers that is also related to an orientation of the first controller, the second controller transmits the second operation data to the first controller; and the game apparatus includes a game processing unit that obtains the first operation data and the second operation data from the first controller and that subjects the virtual game world to a predetermined game process in accordance with a change in the data relating to an orientation of one of the first and second controllers, as reflected in the obtained operation data, and a display processing unit that causes the display device to display, on the display area, an image of the virtual game world having been subjected to the game process.

2. The game system according to claim 1, wherein the game processing unit includes a designated coordinate determination unit that determines, based on at least one of the first and second operation data, coordinates represented in the display area of the display device as designated coordinates, and wherein the game processing unit performs the game process by performing a predetermined calculation using the designated coordinates and the other of the first and second operation data.

3. The game system according to claim 2, wherein the image pickup section is operable to take an image along a predetermined direction from the first controller body, the first operation data includes one selected from the group consisting of an image taken by the image pickup section and a result of subjecting the image taken by the image pickup section to a predetermined calculation, and the designated coordinate determination unit changes a position of designated coordinates from a predetermined position in accordance with a movement of a position of a predetermined imaging target in the taken image, thereby determining the designated coordinates.

4. The game system according to claim 2, wherein the first operation data includes acceleration data outputted by the acceleration sensor, and the designated coordinate determination unit changes a position of designated coordinates from a predetermined position in accordance with the acceleration data, thereby determining the designated coordinates.

5. The game system according to claim 2, wherein the game processing unit calculates, in a three-dimensional virtual game space, three-dimensional designated coordinates corresponding to the designated coordinates and performs the game process including a calculation using the three-dimensional designated coordinates, and wherein the display processing unit displays, on the display area of the display device, the three-dimensional virtual game space obtained by the game process performed by the game processing unit.

6. The game system according to claim 5, wherein the game processing unit also changes at least one selected from the group consisting of position coordinates of a player character in the virtual game world, position coordinates of the virtual camera and a direction vector of the virtual camera, in accordance with the obtained operation data.

7. The game system according to claim 5, wherein the game processing unit subjects an object positioned at the three-dimensional designated coordinates to a predetermined process.

8. The game system according to claim 2, wherein the game processing unit disposes a predetermined object at a position corresponding to the designated coordinates.

9. The game system according to claim 7, wherein the game processing unit also changes at least one selected from the group consisting of position coordinates of a player character in the virtual game world, position coordinates of the virtual camera and a direction vector of the virtual camera, in accordance with the obtained operation data.

10. The game system according to claim 2, wherein the game processing unit generates the virtual game world including at least a menu area for allowing a player to select from a plurality of selection items, and wherein the game processing unit performs a process for selecting the selection item displayed at a position including the designated coordinates in the display area.

11. The game system according to claim 10, wherein the game processing unit also changes at least one selected from the group consisting of position coordinates of a player character in the virtual game world, position coordinates of the virtual camera and a direction vector of the virtual camera, in accordance with the obtained operation data.

12. The game system according to claim 5, wherein the game processing unit changes a direction of a virtual camera such that a sight point of the virtual camera coincides with the three-dimensional designated coordinates.

13. The game system according to claim 12, wherein the game processing unit also changes at least one selected from the group consisting of position coordinates of a player character in the virtual game world and position coordinates of the virtual camera, in accordance with the obtained operation data.

14. The game system according to claim 1, wherein the game processing unit subjects, to a predetermined calculation, an amount by which either the first operation data varies in accordance with a change in the orientation of the first controller or the second operation data varies in accordance with a change in the orientation of the second controller, determines a motion vector in a coordinate system of the display area, and changes a direction of a virtual camera such that a sight point of the virtual camera in a three-dimensional virtual game space moves on the display area in accordance with the motion vector, and wherein the display processing unit causes the display device to display, on the display area of the display device, a three-dimensional virtual game space obtained by the game process performed by the game processing unit.

15. The game system according to claim 14, wherein the game processing unit changes at least one selected from the group consisting of position coordinates of a player character in the virtual game world and position coordinates of the virtual camera, in accordance with the obtained operation data.

16. The game system of claim 1, wherein the second operation data generation section generates second operation data in accordance with a direction input operation performed by a player.

17. The game system of claim 1, further comprising a transmission device that transmits the second operation data from the second controller to the first controller.

18. The game system of claim 17, wherein the transmission device comprises:

a cable having a first end attached to the second controller; and a connector attached to a second end of the cable, wherein the connector mates with a mating connector on the first controller.

19. The game system of claim 17, wherein the transmission device comprises:
a wireless transmitter on the second controller that transmits a wireless signal that is encoded with the second operation data; and
a wireless receiver that receives the wireless signal from the wireless transmitter, wherein the wireless receiver can be coupled to the first controller.

20. The game system of claim 1, wherein the second controller comprises a wireless transmission device that transmits the second operation data from the second controller to the first controller.

21. The game system of claim 20, wherein the wireless transmission device of the second controller comprises:
a wireless transmitter on the second controller that transmits a wireless signal that is encoded with the second operation data; and
a wireless receiver having a connector that couples to a mating connector on the first controller, wherein the wireless receiver receives the wireless signal from the wireless transmitter and communicates the second operation data to the first controller via the mating connector.

22. The game system of claim 1, wherein the first controller comprises:
a memory that stores the first operation data and the second operation data received from the second controller; and
a transmission unit that periodically transmits the first operation data and the second operation data stored in the memory to the game processing unit.

23. The game system of claim 22, wherein the transmission unit comprises a wireless transmitter.

24. A game system, comprising:
a first controller configured to be held in free space by a first hand of a player, wherein the first controller includes an acceleration sensor, an image pickup section, and a first operation data generation section that generates first operation data relating to an orientation of the first controller based on data output by the acceleration sensor and the image pickup section;
a second controller configured to be held in free space by a second hand of the player, wherein the second controller includes a second operation data generation section that generates second operation data in accordance with an input operation performed by the player's second hand; and
a game apparatus for executing a predetermined game program to cause a display device to display, on a display area, one of a two-dimensional virtual game world and a three-dimensional virtual game world, wherein the game apparatus comprises:
a game processing unit that obtains the first operation data and the second operation data and that subjects the virtual game world to a predetermined game process in accordance with the obtained operation data, and
a display processing unit that causes the display device to display, on the display area, an image of the virtual game world having been subjected to the game process.

25. The game system of claim 24, wherein the second operation data generation section generates the second operation data in response to a direction input operation performed by the player's second hand.

26. The game system of claim 24, wherein the acceleration sensor outputs an acceleration signal relating to an orientation of the first controller.

27. The game system of claim 26, wherein the image pickup section captures at least one image of an area surrounding the first controller.

28. The game system of claim 27, wherein the image pickup section captures a series of images of an area surrounding the first controller, and wherein the first controller further comprises an image analysis section that determines locations of at least one target object in each of the series of images when the at least one target object appears in an image.

29. The game system of claim 28, wherein the image pickup section detects infrared markers.

30. The game system of claim 29, wherein image analysis section determines locations of the infrared markers in each of the series of images when infrared markers appears in an image.

31. The game system of claim 24, wherein the second operation data is communicated from the second controller to the first controller.

32. The game system of claim 31, wherein the first controller communicates the first operation data and the second operation data to the game apparatus.

33. The game system of claim 32, wherein the first operation data and the second operation data is communicated wirelessly from the first controller to the game apparatus.

34. The game system of claim 33, wherein the second operation data is communicated wirelessly from the second controller to the first controller.

35. A game system, comprising:
a first controller configured to be supported in free space by a user's first hand and including a first acceleration sensor and an image pickup section that captures at least one image of an area surrounding the first controller, wherein the first controller generates first operation data relating to an orientation of the first controller, and wherein the first operation data is based on an output from the first acceleration sensor and the at least one image captured by the image pickup section;
a second controller configured to be supported in free space by the user's second hand and that includes a second acceleration sensor and that generates second operation data relating to an orientation of the second controller and an input operation performed by the player, wherein the second operation data is based on an output of the acceleration sensor; and
a game apparatus for executing a predetermined game program to cause a display device to display, on a display area, one of a two-dimensional virtual game world and a three-dimensional virtual game world, wherein the game apparatus comprises:
a game processing unit that obtains the first operation data and the second operation data and that subjects the virtual game world to a predetermined game process in accordance with the obtained operation data, and
a display processing unit that causes the display device to display, on the display area, an image of the virtual game world having been subjected to the game process.

36. The game system of claim 35, wherein the first controller further comprises an image analysis unit that analyzes the at least one image captured by the image pickup section and that outputs data relating to an orientation of the first controller based on the analysis of the at least one image.

37. The game system of claim 35, wherein the image pickup section captures a series of images of the area surrounding the first controller, wherein the first controller further comprises an image analysis section, and wherein the image analysis section outputs data indicative of positions of at least one reference object in the series of images.

38. The game system of claim 35, wherein the image pickup section captures a series of images of the area surrounding the first controller, wherein the first controller further comprises an image analysis section, and wherein the image analysis section determines the position of at least one reference object in each of the series of images whenever a reference object is present in an image.

39. The game system of claim 38, wherein the game processing unit analyzes the first operation data and calculates information relating to an orientation of the first controller based on the first operation data.

40. The game system of claim 38, wherein the game processing unit analyzes changes in position of a reference object in the series of images captured by the image pickup section, as reflected in the first operation data, and calculates information relating to an orientation of the first controller therefrom.

* * * * *

UNITED STATES PATENT AND TRADEMARK OFFICE
CERTIFICATE OF CORRECTION

Page 1 of 2

PATENT NO. : 8,308,563 B2
APPLICATION NO. : 11/404844
DATED : November 13, 2012
INVENTOR(S) : Ikeda et al.

It is certified that error appears in the above-identified patent and that said Letters Patent is hereby corrected as shown below:

Delete Title Page, and replace with new Title Page. (Attached)

In the Claims

At column 34, line 15, insert the following additional claims:

--41. The game system of claim 35, wherein the second controller transmits the second operation data to the first controller, and wherein the first controller transmits the first operation data and the second operation data to the game apparatus.

42. The game system of claim 35, wherein the first operation data is indicative of a change relating to an orientation of the first controller caused by a player's first hand, and wherein the second operation data is indicative of an input operation performed by the player's second hand.

43. The game system of claim 42, wherein the second operation data is indicative of a directional input operation performed by the player's second hand.

44. The game system of claim 1, wherein the acceleration sensor comprises a first acceleration sensor, and further comprising a second acceleration sensor that is located in the second controller, wherein the second operation data is generated, at least in part, by the second acceleration sensor.--

Signed and Sealed this
Twenty-first Day of October, 2014

Michelle K. Lee
*Deputy Director of the United States Patent and Trademark Office*

(12) United States Patent
Ikeda et al.

(10) Patent No.: US 8,308,563 B2
(45) Date of Patent: Nov. 13, 2012

(54) GAME SYSTEM AND STORAGE MEDIUM HAVING GAME PROGRAM STORED THEREON

(75) Inventors: Akio Ikeda, Kyoto (JP); Keizo Ohta, Kyoto (JP); Hideya Akasaka, Kyoto (JP); Yuki Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 145 days.

(21) Appl. No.: 11/404,844

(22) Filed: Apr. 17, 2006

(65) Prior Publication Data
US 2007/0049374 A1 Mar. 1, 2007

Related U.S. Application Data

(60) Provisional application No. 60/714,861, filed on Sep. 8, 2005.

(30) Foreign Application Priority Data

Aug. 30, 2005 (JP) ................... 2005-249265

(51) Int. Cl.
*G06F 17/00* (2006.01)
(52) U.S. Cl. ................ 463/37; 463/36; 463/38
(58) Field of Classification Search ............. 463/36–38
See application file for complete search history.

(56) References Cited

U.S. PATENT DOCUMENTS

| | | |
|---|---|---|
| 3,454,920 A | 7/1969 | Mehr |
| 3,474,241 A | 10/1969 | Kuipers |
| D220,268 S | 3/1971 | Kliewer |
| 3,660,648 A | 5/1972 | Kuipers |
| 3,973,257 A | 8/1976 | Rowe |
| 4,009,619 A | 3/1977 | Snyman |
| 4,038,876 A | 8/1977 | Morris |
| 4,166,406 A | 9/1979 | Maughmer |
| 4,240,638 A | 12/1980 | Morrison et al. |
| 4,287,765 A | 9/1981 | Kreft |
| 4,303,978 A | 12/1981 | Shaw et al. |
| 4,318,245 A | 3/1982 | Stowell et al. |

(Continued)

FOREIGN PATENT DOCUMENTS

CN 1338961 3/2002

(Continued)

OTHER PUBLICATIONS

"Game Controller" Wikipedia, Aug. 19, 2005, 7 pages, http://en.wikipedia.org/w/index.php?title=Game_controller&oldid=21390758.

(Continued)

*Primary Examiner* — Michael Cuff
(74) *Attorney, Agent, or Firm* — Nixon & Vanderhye P.C.

(57) ABSTRACT

A first controller includes a first operation data generation section for generating first operation data in accordance with a motion of a first controller body included in the first controller. A second controller includes a second operation data generation section for generating second operation data in accordance with a direction input operation performed by a player. A game apparatus includes a game process means for obtaining the first operation data and the second operation data and subjecting a virtual game world to a predetermined game process in accordance with the obtained operation data, and a display process means for causing the display device to display, on a display area, an image of the virtual game world having been subjected to the game process.

44 Claims, 24 Drawing Sheets